US012532027B2

(12) United States Patent
Hur et al.

(10) Patent No.: US 12,532,027 B2
(45) Date of Patent: *Jan. 20, 2026

(54) POINT CLOUD DATA TRANSMISSION DEVICE, POINT CLOUD DATA TRANSMISSION METHOD, POINT CLOUD DATA RECEPTION DEVICE, AND POINT CLOUD DATA RECEPTION METHOD

(71) Applicant: LG Electronics Inc., Seoul (KR)

(72) Inventors: Hyejung Hur, Seoul (KR); Sejin Oh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 105 days.

This patent is subject to a terminal disclaimer.

(21) Appl. No.: 18/529,451

(22) Filed: Dec. 5, 2023

(65) Prior Publication Data

US 2024/0121436 A1 Apr. 11, 2024

Related U.S. Application Data

(63) Continuation of application No. 17/354,278, filed on Jun. 22, 2021, now Pat. No. 11,889,113, which is a (Continued)

(51) Int. Cl.
*H04N 19/597* (2014.01)
*H04N 19/132* (2014.01)
(Continued)

(52) U.S. Cl.
CPC ......... *H04N 19/597* (2014.11); *H04N 19/132* (2014.11); *H04N 19/136* (2014.11); (Continued)

(58) Field of Classification Search
CPC .. H04N 19/597; H04N 19/132; H04N 19/136; H04N 19/167; H04N 19/96;
(Continued)

(56) References Cited

U.S. PATENT DOCUMENTS

2008/0238919 A1* 10/2008 Pack .................... G06T 17/005 345/420
2012/0313944 A1 12/2012 Kontkanen et al.
(Continued)

FOREIGN PATENT DOCUMENTS

CN 109257604 A 1/2019
EP 3975124 A1 3/2022
(Continued)

OTHER PUBLICATIONS

"G-PCC codec description", ISO/IEC JTC1/SC29/WG11, Coding of Moving Pictures and Audio, Jul. 2019, Gothenburg, SE, XP030206833, Retrieved from the Internet: URL:http://phenix.int-evry.frimpeg/doc_end_user/documents/127_Gothenburg/wg11/w18673.zip w18673.docx [retrieved on Sep. 6, 2019].
(Continued)

*Primary Examiner* — Francis Geroleo
(74) *Attorney, Agent, or Firm* — Bryan Cave Leighton Paisner LLP

(57) ABSTRACT

Disclosed herein is a method for receiving point cloud data, including receiving a bitstream containing the point cloud data, and decoding the point cloud data. Disclosed herein is a method for transmitting point cloud data, including encoding the point cloud data, and transmitting a bitstream containing the point cloud data.

7 Claims, 38 Drawing Sheets

| | |
|---|---|
| S270000 | Geometry construction |
| S270010 | Morton order-based sorting |
| S270020 | Setting attribute partial encoding/decoding region |
| S270030 | Reorganizing points belonging to a node using Morton code |
| | nodeSizeLog2: Octree depth level |
| | PX_mortoncode: Morton code of PX |
| | end_range_mc: Morton code range |
| | Int maxNumOfPoints = pow(8, nodeSizeLog2 + 1);<br>For (int I = 1; I < indexCount; ++i) { |
| | if(Pi_mortoncode < end_range_mc) {<br>... |
| | } else {<br>end_range_mc = Pi_mortoncode = |
| | (maxNumOfPoints −(Pi_mortoncode % maxNumOfPoints)); |
| | } |
| | } |
| S270030 | LOD sampling at octree node |

Related U.S. Application Data continuation of application No. 16/998,153, filed on Aug. 20, 2020, now Pat. No. 11,057,645.

(60) Provisional application No. 62/911,954, filed on Oct. 7, 2019, provisional application No. 62/910,400, filed on Oct. 3, 2019.

(51) Int. Cl.

| | |
|---|---|
| ***H04N 19/136*** | (2014.01) |
| ***H04N 19/167*** | (2014.01) |
| ***H04N 19/90*** | (2014.01) |
| ***H04N 19/96*** | (2014.01) |

(52) U.S. Cl.

CPC .......... *H04N 19/167* (2014.11); *H04N 19/96* (2014.11); *H04N 19/90* (2014.11)

(58) Field of Classification Search

CPC ........ H04N 19/90; H04N 19/33; H04N 19/70; H04N 19/184; H04N 19/91; H04N 19/13; H04N 21/2343; H04N 21/4402; G06T 9/40; G06T 17/005; G06T 2207/10028

See application file for complete search history.

(56) References Cited

U.S. PATENT DOCUMENTS

| | | | | |
|---|---|---|---|---|
| 2014/0198097 | A1* | 7/2014 | Evans | G06T 17/00 345/419 |
| 2016/0275719 | A1 | 9/2016 | Oke | |
| 2017/0091992 | A1* | 3/2017 | Rogers | G06T 17/005 |
| 2017/0214943 | A1 | 7/2017 | Cohen et al. | |
| 2017/0347122 | A1 | 11/2017 | Chou et al. | |
| 2019/0080483 | A1* | 3/2019 | Mammou | G06T 7/50 |
| 2019/0081638 | A1 | 3/2019 | Mammou et al. | |
| 2020/0021856 | A1* | 1/2020 | Tourapis | H04N 19/13 |
| 2020/0107048 | A1* | 4/2020 | Yea | H04N 19/154 |
| 2020/0175725 | A1* | 6/2020 | Mekuria | G06T 15/08 |
| 2020/0217937 | A1* | 7/2020 | Mammou | G01S 7/4861 |
| 2020/0302651 | A1* | 9/2020 | Flynn | G06T 9/00 |
| 2020/0304829 | A1* | 9/2020 | Yea | H04N 19/54 |

FOREIGN PATENT DOCUMENTS

| | | | |
|---|---|---|---|
| EP | 3996044 | A1 | 5/2022 |
| WO | 2019/081087 | A1 | 5/2019 |

OTHER PUBLICATIONS

Hyejung Hur, et al., "[G-PCC][New Proposal] on improved spatial scalable lifting", ISO/IEC JTC1/SC29/WG11, MPEG2019/M51408, Coding of Moving Pictures and Audio, Oct. 2019, Geneva, CH, XP030221738, Retrieved from the Internet: URL:http://phenix.int-evry.frimpeg/doc_end_user/documents/128_Geneva/wg11/ m51408-vl-m51408.zip m51408-G PCC- NEW-on-improved-scalable-lifting .docx [retrieved on Oct. 7, 2019].

Hyejung Hur, et al., "[G-PCC] CE13.15 report on LoD generation for spatial scalability", ISO/IEC JTC1/SC29/WG11, MPEG2019/M52311, Coding of Moving Pictures and Audio, Jan. 2020, Brussels, BE, XP030224927, Retrieved from the Internet: URL:http://phenix.int-evry.frimpeg/doc_end_user/documents/129_Brussels/ wg11/m52311-v1-m52311-CE13.15-report.zip m52311-GPCC-CE13.15 report on LoD generation for spatial scalability.docx [retrieved on Jan. 8, 2020.

Mammou et al., "G-PCC codec description v2", ISO/IEC JTC1/SC29/WG11, N18189, Jan. 2019, Marrakech, MA.

* cited by examiner

FIG. 6
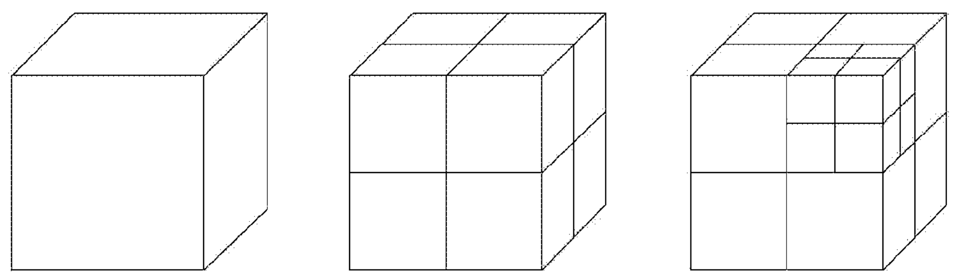
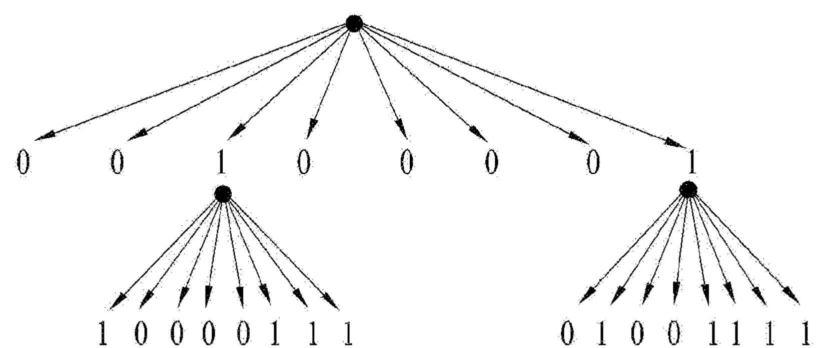

FIG. 7
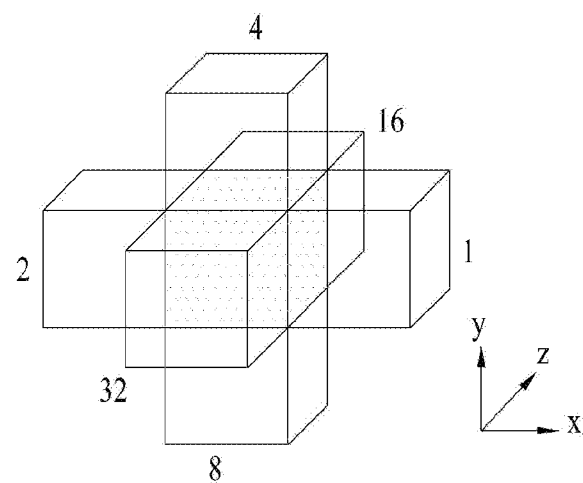
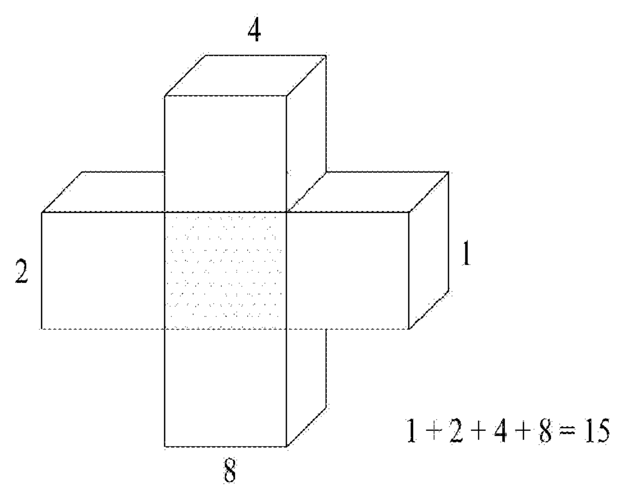

FIG. 16

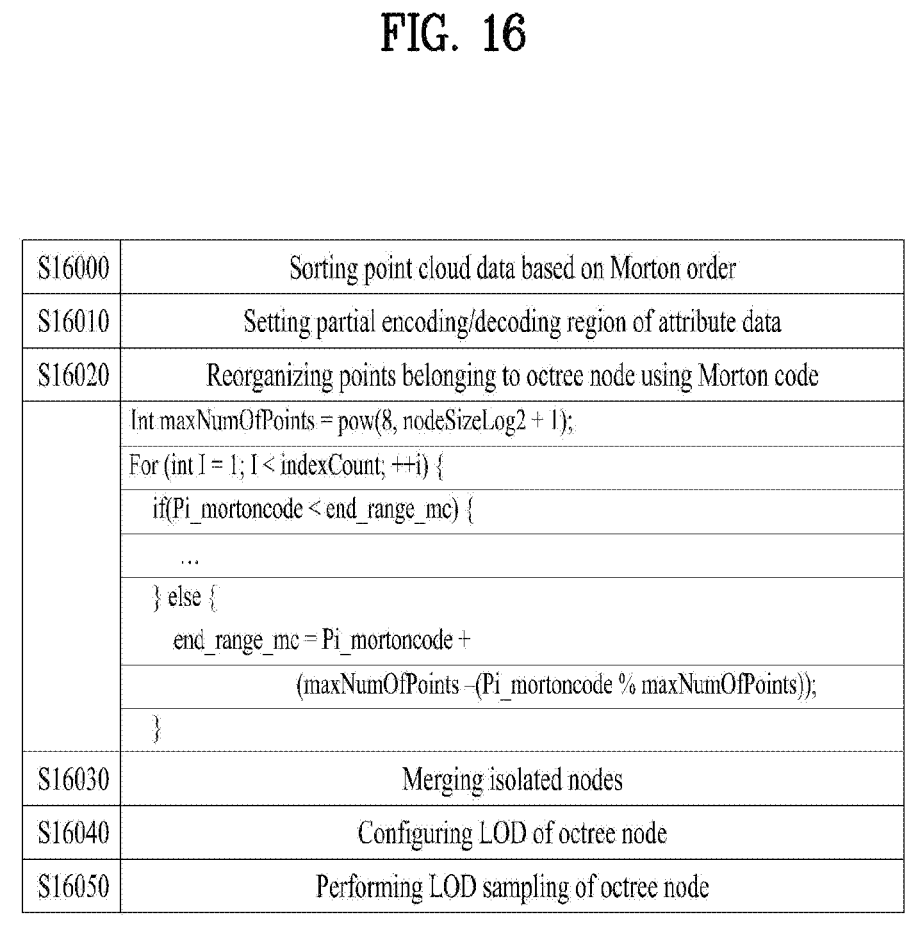

| | |
|---|---|
| S16000 | Sorting point cloud data based on Morton order |
| S16010 | Setting partial encoding/decoding region of attribute data |
| S16020 | Reorganizing points belonging to octree node using Morton code |
| | Int maxNumOfPoints = pow(8, nodeSizeLog2 + 1); |
| | For (int I = 1; I < indexCount; ++i) { |
| | if(Pi_mortoncode < end_range_mc) { |
| | ... |
| | } else { end_range_mc = Pi_mortoncode + |
| | (maxNumOfPoints –(Pi_mortoncode % maxNumOfPoints)); |
| | } |
| S16030 | Merging isolated nodes |
| S16040 | Configuring LOD of octree node |
| S16050 | Performing LOD sampling of octree node |

FIG. 23

| seq_parameter_set_rbsp( ) { | Descriptor |
| --- | --- |
| profile_idc | u(8) |
| profile_compatibility_flags | u(24) |
| ... | |
| sps_num_attribute_sets | ue(v) |
| for( i = 0; i< sps_num_attribute_sets; i++ ) { | |
| attribute_dimension[ i ]<br>attribute_instance_id[ i ] | ue(v)<br>ue(v) |
| ... | |
| spatial_scalability_attribute_octree_level | ue(v) |
| LOD_generation_direction | u(1) |
| sampling_select_type | ue(v) |
| sampling_isolated_node_min_number_of_points | ue(v) |
| sampling_isolated_node_merge_flag | u(1) |
| if (sampling_isolated_node_merge_flag ==1) { | |
| sampling_isolated_node_max_merge_range | ue(v) |
| } | |
| if(sampling_select_type == 1) { | |
| sampling_select_idx | ue(v) |
| } | |
| } | |
| ... | |
| byte_alignment( ) | |
| } | |

FIG. 24

| attribute_parameter_set( ) { | Descriptor |
| --- | --- |
| aps_attr_parameter_set_id | ue(v) |
| aps_seq_parameter_set_id | ue(v) |
| ... | |
| isLifting = ( attr_coding_type == 0 \|\| attr_coding_type == 2 ) ? 1 : 0 | |
| if( isLifting ) { | |
| lifting_num_pred_nearest_neighbours | ue(v) |
| lifting_max_num_direct_predictors | ue(v) |
| ... | |
| spatial_scalability_attribute_octree_level | ue(v) |
| LOD_generation_direction | u(1) |
| sampling_select_type | ue(v) |
| sampling_isolated_node_min_number_of_points | ue(v) |
| sampling_isolated_node_merge_flag<br>if (sampling_isolated_node_merge_flag ==1) { | u(1) |
| sampling_isolated_node_max_merge_range | ue(v) |
| }<br>if(sampling_select_type == 1) { | |
| sampling_select_idx | ue(v) |
| } | |
| } | |
| ... | |
| byte_alignment( ) | |
| } | |

FIG. 25

| tile_parameter_set( ) { | Descriptor |
|---|---|
| num_tiles | ue(v) |
| for( i = 0; i < num_tiles; i++ ) { | |
| tile_bounding_box_offset_x[ i ] | se(v) |
| tile_bounding_box_offset_y[ i ] | se(v) |
| ... | |
| spatial_scalability_attribute_octree_level | ue(v) |
| LOD_generation_direction | u(1) |
| sampling_select_type | ue(v) |
| sampling_isolated_node_min_number_of_points | ue(v) |
| sampling_isolated_node_merge_flag | u(1) |
| if (sampling_isolated_node_merge_flag ==1) { | |
| sampling_isolated_node_max_merge_range | ue(v) |
| } | |
| if(sampling_select_type == 1) { | |
| sampling_select_idx | ue(v) |
| } | |
| ... | |
| } | |
| byte_alignment( ) | |
| } | |

FIG. 26

| attribute_slice_header( ) { | Descriptor |
|---|---|
| ash_attr_parameter_set_id | ue(v) |
| ash_attr_sps_attr_idx | ue(v) |
| ash_attr_geom_slice_id | ue(v) |
| ... | |
| attribute_pred_residual_separate_encoding_flag | u(1) |
| spatial_scalability_attribute_octree_level | ue(v) |
| LOD_generation_direction | u(1) |
| sampling_select_type | ue(v) |
| sampling_isolated_node_min_number_of_points | ue(v) |
| sampling_isolated_node_merge_flag | u(1) |
| if (sampling_isolated_node_merge_flag ==1) { | |
| sampling_isolated_node_max_merge_range | ue(v) |
| } | |
| if(sampling_select_type == 1) { | |
| sampling_select_idx | ue(v) |
| } | |
| ... | |
| byte_alignment( ) | |
| } | |

FIG. 27

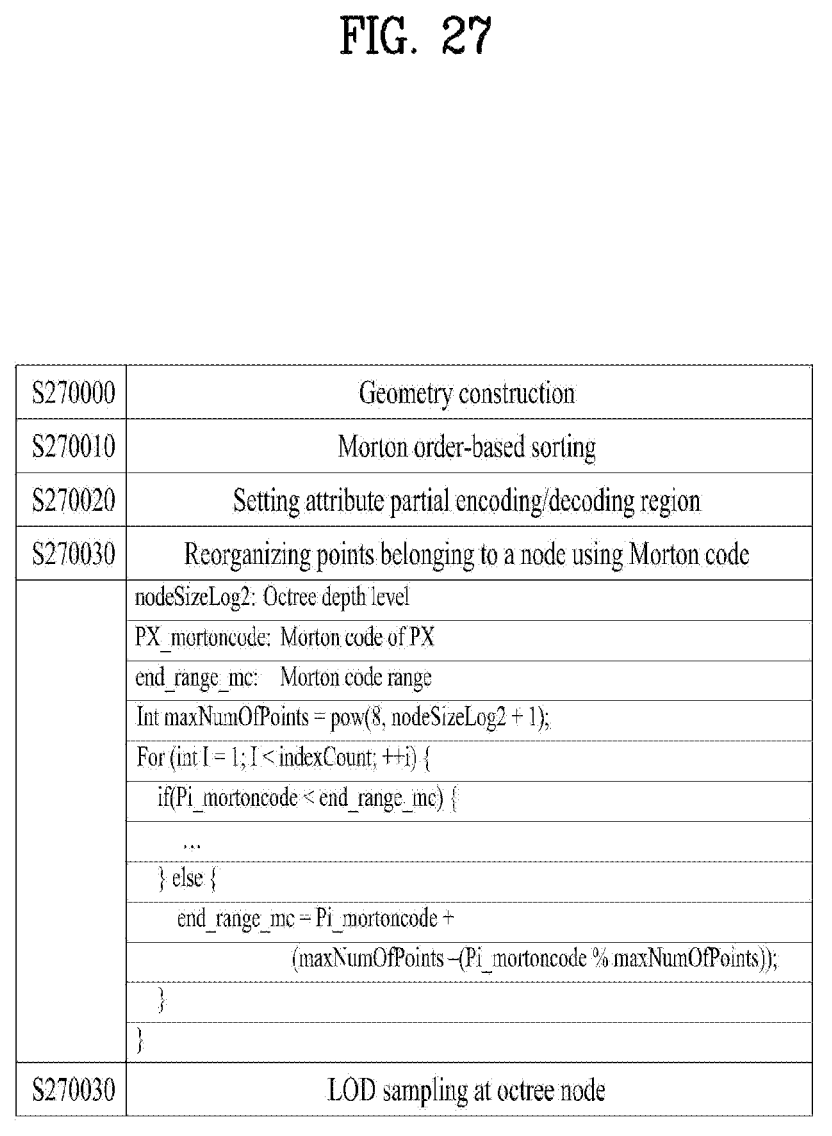

| | |
|---|---|
| S270000 | Geometry construction |
| S270010 | Morton order-based sorting |
| S270020 | Setting attribute partial encoding/decoding region |
| S270030 | Reorganizing points belonging to a node using Morton code |
| | nodeSizeLog2: Octree depth level |
| | PX_mortoncode: Morton code of PX |
| | end_range_mc: Morton code range |
| | Int maxNumOfPoints = pow(8, nodeSizeLog2 + 1); |
| | For (int I = 1; I < indexCount; ++i) { |
| | if(Pi_mortoncode < end_range_mc) { |
| | ... |
| | } else { |
| | end_range_mc = Pi_mortoncode + |
| | (maxNumOfPoints –(Pi_mortoncode % maxNumOfPoints)); |
| | } |
| | } |
| S270030 | LOD sampling at octree node |

FIG. 33

| seq_parameter_set_rbsp( ) { | Descriptor |
|---|---|
| profile_idc | u(8) |
| profile_compatibility_flags | u(24) |
| ... | |
| sps_num_attribute_sets | ue(v) |
| for( i = 0; i< sps_num_attribute_sets; i++ ) { | |
| attribute_dimension[ i ] | ue(v) |
| attribute_instance_id[ i ] | ue(v) |
| ... | |
| spatial_scalability_octree_level | ue(v) |
| spatial_scalability_attribute_octree_level | ue(v) |
| LOD_generation_direction | u(1) |
| sampling_select_type | ue(v) |
| if(sampling_select_type == 1) { | ue(v) |
| sampling_first_node_flag | u(1) |
| } | |
| } | |
| ... | |
| byte_alignment( ) | |
| } | |

FIG. 34

| attribute_parameter_set( ) { | Descriptor |
|---|---|
| aps_attr_parameter_set_id | ue(v) |
| aps_seq_parameter_set_id | ue(v) |
| ... | |
| isLifting = ( attr_coding_type == 0 \|\| attr_coding_type == 2 ) ? 1 : 0 | |
| if( isLifting ) { | |
| lifting_num_pred_nearest_neighbours | ue(v) |
| lifting_max_num_direct_predictors | ue(v) |
| ... | |
| spatial_scalability_attribute_octree_level | ue(v) |
| LOD_generation_direction | u(1) |
| sampling_select_type | ue(v) |
| if(sampling_select_type == 1) { | ue(v) |
| sampling_first_node_flag | u(1) |
| } | |
| } | |
| ... | |
| byte_alignment( ) | |
| } | |

FIG. 35

| tile_parameter_set( ) { | Descriptor |
| --- | --- |
| num_tiles | ue(v) |
| for( i = 0; i < num_tiles; i++ ) { | |
| tile_bounding_box_offset_x[ i ] | se(v) |
| tile_bounding_box_offset_y[ i ] | se(v) |
| ... | |
| spatial_scalability_ octree_level | ue(v) |
| spatial_scalability_attribute_octree_level | ue(v) |
| LOD_generation_direction | u(1) |
| sampling_select_type | ue(v) |
| if(sampling_select_type == 1) { | ue(v) |
| sampling_first_node_flag | u(1) |
| } | |
| ... | |
| } | |
| byte_alignment( ) | |
| } | |

FIG. 36

| attribute_slice_header( ) { | Descriptor |
|---|---|
| ash_attr_parameter_set_id | ue(v) |
| ash_attr_sps_attr_idx | ue(v) |
| ash_attr_geom_slice_id | ue(v) |
| ... | |
| attribute_pred_residual_separate_encoding_flag | u(1) |
| spatial_scalability_attribute_octree_level | ue(v) |
| LOD_generation_direction | u(1) |
| sampling_select_type | ue(v) |
| if(sampling_select_type == 1) { | ue(v) |
| sampling_first_node_flag<br>} | u(1) |
| ... | |
| byte_alignment( ) | |
| } | |

POINT CLOUD DATA TRANSMISSION DEVICE, POINT CLOUD DATA TRANSMISSION METHOD, POINT CLOUD DATA RECEPTION DEVICE, AND POINT CLOUD DATA RECEPTION METHOD

This application is a Continuation of U.S. patent application Ser. No. 17/354,278, filed on Jun. 22, 2021, which is a Continuation of U.S. patent application Ser. No. 16/998,153 filed Aug. 20, 2020 (now U.S. Pat. No. 11,057,645 issued on Jul. 6, 2021), which claims the benefit of U.S. Provisional Application Nos. 62/910,400, filed on Oct. 3, 2019 and 62/911,954, filed on Oct. 7, 2019, which is hereby incorporated by reference as if fully set forth herein.

BACKGROUND

Field

Embodiments relate to a method and apparatus for processing point cloud content.

Discussion of the Related Art

Point cloud content is content represented by a point cloud, which is a set of points belonging to a coordinate system representing a three-dimensional space. The point cloud content may express media configured in three dimensions, and is used to provide various services such as virtual reality (VR), augmented reality (AR), mixed reality (MR), and self-driving services. However, tens of thousands to hundreds of thousands of point data are required to represent point cloud content. Therefore, there is a need for a method for efficiently processing a large amount of point data.

SUMMARY OF THE DISCLOSURE

Embodiments provide an apparatus and method for efficiently processing point cloud data. Embodiments provide a point cloud data processing method and apparatus for addressing latency and encoding/decoding complexity.

The technical scope of the embodiments is not limited to the aforementioned technical objects, and may be extended to other technical objects that may be inferred by those skilled in the art based on the entire contents disclosed herein.

To achieve these objects and other advantages and in accordance with the purpose of the disclosure, as embodied and broadly described herein, a method for receiving point cloud data may include receiving a bitstream containing the point cloud data, and decoding the point cloud data.

In another aspect of the present disclosure, a method for transmitting point cloud data may include encoding the point cloud data, and transmitting a bitstream containing the point cloud data.

Apparatuses and methods according to embodiments may process point cloud data with high efficiency.

The apparatuses and methods according to the embodiments may provide a high-quality point cloud service.

The apparatuses and methods according to the embodiments may provide point cloud content for providing general-purpose services such as a VR service and a self-driving service.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. For a better understanding of various embodiments described below, reference should be made to the description of the following embodiments in connection with the accompanying drawings. The same reference numbers will be used throughout the drawings to refer to the same or like parts. In the drawings:

FIG. 6 shows an example of an octree and occupancy code according to embodiments;

FIG. 7 shows an example of a neighbor node pattern according to embodiments;

FIG. 16 illustrates an attribute encoding/decoding process according to embodiments;

FIG. 23 shows a sequence parameter set according to embodiments;

FIG. 24 shows an attribute parameter set according to embodiments;

FIG. 25 shows a tile parameter set according to embodiments;

FIG. 26 shows an attribute slice header according to embodiments;

FIG. 27 illustrates attribute encoding/decoding according to embodiments;

FIG. 33 shows a sequence parameter set (SPS) according to embodiments;

FIG. 34 shows an attribute parameter set (APS) according to embodiments;

FIG. 35 shows tile parameter set (TPS) according to embodiments;

FIG. 36 shows an attribute slice header (ASH) according to embodiments;

DETAILED DESCRIPTION OF THE DISCLOSURE

Best Mode

Reference will now be made in detail to the preferred embodiments of the present disclosure, examples of which are illustrated in the accompanying drawings. The detailed description, which will be given below with reference to the accompanying drawings, is intended to explain exemplary embodiments of the present disclosure, rather than to show the only embodiments that may be implemented according to the present disclosure. The following detailed description includes specific details in order to provide a thorough understanding of the present disclosure. However, it will be apparent to those skilled in the art that the present disclosure may be practiced without such specific details.

Although most terms used in the present disclosure have been selected from general ones widely used in the art, some terms have been arbitrarily selected by the applicant and their meanings are explained in detail in the following description as needed. Thus, the present disclosure should be understood based upon the intended meanings of the terms rather than their simple names or meanings.

Figure 1:
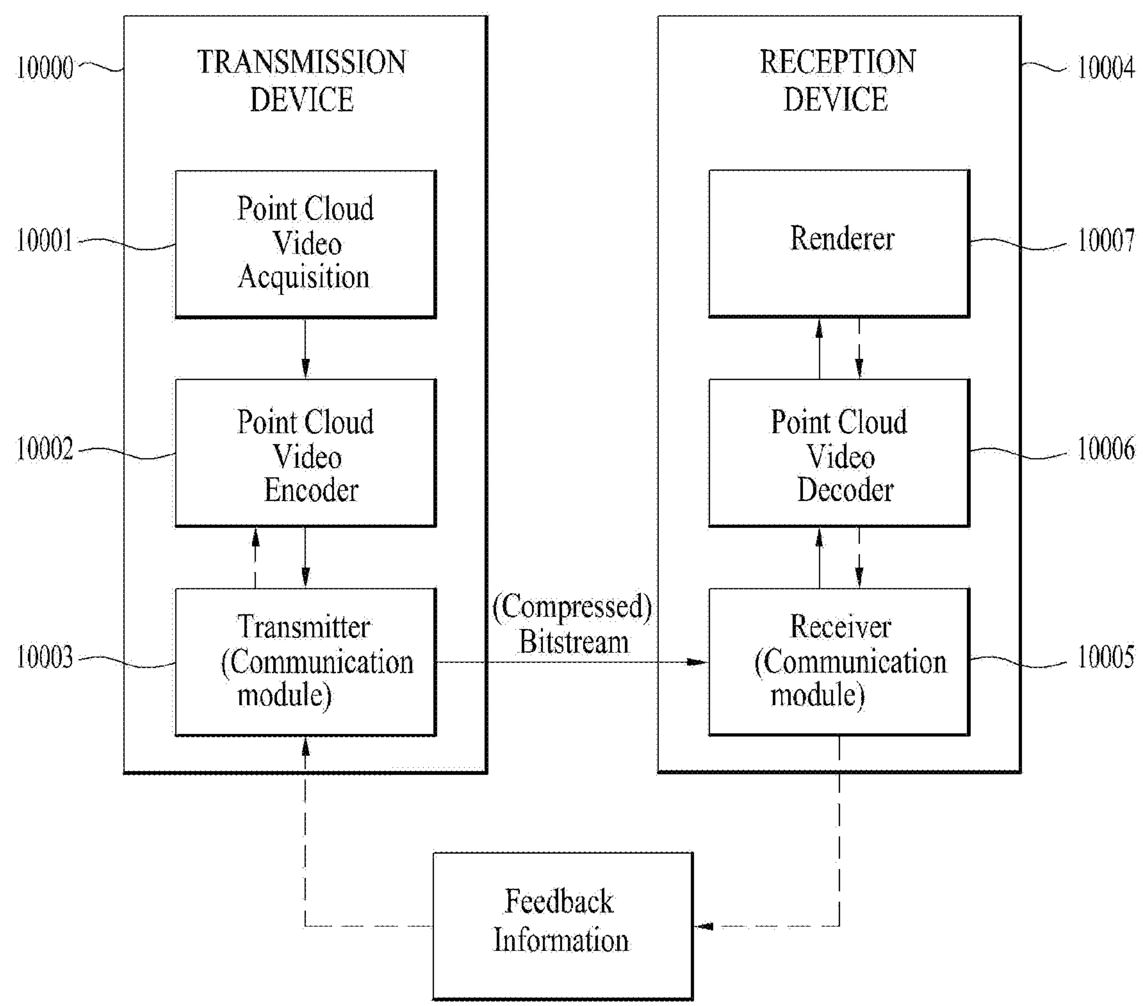
FIG. 1 shows an exemplary point cloud content providing system according to embodiments.

FIG. 1 shows an exemplary point cloud content providing system according to embodiments.

The point cloud content providing system illustrated in FIG. 1 may include a transmission device 10000 and a reception device 10004. The transmission device 10000 and the reception device 10004 are capable of wired or wireless communication to transmit and receive point cloud data.

The point cloud data transmission device 10000 according to the embodiments may secure and process point cloud video (or point cloud content) and transmit the same. According to embodiments, the transmission device 10000 may include a fixed station, a base transceiver system (BTS), a network, an artificial intelligence (AI) device and/or system, a robot, an AR/VR/XR device and/or server. According to embodiments, the transmission device 10000 may include a device, a robot, a vehicle, an AR/VR/XR device, a portable device, a home appliance, an Internet of Thing (IoT) device, and an AI device/server which are configured to perform communication with a base station and/or other wireless devices using a radio access technology (e.g., 5G New RAT (NR), Long Term Evolution (LTE)).

The transmission device 10000 according to the embodiments includes a point cloud video acquirer 10001, a point cloud video encoder 10002, and/or a transmitter (or communication module) 10003.

The point cloud video acquirer 10001 according to the embodiments acquires a point cloud video through a processing process such as capture, synthesis, or generation. The point cloud video is point cloud content represented by a point cloud, which is a set of points positioned in a 3D space, and may be referred to as point cloud video data. The point cloud video according to the embodiments may include one or more frames. One frame represents a still image/picture. Therefore, the point cloud video may include a point cloud image/frame/picture, and may be referred to as a point cloud image, frame, or picture.

The point cloud video encoder 10002 according to the embodiments encodes the acquired point cloud video data. The point cloud video encoder 10002 may encode the point cloud video data based on point cloud compression coding. The point cloud compression coding according to the embodiments may include geometry-based point cloud compression (G-PCC) coding and/or video-based point cloud compression (V-PCC) coding or next-generation coding. The point cloud compression coding according to the embodiments is not limited to the above-described embodiment. The point cloud video encoder 10002 may output a bitstream containing the encoded point cloud video data. The bitstream may contain not only the encoded point cloud video data, but also signaling information related to encoding of the point cloud video data.

The transmitter 10003 according to the embodiments transmits the bitstream containing the encoded point cloud video data. The bitstream according to the embodiments is encapsulated in a file or segment (for example, a streaming segment), and is transmitted over various networks such as a broadcasting network and/or a broadband network. Although not shown in the figure, the transmission device 10000 may include an encapsulator (or an encapsulation module) configured to perform an encapsulation operation. According to embodiments, the encapsulator may be included in the transmitter 10003. According to embodiments, the file or segment may be transmitted to the reception device 10004 over a network, or stored in a digital storage medium (e.g., USB, SD, CD, DVD, Blu-ray, HDD, SSD, etc.). The transmitter 10003 according to the embodiments is capable of wired/wireless communication with the reception device 10004 (or the receiver 10005) over a network of 4G, 5G, 6G, etc. In addition, the transmitter may perform a necessary data processing operation according to the network system (e.g., a 4G, 5G or 6G communication network system). The transmission device 10000 may transmit the encapsulated data in an on-demand manner.

The reception device 10004 according to the embodiments includes a receiver 10005, a point cloud video decoder 10006, and/or a renderer 10007. According to embodiments, the reception device 10004 may include a device, a robot, a vehicle, an AR/VR/XR device, a portable device, a home appliance, an Internet of Things (IoT) device, and an AI device/server which are configured to perform communication with a base station and/or other wireless devices using a radio access technology (e.g., 5G New RAT (NR), Long Term Evolution (LTE)).

The receiver 10005 according to the embodiments receives the bitstream containing the point cloud video data or the file/segment in which the bitstream is encapsulated from the network or storage medium. The receiver 10005 may perform necessary data processing according to the network system (for example, a communication network system of 4G, 5G, 6G, etc.). The receiver 10005 according to the embodiments may decapsulate the received file/segment and output a bitstream. According to embodiments, the receiver 10005 may include a decapsulator (or a decapsulation module) configured to perform a decapsulation operation. The decapsulator may be implemented as an element (or component) separate from the receiver 10005.

The point cloud video decoder 10006 decodes the bitstream containing the point cloud video data. The point cloud video decoder 10006 may decode the point cloud video data according to the method by which the point cloud video data is encoded (for example, in a reverse process of the operation of the point cloud video encoder 10002). Accordingly, the point cloud video decoder 10006 may decode the point cloud video data by performing point cloud decompression coding, which is the inverse process of the point cloud compression. The point cloud decompression coding includes G-PCC coding.

The renderer 10007 renders the decoded point cloud video data. The renderer 10007 may output point cloud content by rendering not only the point cloud video data but also audio data. According to embodiments, the renderer 10007 may include a display configured to display the point cloud content. According to embodiments, the display may be implemented as a separate device or component rather than being included in the renderer 10007.

The arrows indicated by dotted lines in the drawing represent a transmission path of feedback information acquired by the reception device 10004. The feedback information is information for reflecting interactivity with a user who consumes the point cloud content, and includes information about the user (e.g., head orientation information, viewport information, and the like). In particular, when the point cloud content is content for a service (e.g., self-driving service, etc.) that requires interaction with the user, the feedback information may be provided to the content transmitting side (e.g., the transmission device 10000) and/or the service provider. According to embodiments, the feedback information may be used in the reception device 10004 as well as the transmission device 10000, or may not be provided.

The head orientation information according to embodiments is information about the user's head position, orientation, angle, motion, and the like. The reception device 10004 according to the embodiments may calculate the viewport information based on the head orientation information. The viewport information may be information about a region of a point cloud video that the user is viewing. A viewpoint is a point through which the user is viewing the point cloud video, and may refer to a center point of the viewport region. That is, the viewport is a region centered on the viewpoint, and the size and shape of the region may be determined by a field of view (FOV). Accordingly, the reception device 10004 may extract the viewport information based on a vertical or horizontal FOV supported by the device in addition to the head orientation information. Also, the reception device 10004 performs gaze analysis or the like to check the way the user consumes a point cloud, a region that the user gazes at in the point cloud video, a gaze time, and the like. According to embodiments, the reception device 10004 may transmit feedback information including the result of the gaze analysis to the transmission device 10000. The feedback information according to the embodiments may be acquired in the rendering and/or display process. The feedback information according to the embodiments may be secured by one or more sensors included in the reception device 10004. According to embodiments, the feedback information may be secured by the renderer 10007 or a separate external element (or device, component, or the like). The dotted lines in FIG. 1 represent a process of transmitting the feedback information secured by the renderer 10007. The point cloud content providing system may process (encode/decode) point cloud data based on the feedback information. Accordingly, the point cloud video data decoder 10006 may perform a decoding operation based on the feedback information. The reception device 10004 may transmit the feedback information to the transmission device 10000. The transmission device 10000 (or the point cloud video data encoder 10002) may perform an encoding operation based on the feedback information. Accordingly, the point cloud content providing system may efficiently process necessary data (e.g., point cloud data corresponding to the user's head position) based on the feedback information rather than processing (encoding/decoding) the entire point cloud data, and provide point cloud content to the user.

According to embodiments, the transmission device 10000 may be called an encoder, a transmitting device, a transmitter, or the like, and the reception device 10004 may be called a decoder, a receiving device, a receiver, or the like.

The point cloud data processed in the point cloud content providing system of FIG. 1 according to embodiments (through a series of processes of acquisition/encoding/transmission/decoding/rendering) may be referred to as point cloud content data or point cloud video data. According to embodiments, the point cloud content data may be used as a concept covering metadata or signaling information related to the point cloud data.

The elements of the point cloud content providing system illustrated in FIG. 1 may be implemented by hardware, software, a processor, and/or a combination thereof.

Figure 2:
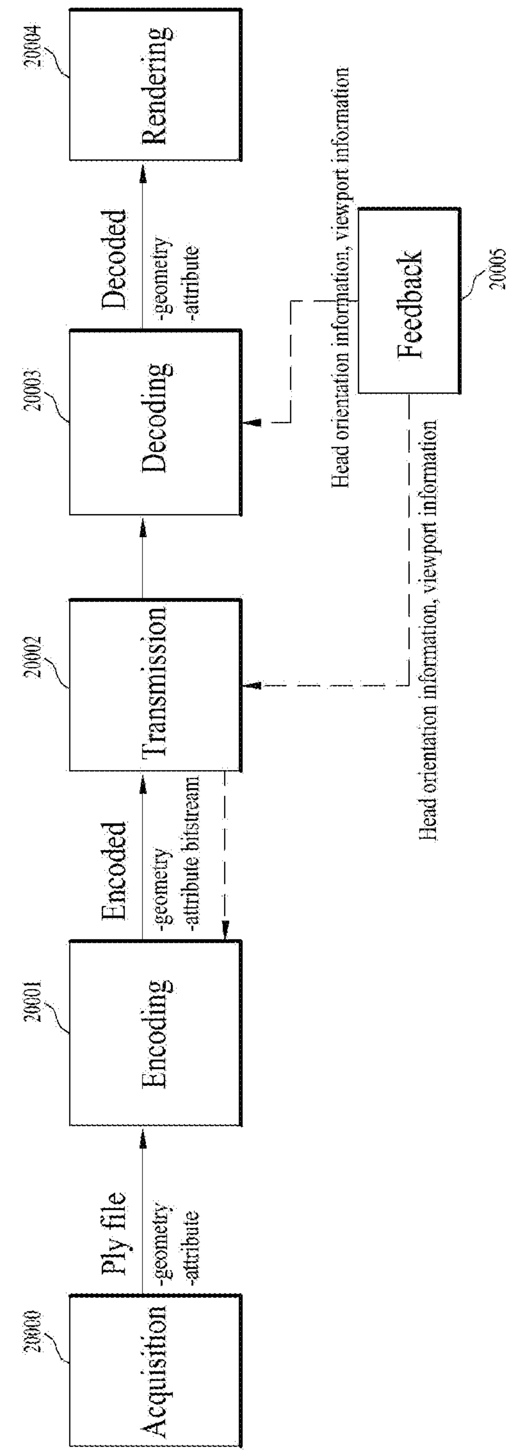
FIG. 2 is a block diagram illustrating a point cloud content providing operation according to embodiments.

FIG. 2 is a block diagram illustrating a point cloud content providing operation according to embodiments.

The block diagram of FIG. 2 shows the operation of the point cloud content providing system described in FIG. 1. As described above, the point cloud content providing system may process point cloud data based on point cloud compression coding (e.g., G-PCC).

The point cloud content providing system according to the embodiments (for example, the point cloud transmission device 10000 or the point cloud video acquirer 10001) may acquire a point cloud video (20000). The point cloud video is represented by a point cloud belonging to a coordinate system for expressing a 3D space. The point cloud video according to the embodiments may include a Ply (Polygon File format or the Stanford Triangle format) file. When the point cloud video has one or more frames, the acquired point cloud video may include one or more Ply files. The Ply files contain point cloud data, such as point geometry and/or attributes. The geometry includes positions of points. The position of each point may be represented by parameters (for example, values of the X, Y, and Z axes) representing a three-dimensional coordinate system (e.g., a coordinate system composed of X, Y and Z axes). The attributes include attributes of points (e.g., information about texture, color (in YCbCr or RGB), reflectance r, transparency, etc. of each point). A point has one or more attributes. For example, a point may have an attribute that is a color, or two attributes that are color and reflectance. According to embodiments, the geometry may be called positions, geometry information, geometry data, or the like, and the attribute may be called attributes, attribute information, attribute data, or the like. The point cloud content providing system (for example, the point cloud transmission device 10000 or the point cloud video acquirer 10001) may secure point cloud data from information (e.g., depth information, color information, etc.) related to the acquisition process of the point cloud video.

The point cloud content providing system (for example, the transmission device 10000 or the point cloud video encoder 10002) according to the embodiments may encode the point cloud data (20001). The point cloud content providing system may encode the point cloud data based on point cloud compression coding. As described above, the point cloud data may include the geometry and attributes of a point. Accordingly, the point cloud content providing system may perform geometry encoding of encoding the geometry and output a geometry bitstream. The point cloud content providing system may perform attribute encoding of encoding attributes and output an attribute bitstream. According to embodiments, the point cloud content providing system may perform the attribute encoding based on the geometry encoding. The geometry bitstream and the attribute bitstream according to the embodiments may be multiplexed and output as one bitstream. The bitstream according to the embodiments may further contain signaling information related to the geometry encoding and attribute encoding.

The point cloud content providing system (for example, the transmission device 10000 or the transmitter 10003) according to the embodiments may transmit the encoded point cloud data (20002). As illustrated in FIG. 1, the encoded point cloud data may be represented by a geometry bitstream and an attribute bitstream. In addition, the encoded point cloud data may be transmitted in the form of a bitstream together with signaling information related to encoding of the point cloud data (for example, signaling information related to the geometry encoding and the attribute encoding). The point cloud content providing system may encapsulate a bitstream that carries the encoded point cloud data and transmit the same in the form of a file or segment.

The point cloud content providing system (for example, the reception device 10004 or the receiver 10005) according to the embodiments may receive the bitstream containing the encoded point cloud data. In addition, the point cloud content providing system (for example, the reception device 10004 or the receiver 10005) may demultiplex the bitstream.

The point cloud content providing system (e.g., the reception device 10004 or the point cloud video decoder 10005) may decode the encoded point cloud data (e.g., the geometry bitstream, the attribute bitstream) transmitted in the bitstream. The point cloud content providing system (for example, the reception device 10004 or the point cloud video decoder 10005) may decode the point cloud video data based on the signaling information related to encoding of the point cloud video data contained in the bitstream. The point cloud content providing system (for example, the reception device 10004 or the point cloud video decoder 10005) may decode the geometry bitstream to reconstruct the positions (geometry) of points. The point cloud content providing system may reconstruct the attributes of the points by decoding the attribute bitstream based on the reconstructed geometry. The point cloud content providing system (for example, the reception device 10004 or the point cloud video decoder 10005) may reconstruct the point cloud video based on the positions according to the reconstructed geometry and the decoded attributes.

The point cloud content providing system according to the embodiments (for example, the reception device 10004 or the renderer 10007) may render the decoded point cloud data (20004). The point cloud content providing system (for example, the reception device 10004 or the renderer 10007) may render the geometry and attributes decoded through the decoding process, using various rendering methods. Points in the point cloud content may be rendered to a vertex having a certain thickness, a cube having a specific minimum size centered on the corresponding vertex position, or a circle centered on the corresponding vertex position. All or part of the rendered point cloud content is provided to the user through a display (e.g., a VR/AR display, a general display, etc.).

The point cloud content providing system (for example, the reception device 10004) according to the embodiments may secure feedback information (20005). The point cloud content providing system may encode and/or decode point cloud data based on the feedback information. The feedback information and the operation of the point cloud content providing system according to the embodiments are the same as the feedback information and the operation described with reference to FIG. 1, and thus detailed description thereof is omitted.

Figure 3:
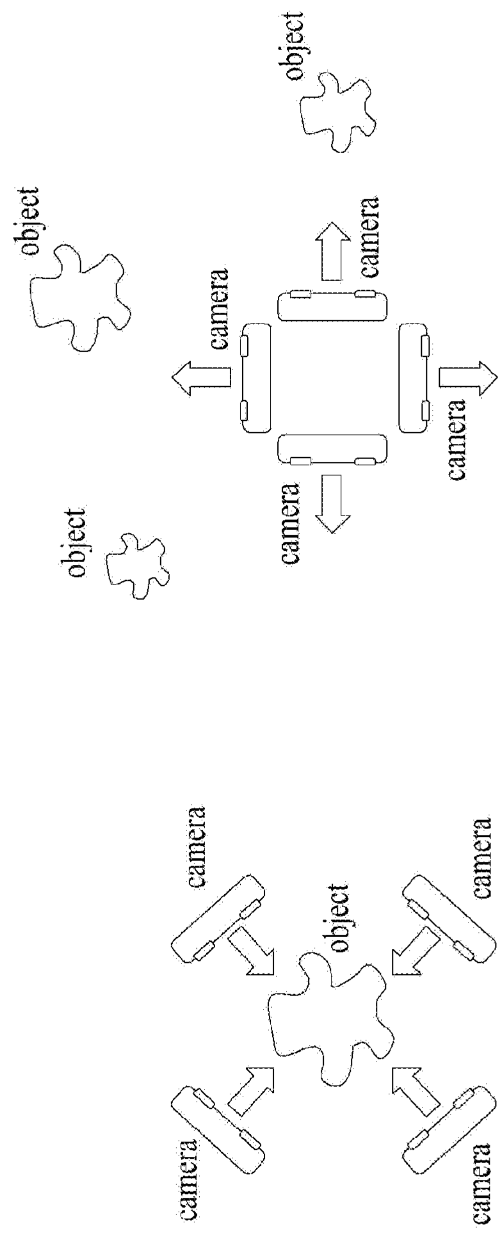
FIG. 3 illustrates an exemplary process of capturing a point cloud video according to embodiments.

FIG. 3 illustrates an exemplary process of capturing a point cloud video according to embodiments.

FIG. 3 illustrates an exemplary point cloud video capture process of the point cloud content providing system described with reference to FIGS. 1 to 2.

Point cloud content includes a point cloud video (images and/or videos) representing an object and/or environment located in various 3D spaces (e.g., a 3D space representing a real environment, a 3D space representing a virtual environment, etc.). Accordingly, the point cloud content providing system according to the embodiments may capture a point cloud video using one or more cameras (e.g., an infrared camera capable of securing depth information, an RGB camera capable of extracting color information corresponding to the depth information, etc.), a projector (e.g., an infrared pattern projector to secure depth information), a LiDAR, or the like. The point cloud content providing system according to the embodiments may extract the shape of geometry composed of points in a 3D space from the depth information and extract the attributes of each point from the color information to secure point cloud data. An image and/or video according to the embodiments may be captured based on at least one of the inward-facing technique and the outward-facing technique.

The left part of FIG. 3 illustrates the inward-facing technique. The inward-facing technique refers to a technique of capturing images a central object with one or more cameras (or camera sensors) positioned around the central object. The inward-facing technique may be used to generate point cloud content providing a 360-degree image of a key object to the user (e.g., VR/AR content providing a 360-degree image of an object (e.g., a key object such as a character, player, object, or actor) to the user).

The right part of FIG. 3 illustrates the outward-facing technique. The outward-facing technique refers to a technique of capturing images an environment of a central object rather than the central object with one or more cameras (or camera sensors) positioned around the central object. The outward-facing technique may be used to generate point cloud content for providing a surrounding environment that appears from the user's point of view (e.g., content representing an external environment that may be provided to a user of a self-driving vehicle).

As shown in the figure, the point cloud content may be generated based on the capturing operation of one or more cameras. In this case, the coordinate system may differ among the cameras, and accordingly the point cloud content providing system may calibrate one or more cameras to set a global coordinate system before the capturing operation. In addition, the point cloud content providing system may generate point cloud content by synthesizing an arbitrary image and/or video with an image and/or video captured by the above-described capture technique. The point cloud content providing system may not perform the capturing operation described in FIG. 3 when it generates point cloud content representing a virtual space. The point cloud content providing system according to the embodiments may perform post-processing on the captured image and/or video. In other words, the point cloud content providing system may remove an unwanted area (for example, a background), recognize a space to which the captured images and/or videos are connected, and, when there is a spatial hole, perform an operation of filling the spatial hole.

The point cloud content providing system may generate one piece of point cloud content by performing coordinate transformation on points of the point cloud video secured from each camera. The point cloud content providing system may perform coordinate transformation on the points based on the coordinates of the position of each camera. Accordingly, the point cloud content providing system may generate content representing one wide range, or may generate point cloud content having a high density of points.

Figure 4:
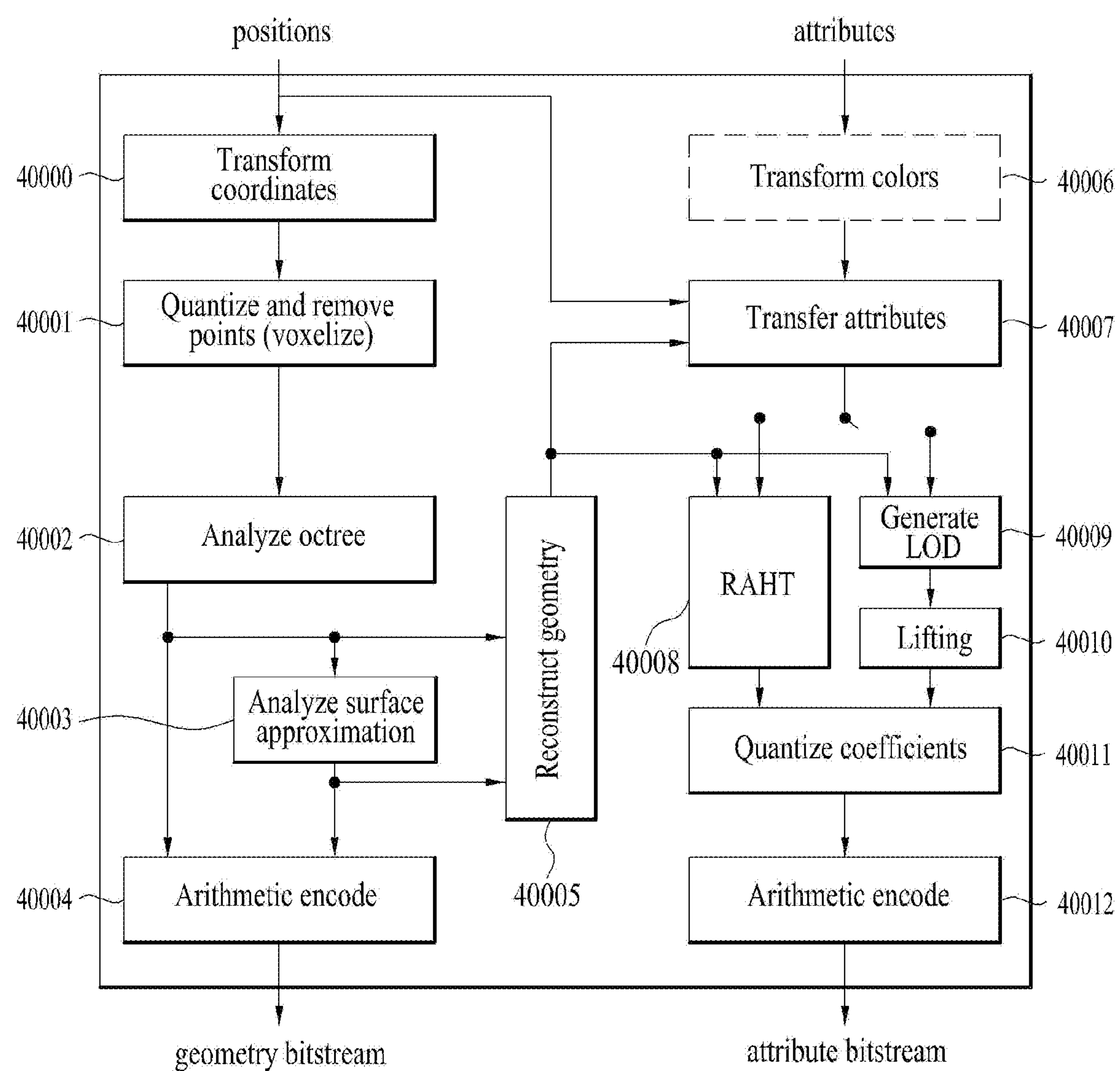
FIG. 4 illustrates an exemplary point cloud encoder according to embodiments.

FIG. 4 illustrates an exemplary point cloud encoder according to embodiments.

FIG. 4 shows an example of the point cloud video encoder 10002 of FIG. 1. The point cloud encoder reconstructs and encodes point cloud data (e.g., positions and/or attributes of the points) to adjust the quality of the point cloud content (to, for example, lossless, lossy, or near-lossless) according to the network condition or applications. When the overall size of the point cloud content is large (e.g., point cloud content of 60 Gbps is given for 30 fps), the point cloud content providing system may fail to stream the content in real time. Accordingly, the point cloud content providing system may reconstruct the point cloud content based on the maximum target bitrate to provide the same in accordance with the network environment or the like.

As described with reference to FIGS. 1 to 2, the point cloud encoder may perform geometry encoding and attribute encoding. The geometry encoding is performed before the attribute encoding.

The point cloud encoder according to the embodiments includes a coordinate transformer (Transform coordinates) 40000, a quantizer (Quantize and remove points (voxelize)) 40001, an octree analyzer (Analyze octree) 40002, and a surface approximation analyzer (Analyze surface approximation) 40003, an arithmetic encoder (Arithmetic encode) 40004, a geometric reconstructor (Reconstruct geometry) 40005, a color transformer (Transform colors) 40006, an attribute transformer (Transform attributes) 40007, a RAHT transformer (RAHT) 40008, an LOD generator (Generate LOD) 40009, a lifting transformer (Lifting) 40010, a coefficient quantizer (Quantize coefficients) 40011, and/or an arithmetic encoder (Arithmetic encode) 40012.

The coordinate transformer 40000, the quantizer 40001, the octree analyzer 40002, the surface approximation analyzer 40003, the arithmetic encoder 40004, and the geometry reconstructor 40005 may perform geometry encoding. The geometry encoding according to the embodiments may include octree geometry coding, direct coding, trisoup geometry encoding, and entropy encoding. The direct coding and trisoup geometry encoding are applied selectively or in combination. The geometry encoding is not limited to the above-described example.

As shown in the figure, the coordinate transformer 40000 according to the embodiments receives positions and transforms the same into coordinates. For example, the positions may be transformed into position information in a three-dimensional space (for example, a three-dimensional space represented by an XYZ coordinate system). The position information in the three-dimensional space according to the embodiments may be referred to as geometry information.

The quantizer 40001 according to the embodiments quantizes the geometry. For example, the quantizer 40001 may quantize the points based on a minimum position value of all points (for example, a minimum value on each of the X, Y, and Z axes). The quantizer 40001 performs a quantization operation of multiplying the difference between the minimum position value and the position value of each point by a preset quantization scale value and then finding the nearest integer value by rounding the value obtained through the multiplication. Thus, one or more points may have the same quantized position (or position value). The quantizer 40001 according to the embodiments performs voxelization based on the quantized positions to reconstruct quantized points. As in the case of a pixel, which is the minimum unit containing 2D image/video information, points of point cloud content (or 3D point cloud video) according to the embodiments may be included in one or more voxels. The term voxel, which is a compound of volume and pixel, refers to a 3D cubic space generated when a 3D space is divided into units (unit=1.0) based on the axes representing the 3D space (e.g., X-axis, Y-axis, and Z-axis). The quantizer 40001 may match groups of points in the 3D space with voxels. According to embodiments, one voxel may include only one point. According to embodiments, one voxel may include one or more points. In order to express one voxel as one point, the position of the center of a voxel may be set based on the positions of one or more points included in the voxel. In this case, attributes of all positions included in one voxel may be combined and assigned to the voxel.

The octree analyzer 40002 according to the embodiments performs octree geometry coding (or octree coding) to present voxels in an octree structure. The octree structure represents points matched with voxels, based on the octal tree structure.

The surface approximation analyzer 40003 according to the embodiments may analyze and approximate the octree. The octree analysis and approximation according to the embodiments is a process of analyzing a region containing a plurality of points to efficiently provide octree and voxelization.

The arithmetic encoder 40004 according to the embodiments performs entropy encoding on the octree and/or the approximated octree. For example, the encoding scheme includes arithmetic encoding. As a result of the encoding, a geometry bitstream is generated.

The color transformer 40006, the attribute transformer 40007, the RAHT transformer 40008, the LOD generator 40009, the lifting transformer 40010, the coefficient quantizer 40011, and/or the arithmetic encoder 40012 perform attribute encoding. As described above, one point may have one or more attributes. The attribute encoding according to the embodiments is equally applied to the attributes that one point has. However, when an attribute (e.g., color) includes one or more elements, attribute encoding is independently applied to each element. The attribute encoding according to the embodiments includes color transform coding, attribute transform coding, region adaptive hierarchical transform (RAHT) coding, interpolation-based hierarchical nearest-neighbor prediction (prediction transform) coding, and interpolation-based hierarchical nearest-neighbor prediction with an update/lifting step (lifting transform) coding. Depending on the point cloud content, the RAHT coding, the prediction transform coding and the lifting transform coding described above may be selectively used, or a combination of one or more of the coding schemes may be used. The attribute encoding according to the embodiments is not limited to the above-described example.

The color transformer 40006 according to the embodiments performs color transform coding of transforming color values (or textures) included in the attributes. For example, the color transformer 40006 may transform the format of color information (for example, from RGB to YCbCr). The operation of the color transformer 40006 according to embodiments may be optionally applied according to the color values included in the attributes.

The geometry reconstructor 40005 according to the embodiments reconstructs (decompresses) the octree and/or the approximated octree. The geometry reconstructor 40005 reconstructs the octree/voxels based on the result of analyzing the distribution of points. The reconstructed octree/voxels may be referred to as reconstructed geometry (restored geometry).

The attribute transformer 40007 according to the embodiments performs attribute transformation to transform the attributes based on the reconstructed geometry and/or the positions on which geometry encoding is not performed. As described above, since the attributes are dependent on the geometry, the attribute transformer 40007 may transform the attributes based on the reconstructed geometry information. For example, based on the position value of a point included in a voxel, the attribute transformer 40007 may transform the attribute of the point at the position. As described above, when the position of the center of a voxel is set based on the positions of one or more points included in the voxel, the attribute transformer 40007 transforms the attributes of the one or more points. When the trisoup geometry encoding is performed, the attribute transformer 40007 may transform the attributes based on the trisoup geometry encoding.

The attribute transformer 40007 may perform the attribute transformation by calculating the average of attributes or attribute values of neighboring points (e.g., color or reflectance of each point) within a specific position/radius from the position (or position value) of the center of each voxel. The attribute transformer 40007 may apply a weight according to the distance from the center to each point in calculating the average. Accordingly, each voxel has a position and a calculated attribute (or attribute value).

The attribute transformer 40007 may search for neighboring points existing within a specific position/radius from the position of the center of each voxel based on the K-D tree or the Morton code. The K-D tree is a binary search tree and supports a data structure capable of managing points based on the positions such that nearest neighbor search (NNS) can be performed quickly. The Morton code is generated by presenting coordinates (e.g., (x, y, z)) representing 3D positions of all points as bit values and mixing the bits. For example, when the coordinates representing the position of a point are (5, 9, 1), the bit values for the coordinates are (0101, 1001, 0001). Mixing the bit values according to the bit index in order of z, y, and x yields 010001000111. This value is expressed as a decimal number of 1095. That is, the Morton code value of the point having coordinates (5, 9, 1) is 1095. The attribute transformer 40007 may order the points based on the Morton code values and perform NNS through a depth-first traversal process. After the attribute transformation operation, the K-D tree or the Morton code is used when the NNS is needed in another transformation process for attribute coding.

As shown in the figure, the transformed attributes are input to the RAHT transformer 40008 and/or the LOD generator 40009.

The RAHT transformer 40008 according to the embodiments performs RAHT coding for predicting attribute information based on the reconstructed geometry information. For example, the RAHT transformer 40008 may predict attribute information of a node at a higher level in the octree based on the attribute information associated with a node at a lower level in the octree.

The LOD generator 40009 according to the embodiments generates a level of detail (LOD) to perform prediction transform coding. The LOD according to the embodiments is a degree of detail of point cloud content. As the LOD value decrease, it indicates that the detail of the point cloud content is degraded. As the LOD value increases, it indicates that the detail of the point cloud content is enhanced. Points may be classified by the LOD.

The lifting transformer 40010 according to the embodiments performs lifting transform coding of transforming the attributes a point cloud based on weights. As described above, lifting transform coding may be optionally applied.

The coefficient quantizer 40011 according to the embodiments quantizes the attribute-coded attributes based on coefficients.

The arithmetic encoder 40012 according to the embodiments encodes the quantized attributes based on arithmetic coding.

Although not shown in the figure, the elements of the point cloud encoder of FIG. 4 may be implemented by hardware including one or more processors or integrated circuits configured to communicate with one or more memories included in the point cloud providing apparatus, software, firmware, or a combination thereof. The one or more processors may perform at least one of the operations and/or functions of the elements of the point cloud encoder of FIG. 4 described above. Additionally, the one or more processors may operate or execute a set of software programs and/or instructions for performing the operations and/or functions of the elements of the point cloud encoder of FIG. 4. The one or more memories according to the embodiments may include a high speed random access memory, or include a non-volatile memory (e.g., one or more magnetic disk storage devices, flash memory devices, or other non-volatile solid-state memory devices).

Figure 5:
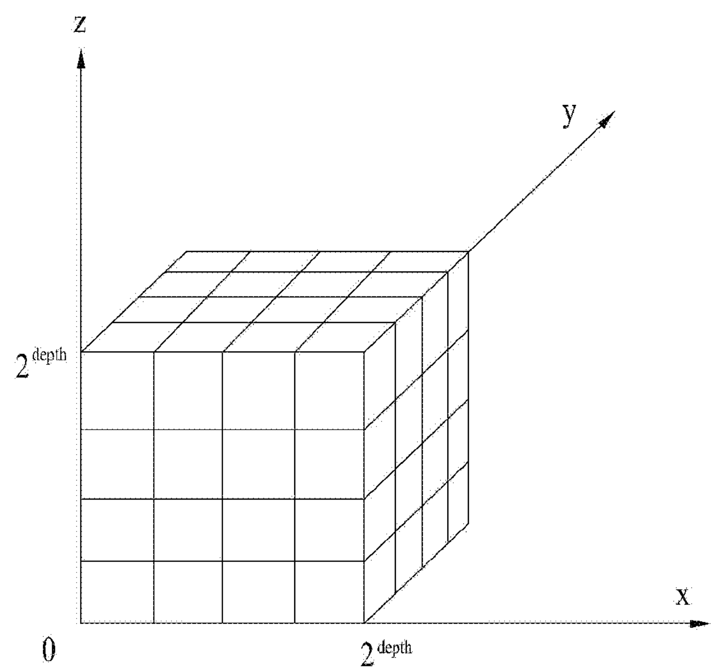
FIG. 5 shows an example of voxels according to embodiments.

FIG. 5 shows an example of voxels according to embodiments.

FIG. 5 shows voxels positioned in a 3D space represented by a coordinate system composed of three axes, which are the X-axis, the Y-axis, and the Z-axis. As described with reference to FIG. 4, the point cloud encoder (e.g., the quantizer 40001) may perform voxelization. Voxel refers to a 3D cubic space generated when a 3D space is divided into units (unit=1.0) based on the axes representing the 3D space (e.g., X-axis, Y-axis, and Z-axis). FIG. 5 shows an example of voxels generated through an octree structure in which a cubical axis-aligned bounding box defined by two poles (0, 0, 0) and ($2^d$, $2^d$, $2^d$) is recursively subdivided. One voxel includes at least one point. The spatial coordinates of a voxel may be estimated from the positional relationship with a voxel group. As described above, a voxel has an attribute (such as color or reflectance) like pixels of a 2D image/video. The details of the voxel are the same as those described with reference to FIG. 4, and therefore a description thereof is omitted.

FIG. 6 shows an example of an octree and occupancy code according to embodiments.

As described with reference to FIGS. 1 to 4, the point cloud content providing system (point cloud video encoder 10002) or the point cloud encoder (for example, the octree analyzer 40002) performs octree geometry coding (or octree coding) based on an octree structure to efficiently manage the region and/or position of the voxel.

The upper part of FIG. 6 shows an octree structure. The 3D space of the point cloud content according to the embodiments is represented by axes (e.g., X-axis, Y-axis, and Z-axis) of the coordinate system. The octree structure is created by recursive subdividing of a cubical axis-aligned bounding box defined by two poles (0, 0, 0) and $(2^d, 2^d, 2^d)$. Here, $2^d$ may be set to a value constituting the smallest bounding box surrounding all points of the point cloud content (or point cloud video). Here, d denotes the depth of the octree. The value of d is determined in the following equation. In the following equation, $(x^{int}_n, y^{int}_n, z^{int}_n)$ denotes the positions (or position values) of quantized points.

$$d-\mathrm{Ceil}(\mathrm{Log2}(\mathrm{Max}(x_n^{int}, y_n^{int}, z_n^{int}, n-1, \ldots, N)+1))$$

As shown in the middle of the upper part of FIG. 6, the entire 3D space may be divided into eight spaces according to partition. Each divided space is represented by a cube with six faces. As shown in the upper right of FIG. 6, each of the eight spaces is divided again based on the axes of the coordinate system (e.g., X-axis, Y-axis, and Z-axis). Accordingly, each space is divided into eight smaller spaces. The divided smaller space is also represented by a cube with six faces. This partitioning scheme is applied until the leaf node of the octree becomes a voxel.

The lower part of FIG. 6 shows an octree occupancy code. The occupancy code of the octree is generated to indicate whether each of the eight divided spaces generated by dividing one space contains at least one point. Accordingly, a single occupancy code is represented by eight child nodes. Each child node represents the occupancy of a divided space, and the child node has a value in 1 bit. Accordingly, the occupancy code is represented as an 8-bit code. That is, when at least one point is contained in the space corresponding to a child node, the node is assigned a value of 1. When no point is contained in the space corresponding to the child node (the space is empty), the node is assigned a value of 0. Since the occupancy code shown in FIG. 6 is 00100001, it indicates that the spaces corresponding to the third child node and the eighth child node among the eight child nodes each contain at least one point. As shown in the figure, each of the third child node and the eighth child node has eight child nodes, and the child nodes are represented by an 8-bit occupancy code. The figure shows that the occupancy code of the third child node is 10000111, and the occupancy code of the eighth child node is 01001111. The point cloud encoder (for example, the arithmetic encoder 40004) according to the embodiments may perform entropy encoding on the occupancy codes. In order to increase the compression efficiency, the point cloud encoder may perform intra/inter-coding on the occupancy codes. The reception device (for example, the reception device 10004 or the point cloud video decoder 10006) according to the embodiments reconstructs the octree based on the occupancy codes.

The point cloud encoder (for example, the point cloud encoder of FIG. 4 or the octree analyzer 40002) according to the embodiments may perform voxelization and octree coding to store the positions of points. However, points are not always evenly distributed in the 3D space, and accordingly there may be a specific region in which fewer points are present. Accordingly, it is inefficient to perform voxelization for the entire 3D space. For example, when a specific region contains few points, voxelization does not need to be performed in the specific region.

Accordingly, for the above-described specific region (or a node other than the leaf node of the octree), the point cloud encoder according to the embodiments may skip voxelization and perform direct coding to directly code the positions of points included in the specific region. The coordinates of a direct coding point according to the embodiments are referred to as direct coding mode (DCM). The point cloud encoder according to the embodiments may also perform trisoup geometry encoding, which is to reconstruct the positions of the points in the specific region (or node) based on voxels, based on a surface model. The trisoup geometry encoding is geometry encoding that represents an object as a series of triangular meshes. Accordingly, the point cloud decoder may generate a point cloud from the mesh surface. The direct coding and trisoup geometry encoding according to the embodiments may be selectively performed. In addition, the direct coding and trisoup geometry encoding according to the embodiments may be performed in combination with octree geometry coding (or octree coding).

To perform direct coding, the option to use the direct mode for applying direct coding should be activated. A node to which direct coding is to be applied is not a leaf node, and points less than a threshold should be present within a specific node. In addition, the total number of points to which direct coding is to be applied should not exceed a preset threshold. When the conditions above are satisfied, the point cloud encoder (or the arithmetic encoder 40004) according to the embodiments may perform entropy coding on the positions (or position values) of the points.

The point cloud encoder (for example, the surface approximation analyzer 40003) according to the embodiments may determine a specific level of the octree (a level less than the depth d of the octree), and the surface model may be used staring with that level to perform trisoup geometry encoding to reconstruct the positions of points in the region of the node based on voxels (Trisoup mode). The point cloud encoder according to the embodiments may specify a level at which trisoup geometry encoding is to be applied. For example, when the specific level is equal to the depth of the octree, the point cloud encoder does not operate in the trisoup mode. In other words, the point cloud encoder according to the embodiments may operate in the trisoup mode only when the specified level is less than the value of depth of the octree. The 3D cube region of the nodes at the specified level according to the embodiments is called a block. One block may include one or more voxels. The block or voxel may correspond to a brick. Geometry is represented as a surface within each block. The surface according to embodiments may intersect with each edge of a block at most once.

One block has 12 edges, and accordingly there are at least 12 intersections in one block. Each intersection is called a vertex (or apex). A vertex present along an edge is detected when there is at least one occupied voxel adjacent to the edge among all blocks sharing the edge. The occupied voxel according to the embodiments refers to a voxel containing a point. The position of the vertex detected along the edge is the average position along the edge of all voxels adjacent to the edge among all blocks sharing the edge.

Once the vertex is detected, the point cloud encoder according to the embodiments may perform entropy encoding on the starting point (x, y, z) of the edge, the direction vector (Δx, Δy, Δz) of the edge, and the vertex position value (relative position value within the edge). When the trisoup geometry encoding is applied, the point cloud encoder according to the embodiments (for example, the geometry reconstructor 40005) may generate restored geometry (reconstructed geometry) by performing the triangle reconstruction, up-sampling, and voxelization processes.

The vertices positioned at the edge of the block determine a surface that passes through the block. The surface according to the embodiments is a non-planar polygon. In the triangle reconstruction process, a surface represented by a triangle is reconstructed based on the starting point of the edge, the direction vector of the edge, and the position values of the vertices. The triangle reconstruction process is performed by: i) calculating the centroid value of each vertex, ii) subtracting the center value from each vertex value, and iii) estimating the sum of the squares of the values obtained by the subtraction.

$$i)\ \begin{bmatrix} \mu_x \\ \mu_y \\ \mu_z \end{bmatrix} = \frac{1}{n}\sum_{i=1}^{n}\begin{bmatrix} x_i \\ y_i \\ z_i \end{bmatrix};$$

$$ii)\ \begin{bmatrix} \bar{x}_i \\ \bar{y}_i \\ \bar{z}_i \end{bmatrix} = \begin{bmatrix} x_i \\ y_i \\ z_i \end{bmatrix} - \begin{bmatrix} \mu_x \\ \mu_y \\ \mu_z \end{bmatrix};$$

$$iii)\ \begin{bmatrix} \sigma_x^2 \\ \sigma_y^2 \\ \sigma_z^2 \end{bmatrix} = \sum_{i=1}^{n}\begin{bmatrix} \bar{x}_i^2 \\ \bar{y}_i^2 \\ \bar{z}_i^2 \end{bmatrix}$$

The minimum value of the sum is estimated, and the projection process is performed according to the axis with the minimum value. For example, when the element x is the minimum, each vertex is projected on the x-axis with respect to the center of the block, and projected on the (y, z) plane. When the values obtained through projection on the (y, z) plane are (ai, bi), the value of θ is estimated through atan2(bi, ai), and the vertices are ordered based on the value of θ. The table below shows a combination of vertices for creating a triangle according to the number of the vertices. The vertices are ordered from 1 to n. The table below shows that for four vertices, two triangles may be constructed according to combinations of vertices. The first triangle may consist of vertices 1, 2, and 3 among the ordered vertices, and the second triangle may consist of vertices 3, 4, and 1 among the ordered vertices.

TABLE 2-1

| Triangles formed from vertices ordered 1, . . . , n | |
|---|---|
| n | triangles |
| 3 | (1, 2, 3) |
| 4 | (1, 2, 3), (3, 4, 1) |
| 5 | (1, 2, 3), (3, 4, 5), (5, 1, 3) |
| 6 | (1, 2, 3), (3, 4, 5), (5, 6, 1), (1, 3, 5) |
| 7 | (1, 2, 3), (3, 4, 5), (5, 6, 7), (7, 1, 3), (3, 5, 7) |
| 8 | (1, 2, 3), (3, 4, 5), (5, 6, 7), (7, 8, 1), (1, 3, 5), (5, 7, 1) |
| 9 | (1, 2, 3), (3, 4, 5), (5, 6, 7), (7, 8, 9), (9, 1, 3), (3, 5, 7), (7, 9, 3) |
| 10 | (1, 2, 3), (3, 4, 5), (5, 6, 7), (7, 8, 9), (9, 10, 1), (1, 3, 5), (5, 7, 9), (9, 1, 5) |

TABLE 2-1-continued

| Triangles formed from vertices ordered 1, . . . , n | |
|---|---|
| n | triangles |
| 11 | (1, 2, 3), (3, 4, 5), (5, 6, 7), (7, 8, 9), (9, 10, 11), (11, 1, 3), (3, 5, 7), (7, 9, 11), (11, 3, 7) |
| 12 | (1, 2, 3), (3, 4, 5), (5, 6, 7), (7, 8, 9), (9, 10, 11), (11, 12, 1), (1, 3, 5), (5, 7, 9), (9, 11, 1), (1, 5, 9) |

The upsampling process is performed to add points in the middle along the edge of the triangle and perform voxelization. The added points are generated based on the upsampling factor and the width of the block. The added points are called refined vertices. The point cloud encoder according to the embodiments may voxelize the refined vertices. In addition, the point cloud encoder may perform attribute encoding based on the voxelized positions (or position values).

FIG. 7 shows an example of a neighbor node pattern according to embodiments.

In order to increase the compression efficiency of the point cloud video, the point cloud encoder according to the embodiments may perform entropy coding based on context adaptive arithmetic coding.

As described with reference to FIGS. 1 to 6, the point cloud content providing system or the point cloud encoder (for example, the point cloud video encoder 10002, the point cloud encoder or arithmetic encoder 40004 of FIG. 4) may perform entropy coding on the occupancy code immediately. In addition, the point cloud content providing system or the point cloud encoder may perform entropy encoding (intra encoding) based on the occupancy code of the current node and the occupancy of neighboring nodes, or perform entropy encoding (inter encoding) based on the occupancy code of the previous frame. A frame according to embodiments represents a set of point cloud videos generated at the same time. The compression efficiency of intra encoding/inter encoding according to the embodiments may depend on the number of neighboring nodes that are referenced. When the bits increase, the operation becomes complicated, but the encoding may be biased to one side, which may increase the compression efficiency. For example, when a 3-bit context is given, coding needs to be performed using 23=8 methods. The part divided for coding affects the complexity of implementation. Accordingly, it is necessary to meet an appropriate level of compression efficiency and complexity.

FIG. 7 illustrates a process of obtaining an occupancy pattern based on the occupancy of neighbor nodes. The point cloud encoder according to the embodiments determines occupancy of neighbor nodes of each node of the octree and obtains a value of a neighbor pattern. The neighbor node pattern is used to infer the occupancy pattern of the node. The up part of FIG. 7 shows a cube corresponding to a node (a cube positioned in the middle) and six cubes (neighbor nodes) sharing at least one face with the cube. The nodes shown in the figure are nodes of the same depth. The numbers shown in the figure represent weights (1, 2, 4, 8, 16, and 32) associated with the six nodes, respectively. The weights are assigned sequentially according to the positions of neighboring nodes.

The down part of FIG. 7 shows neighbor node pattern values. A neighbor node pattern value is the sum of values multiplied by the weight of an occupied neighbor node (a neighbor node having a point). Accordingly, the neighbor node pattern values are 0 to 63. When the neighbor node pattern value is 0, it indicates that there is no node having a point (no occupied node) among the neighbor nodes of the node. When the neighbor node pattern value is 63, it indicates that all neighbor nodes are occupied nodes. As shown in the figure, since neighbor nodes to which weights 1, 2, 4, and 8 are assigned are occupied nodes, the neighbor node pattern value is 15, the sum of 1, 2, 4, and 8. The point cloud encoder may perform coding according to the neighbor node pattern value (for example, when the neighbor node pattern value is 63, 64 kinds of coding may be performed). According to embodiments, the point cloud encoder may reduce coding complexity by changing a neighbor node pattern value (for example, based on a table by which 64 is changed to 10 or 6).

Figure 8:
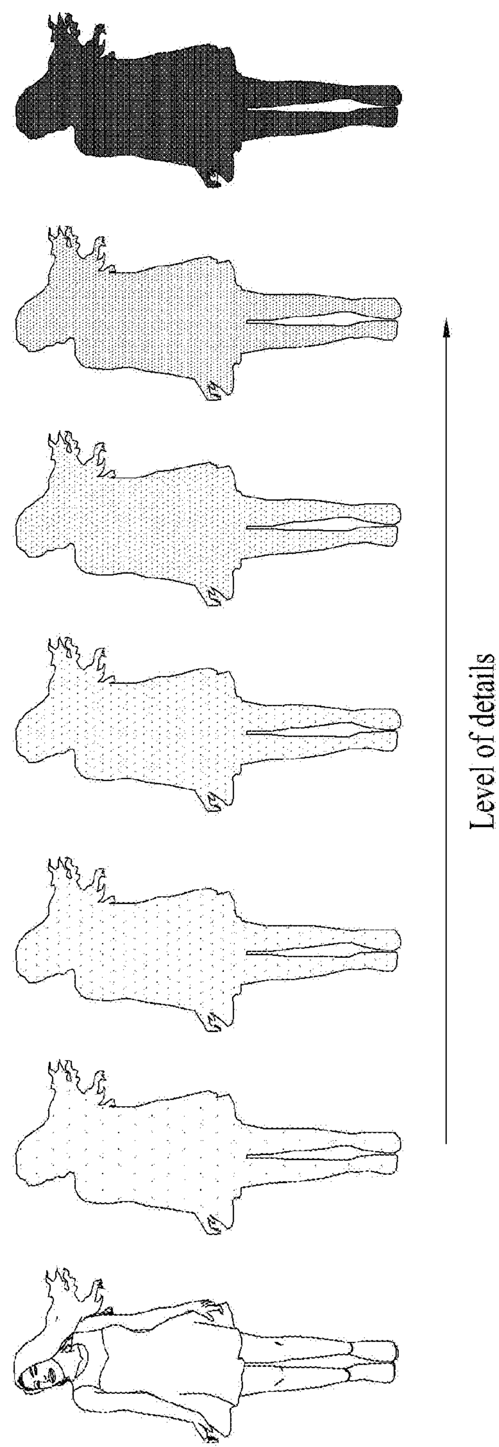
FIG. 8 illustrates an example of point configuration in each LOD according to embodiments.

FIG. 8 illustrates an example of point configuration in each LOD according to embodiments.

As described with reference to FIGS. 1 to 7, encoded geometry is reconstructed (decompressed) before attribute encoding is performed. When direct coding is applied, the geometry reconstruction operation may include changing the placement of direct coded points (e.g., placing the direct coded points in front of the point cloud data). When trisoup geometry encoding is applied, the geometry reconstruction process is performed through triangle reconstruction, up-sampling, and voxelization. Since the attribute depends on the geometry, attribute encoding is performed based on the reconstructed geometry.

The point cloud encoder (for example, the LOD generator 40009) may classify (reorganize) points by LOD. The figure shows the point cloud content corresponding to LODs. The leftmost picture in the figure represents original point cloud content. The second picture from the left of the figure represents distribution of the points in the lowest LOD, and the rightmost picture in the figure represents distribution of the points in the highest LOD. That is, the points in the lowest LOD are sparsely distributed, and the points in the highest LOD are densely distributed. That is, as the LOD rises in the direction pointed by the arrow indicated at the bottom of the figure, the space (or distance) between points is narrowed.

Figure 9:
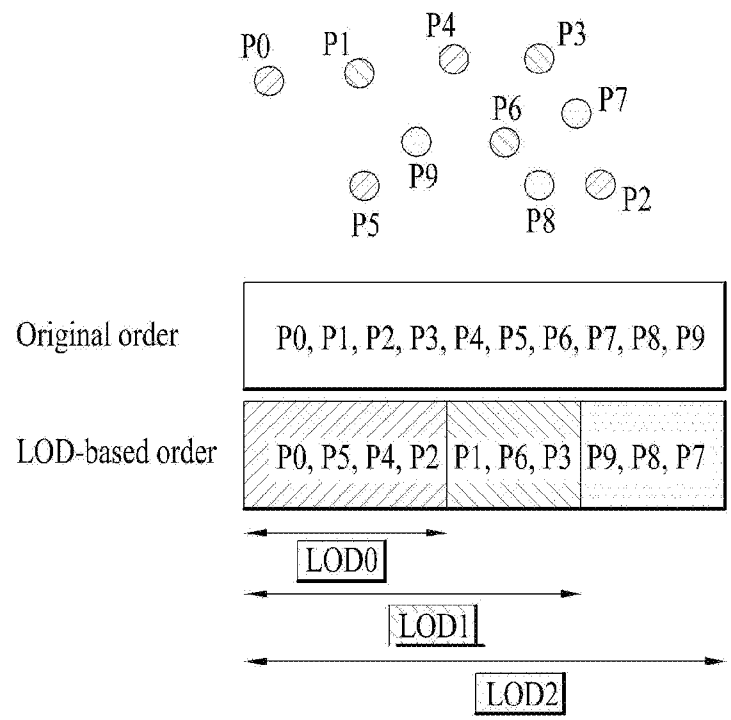
FIG. 9 illustrates an example of point configuration in each LOD according to embodiments.

FIG. 9 illustrates an example of point configuration for each LOD according to embodiments.

As described with reference to FIGS. 1 to 8, the point cloud content providing system, or the point cloud encoder (for example, the point cloud video encoder 10002, the point cloud encoder of FIG. 4, or the LOD generator 40009) may generates an LOD. The LOD is generated by reorganizing the points into a set of refinement levels according to a set LOD distance value (or a set of Euclidean distances). The LOD generation process is performed not only by the point cloud encoder, but also by the point cloud decoder.

The upper part of FIG. 9 shows examples (P0 to P9) of points of the point cloud content distributed in a 3D space. In FIG. 9, the original order represents the order of points P0 to P9 before LOD generation. In FIG. 9, the LOD based order represents the order of points according to the LOD generation. Points are reorganized by LOD. Also, a high LOD contains the points belonging to lower LODs. As shown in FIG. 9, LOD0 contains P0, P5, P4 and P2. LOD1 contains the points of LOD0, P1, P6 and P3. LOD2 contains the points of LOD0, the points of LOD1, P9, P8 and P7.

As described with reference to FIG. 4, the point cloud encoder according to the embodiments may perform prediction transform coding, lifting transform coding, and RAHT transform coding selectively or in combination.

The point cloud encoder according to the embodiments may generate a predictor for points to perform prediction transform coding for setting a predicted attribute (or predicted attribute value) of each point. That is, N predictors may be generated for N points. The predictor according to the embodiments may calculate a weight (=1/distance) based on the LOD value of each point, indexing information about neighboring points present within a set distance for each LOD, and a distance to the neighboring points.

The predicted attribute (or attribute value) according to the embodiments is set to the average of values obtained by multiplying the attributes (or attribute values) (e.g., color, reflectance, etc.) of neighbor points set in the predictor of each point by a weight (or weight value) calculated based on the distance to each neighbor point. The point cloud encoder according to the embodiments (for example, the coefficient quantizer 40011) may quantize and inversely quantize the residuals (which may be called residual attributes, residual attribute values, or attribute prediction residuals) obtained by subtracting a predicted attribute (attribute value) from the attribute (attribute value) of each point. The quantization process is configured as shown in the following table.

TABLE

Attribute prediction residuals quantization pseudo code

```
int PCCQuantization(int value, int quantStep) {
  if( value >=0) {
    return floor(value / quantStep + 1.0 / 3.0);
  } else {
    return -floor(-value / quantStep + 1.0 / 3.0);
  }
}
```

TABLE

Attribute prediction residuals inverse quantization pseudo code

```
int PCCInverseQuantization(int value, int quantStep) {
  if( quantStep == 0) {
    return value;
  } else {
    return value * quantStep;
  }
}
```

When the predictor of each point has neighbor points, the point cloud encoder (e.g., the arithmetic encoder 40012) according to the embodiments may perform entropy coding on the quantized and inversely quantized residual values as described above. When the predictor of each point has no neighbor point, the point cloud encoder according to the embodiments (for example, the arithmetic encoder 40012) may perform entropy coding on the attributes of the corresponding point without performing the above-described operation.

The point cloud encoder according to the embodiments (for example, the lifting transformer 40010) may generate a predictor of each point, set the calculated LOD and register neighbor points in the predictor, and set weights according to the distances to neighbor points to perform lifting transform coding. The lifting transform coding according to the embodiments is similar to the above-described prediction transform coding, but differs therefrom in that weights are cumulatively applied to attribute values. The process of cumulatively applying weights to the attribute values according to embodiments is configured as follows.

1) Create an array Quantization Weight (QW) for storing the weight value of each point. The initial value of all elements of QW is 1.0. Multiply the QW values of the predictor indexes of the neighbor nodes registered in the predictor by the weight of the predictor of the current point, and add the values obtained by the multiplication.

2) Lift prediction process: Subtract the value obtained by multiplying the attribute value of the point by the weight from the existing attribute value to calculate a predicted attribute value.

3) Create temporary arrays called updateweight and update and initialize the temporary arrays to zero.

4) Cumulatively add the weights calculated by multiplying the weights calculated for all predictors by a weight stored in the QW corresponding to a predictor index to the updateweight array as indexes of neighbor nodes. Cumulatively add, to the update array, a value obtained by multiplying the attribute value of the index of a neighbor node by the calculated weight.

5) Lift update process: Divide the attribute values of the update array for all predictors by the weight value of the updateweight array of the predictor index, and add the existing attribute value to the values obtained by the division.

6) Calculate predicted attributes by multiplying the attribute values updated through the lift update process by the weight updated through the lift prediction process (stored in the QW) for all predictors. The point cloud encoder (e.g., coefficient quantizer 40011) according to the embodiments quantizes the predicted attribute values. In addition, the point cloud encoder (e.g., the arithmetic encoder 40012) performs entropy coding on the quantized attribute values.

The point cloud encoder (for example, the RAHT transformer 40008) according to the embodiments may perform RAHT transform coding in which attributes of nodes of a higher level are predicted using the attributes associated with nodes of a lower level in the octree. RAHT transform coding is an example of attribute intra coding through an octree backward scan. The point cloud encoder according to the embodiments scans the entire region from the voxel and repeats the merging process of merging the voxels into a larger block at each step until the root node is reached. The merging process according to the embodiments is performed only on the occupied nodes. The merging process is not performed on the empty node. The merging process is performed on an upper node immediately above the empty node.

The equation below represents a RAHT transformation matrix. In the equation, $g_{l_{x,y,z}}$ denotes the average attribute value of voxels at level l. $g_{l_{x,y,z}}$ may be calculated based on $g_{l+1_{2x,y,z}}$ and $g_{l+1_{2x+1,y,z}}$. The weights for $g_{l_{2x,y,z}}$ and $g_{l_{2x+1,y,z}}$ are $w1=w_{l_{2x,y,z}}$ and $w2=w_{l_{2x+1,y,z}}$.

$$\begin{bmatrix} g_{l-1_{x,y,z}} \\ h_{l-1_{x,y,z}} \end{bmatrix} = T_{w1w2} \begin{bmatrix} g_{l_{2x,y,z}} \\ g_{l_{2x+1,y,z}} \end{bmatrix}, T_{w1w2} = \frac{1}{\sqrt{w1+w2}} \begin{bmatrix} \sqrt{w1} & \sqrt{w2} \\ -\sqrt{w2} & \sqrt{w1} \end{bmatrix}$$

Here, $g_{l-1_{x,y,z}}$ is a low-pass value and is used in the merging process at the next higher level. $h_{l-1_{x,y,z}}$ denotes high-pass coefficients. The high-pass coefficients at each step are quantized and subjected to entropy coding (for example, encoding by the arithmetic encoder 400012). The weights are calculated as $w_{l-1_{x,y,z}} = w_{l_{2x,y,z}} + w_{l_{2x+1,y,z}}$. The root node is created through the $g_{1_{0,0,0}}$ and $g_{1_{0,0,1}}$ as follows.

$$\begin{bmatrix} gDC \\ h_{0_{0,0,0}} \end{bmatrix} = T_{w1000w1001} \begin{bmatrix} g_{1_{0,0,0x}} \\ g_{1_{0,0,1}} \end{bmatrix}$$

The value of gDC is also quantized and subjected to entropy coding like the high-pass coefficients.

Figure 10:
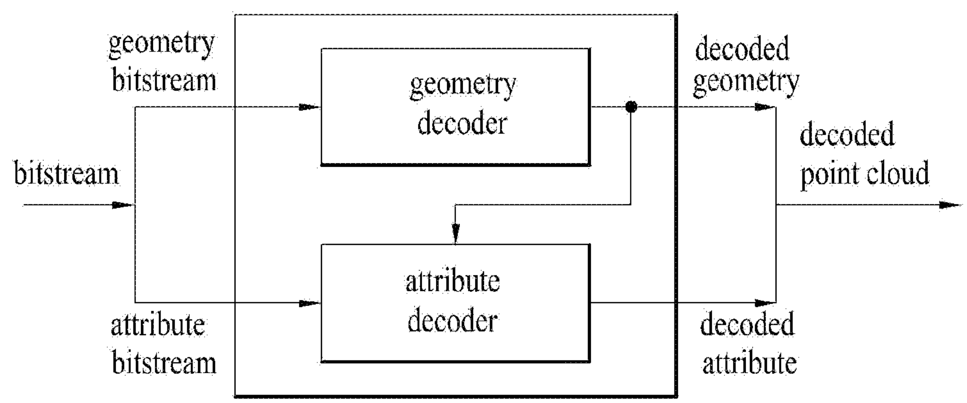
FIG. 10 illustrates a point cloud decoder according to embodiments.

FIG. 10 illustrates a point cloud decoder according to embodiments.

The point cloud decoder illustrated in FIG. 10 is an example of the point cloud video decoder 10006 described in FIG. 1, and may perform the same or similar operations as the operations of the point cloud video decoder 10006 illustrated in FIG. 1. As shown in the figure, the point cloud decoder may receive a geometry bitstream and an attribute bitstream contained in one or more bitstreams. The point cloud decoder includes a geometry decoder and an attribute decoder. The geometry decoder performs geometry decoding on the geometry bitstream and outputs decoded geometry. The attribute decoder performs attribute decoding based on the decoded geometry and the attribute bitstream, and outputs decoded attributes. The decoded geometry and decoded attributes are used to reconstruct point cloud content (a decoded point cloud).

Figure 11:
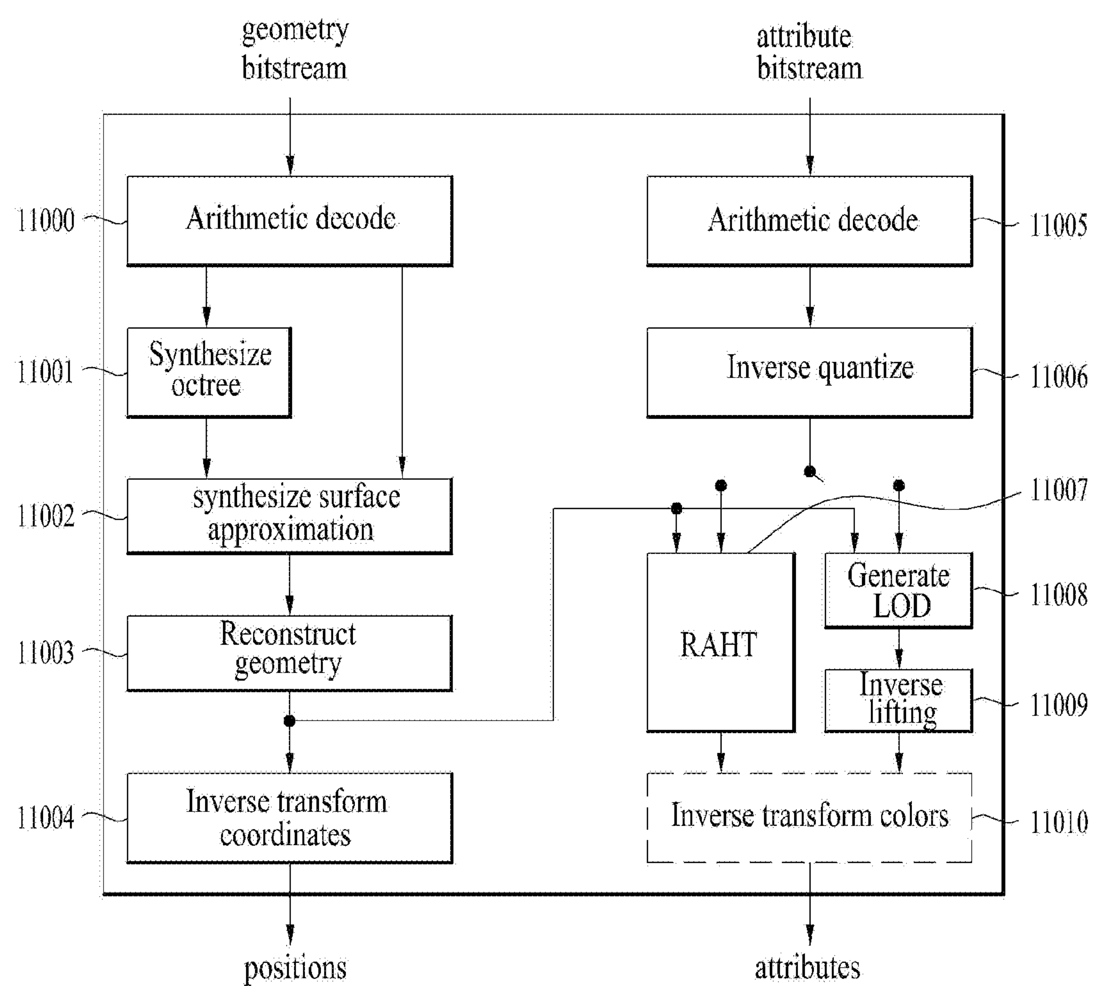
FIG. 11 illustrates a point cloud decoder according to embodiments.

FIG. 11 illustrates a point cloud decoder according to embodiments.

The point cloud decoder illustrated in FIG. 11 is an example of the point cloud decoder illustrated in FIG. 10, and may perform a decoding operation, which is an inverse process of the encoding operation of the point cloud encoder illustrated in FIGS. 1 to 9.

As described with reference to FIGS. 1 and 10, the point cloud decoder may perform geometry decoding and attribute decoding. The geometry decoding is performed before the attribute decoding.

The point cloud decoder according to the embodiments includes an arithmetic decoder (Arithmetic decode) 11000, an octree synthesizer (Synthesize octree) 11001, a surface approximation synthesizer (Synthesize surface approximation) 11002, and a geometry reconstructor (Reconstruct geometry) 11003, a coordinate inverse transformer (Inverse transform coordinates) 11004, an arithmetic decoder (Arithmetic decode) 11005, an inverse quantizer (Inverse quantize) 11006, a RAHT transformer 11007, an LOD generator (Generate LOD) 11008, an inverse lifter (inverse lifting) 11009, and/or a color inverse transformer (Inverse transform colors) 11010.

The arithmetic decoder 11000, the octree synthesizer 11001, the surface approximation synthesizer 11002, and the geometry reconstructor 11003, and the coordinate inverse transformer 11004 may perform geometry decoding. The geometry decoding according to the embodiments may include direct coding and trisoup geometry decoding. The direct coding and trisoup geometry decoding are selectively applied. The geometry decoding is not limited to the above-described example, and is performed as an inverse process of the geometry encoding described with reference to FIGS. 1 to 9.

The arithmetic decoder 11000 according to the embodiments decodes the received geometry bitstream based on the arithmetic coding. The operation of the arithmetic decoder 11000 corresponds to the inverse process of the arithmetic encoder 40004.

The octree synthesizer 11001 according to the embodiments may generate an octree by acquiring an occupancy code from the decoded geometry bitstream (or information on the geometry secured as a result of decoding). The occupancy code is configured as described in detail with reference to FIGS. 1 to 9.

When the trisoup geometry encoding is applied, the surface approximation synthesizer 11002 according to the embodiments may synthesize a surface based on the decoded geometry and/or the generated octree.

The geometry reconstructor 11003 according to the embodiments may regenerate geometry based on the surface and/or the decoded geometry. As described with reference to FIGS. 1 to 9, direct coding and trisoup geometry encoding are selectively applied. Accordingly, the geometry reconstructor 11003 directly imports and adds position information about the points to which direct coding is applied. When the trisoup geometry encoding is applied, the geometry reconstructor 11003 may reconstruct the geometry by performing the reconstruction operations of the geometry reconstructor 40005, for example, triangle reconstruction, up-sampling, and voxelization. Details are the same as those described with reference to FIG. 6, and thus description thereof is omitted. The reconstructed geometry may include a point cloud picture or frame that does not contain attributes.

The coordinate inverse transformer 11004 according to the embodiments may acquire positions of the points by transforming the coordinates based on the reconstructed geometry.

The arithmetic decoder 11005, the inverse quantizer 11006, the RAHT transformer 11007, the LOD generator 11008, the inverse lifter 11009, and/or the color inverse transformer 11010 may perform the attribute decoding described with reference to FIG. 10. The attribute decoding according to the embodiments includes region adaptive hierarchical transform (RAHT) decoding, interpolation-based hierarchical nearest-neighbor prediction (prediction transform) decoding, and interpolation-based hierarchical nearest-neighbor prediction with an update/lifting step (lifting transform) decoding. The three decoding schemes described above may be used selectively, or a combination of one or more decoding schemes may be used. The attribute decoding according to the embodiments is not limited to the above-described example.

The arithmetic decoder 11005 according to the embodiments decodes the attribute bitstream by arithmetic coding.

The inverse quantizer 11006 according to the embodiments inversely quantizes the information about the decoded attribute bitstream or attributes secured as a result of the decoding, and outputs the inversely quantized attributes (or attribute values). The inverse quantization may be selectively applied based on the attribute encoding of the point cloud encoder.

According to embodiments, the RAHT transformer 11007, the LOD generator 11008, and/or the inverse lifter 11009 may process the reconstructed geometry and the inversely quantized attributes. As described above, the RAHT transformer 11007, the LOD generator 11008, and/or the inverse lifter 11009 may selectively perform a decoding operation corresponding to the encoding of the point cloud encoder.

The color inverse transformer 11010 according to the embodiments performs inverse transform coding to inversely transform a color value (or texture) included in the decoded attributes. The operation of the color inverse transformer 11010 may be selectively performed based on the operation of the color transformer 40006 of the point cloud encoder.

Although not shown in the figure, the elements of the point cloud decoder of FIG. 11 may be implemented by hardware including one or more processors or integrated circuits configured to communicate with one or more memories included in the point cloud providing apparatus, software, firmware, or a combination thereof. The one or more processors may perform at least one or more of the operations and/or functions of the elements of the point cloud decoder of FIG. 11 described above. Additionally, the one or more processors may operate or execute a set of software programs and/or instructions for performing the operations and/or functions of the elements of the point cloud decoder of FIG. 11.

Figure 12:
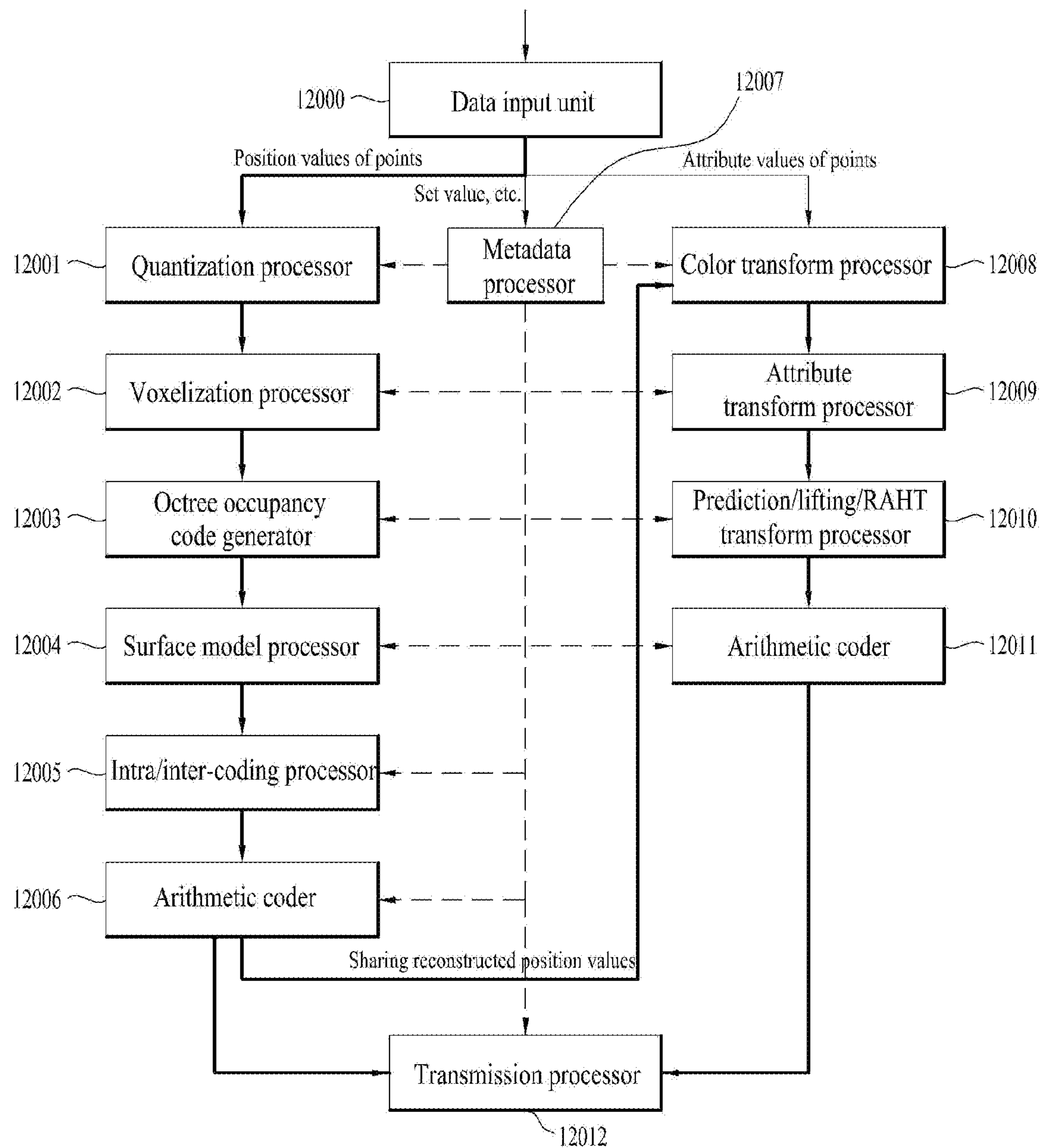
FIG. 12 illustrates a transmission device according to embodiments.

FIG. 12 illustrates a transmission device according to embodiments.

The transmission device shown in FIG. 12 is an example of the transmission device 10000 of FIG. 1 (or the point cloud encoder of FIG. 4). The transmission device illustrated in FIG. 12 may perform one or more of the operations and methods the same as or similar to those of the point cloud encoder described with reference to FIGS. 1 to 9. The transmission device according to the embodiments may include a data input unit 12000, a quantization processor 12001, a voxelization processor 12002, an octree occupancy code generator 12003, a surface model processor 12004, an intra/inter-coding processor 12005, an arithmetic coder 12006, a metadata processor 12007, a color transform processor 12008, an attribute transform processor 12009, a prediction/lifting/RAHT transform processor 12010, an arithmetic coder 12011 and/or a transmission processor 12012.

The data input unit 12000 according to the embodiments receives or acquires point cloud data. The data input unit 12000 may perform an operation and/or acquisition method the same as or similar to the operation and/or acquisition method of the point cloud video acquirer 10001 (or the acquisition process 20000 described with reference to FIG. 2).

The data input unit 12000, the quantization processor 12001, the voxelization processor 12002, the octree occupancy code generator 12003, the surface model processor 12004, the intra/inter-coding processor 12005, and the arithmetic coder 12006 perform geometry encoding. The geometry encoding according to the embodiments is the same as or similar to the geometry encoding described with reference to FIGS. 1 to 9, and thus a detailed description thereof is omitted.

The quantization processor 12001 according to the embodiments quantizes geometry (e.g., position values of points). The operation and/or quantization of the quantization processor 12001 is the same as or similar to the operation and/or quantization of the quantizer 40001 described with reference to FIG. 4. Details are the same as those described with reference to FIGS. 1 to 9.

The voxelization processor 12002 according to the embodiments voxelizes the quantized position values of the points. The voxelization processor 120002 may perform an operation and/or process the same or similar to the operation and/or the voxelization process of the quantizer 40001 described with reference to FIG. 4. Details are the same as those described with reference to FIGS. 1 to 9.

The octree occupancy code generator 12003 according to the embodiments performs octree coding on the voxelized positions of the points based on an octree structure. The octree occupancy code generator 12003 may generate an occupancy code. The octree occupancy code generator 12003 may perform an operation and/or method the same as or similar to the operation and/or method of the point cloud encoder (or the octree analyzer 40002) described with reference to FIGS. 4 and 6. Details are the same as those described with reference to FIGS. 1 to 9.

The surface model processor 12004 according to the embodiments may perform trigsoup geometry encoding based on a surface model to reconstruct the positions of points in a specific region (or node) on a voxel basis. The surface model processor 12004 may perform an operation and/or method the same as or similar to the operation and/or method of the point cloud encoder (for example, the surface approximation analyzer 40003) described with reference to FIG. 4. Details are the same as those described with reference to FIGS. 1 to 9.

The intra/inter-coding processor 12005 according to the embodiments may perform intra/inter-coding on point cloud data. The intra/inter-coding processor 12005 may perform coding the same as or similar to the intra/inter-coding described with reference to FIG. 7. Details are the same as those described with reference to FIG. 7. According to embodiments, the intra/inter-coding processor 12005 may be included in the arithmetic coder 12006.

The arithmetic coder 12006 according to the embodiments performs entropy encoding on an octree of the point cloud data and/or an approximated octree. For example, the encoding scheme includes arithmetic encoding. The arithmetic coder 12006 performs an operation and/or method the same as or similar to the operation and/or method of the arithmetic encoder 40004.

The metadata processor 12007 according to the embodiments processes metadata about the point cloud data, for example, a set value, and provides the same to a necessary processing process such as geometry encoding and/or attribute encoding. Also, the metadata processor 12007 according to the embodiments may generate and/or process signaling information related to the geometry encoding and/or the attribute encoding. The signaling information according to the embodiments may be encoded separately from the geometry encoding and/or the attribute encoding. The signaling information according to the embodiments may be interleaved.

The color transform processor 12008, the attribute transform processor 12009, the prediction/lifting/RAHT transform processor 12010, and the arithmetic coder 12011 perform the attribute encoding. The attribute encoding according to the embodiments is the same as or similar to the attribute encoding described with reference to FIGS. 1 to 9, and thus a detailed description thereof is omitted.

The color transform processor 12008 according to the embodiments performs color transform coding to transform color values included in attributes. The color transform processor 12008 may perform color transform coding based on the reconstructed geometry. The reconstructed geometry is the same as described with reference to FIGS. 1 to 9. Also, it performs an operation and/or method the same as or similar to the operation and/or method of the color transformer 40006 described with reference to FIG. 4 is performed. The detailed description thereof is omitted.

The attribute transform processor 12009 according to the embodiments performs attribute transformation to transform the attributes based on the reconstructed geometry and/or the positions on which geometry encoding is not performed. The attribute transform processor 12009 performs an operation and/or method the same as or similar to the operation and/or method of the attribute transformer 40007 described with reference to FIG. 4. The detailed description thereof is omitted. The prediction/lifting/RAHT transform processor 12010 according to the embodiments may code the transformed attributes by any one or a combination of RAHT coding, prediction transform coding, and lifting transform coding. The prediction/lifting/RAHT transform processor 12010 performs at least one of the operations the same as or similar to the operations of the RAHT transformer 40008, the LOD generator 40009, and the lifting transformer 40010 described with reference to FIG. 4. In addition, the prediction transform coding, the lifting transform coding, and the RAHT transform coding are the same as those described with reference to FIGS. 1 to 9, and thus a detailed description thereof is omitted.

The arithmetic coder 12011 according to the embodiments may encode the coded attributes based on the arithmetic coding. The arithmetic coder 12011 performs an operation and/or method the same as or similar to the operation and/or method of the arithmetic encoder 400012.

The transmission processor 12012 according to the embodiments may transmit each bitstream containing encoded geometry and/or encoded attributes and metadata information, or transmit one bitstream configured with the encoded geometry and/or the encoded attributes and the metadata information. When the encoded geometry and/or the encoded attributes and the metadata information according to the embodiments are configured into one bitstream, the bitstream may include one or more sub-bitstreams. The bitstream according to the embodiments may contain signaling information including a sequence parameter set (SPS) for signaling of a sequence level, a geometry parameter set (GPS) for signaling of geometry information coding, an attribute parameter set (APS) for signaling of attribute information coding, and a tile parameter set (TPS) for signaling of a tile level, and slice data. The slice data may include information about one or more slices. One slice according to embodiments may include one geometry bitstream Geom00 and one or more attribute bitstreams Attr00 and Attr10.

A slice refers to a series of syntax elements representing the entirety or part of a coded point cloud frame.

The TPS according to the embodiments may include information about each tile (for example, coordinate information and height/size information about a bounding box) for one or more tiles. The geometry bitstream may contain a header and a payload. The header of the geometry bitstream according to the embodiments may contain a parameter set identifier (geom_parameter_set_id), a tile identifier (geom_tile_id) and a slice identifier (geom_slice_id) included in the GPS, and information about the data contained in the payload. As described above, the metadata processor 12007 according to the embodiments may generate and/or process the signaling information and transmit the same to the transmission processor 12012. According to embodiments, the elements to perform geometry encoding and the elements to perform attribute encoding may share data/information with each other as indicated by dotted lines. The transmission processor 12012 according to the embodiments may perform an operation and/or transmission method the same as or similar to the operation and/or transmission method of the transmitter 10003. Details are the same as those described with reference to FIGS. 1 and 2, and thus a description thereof is omitted.

Figure 13:
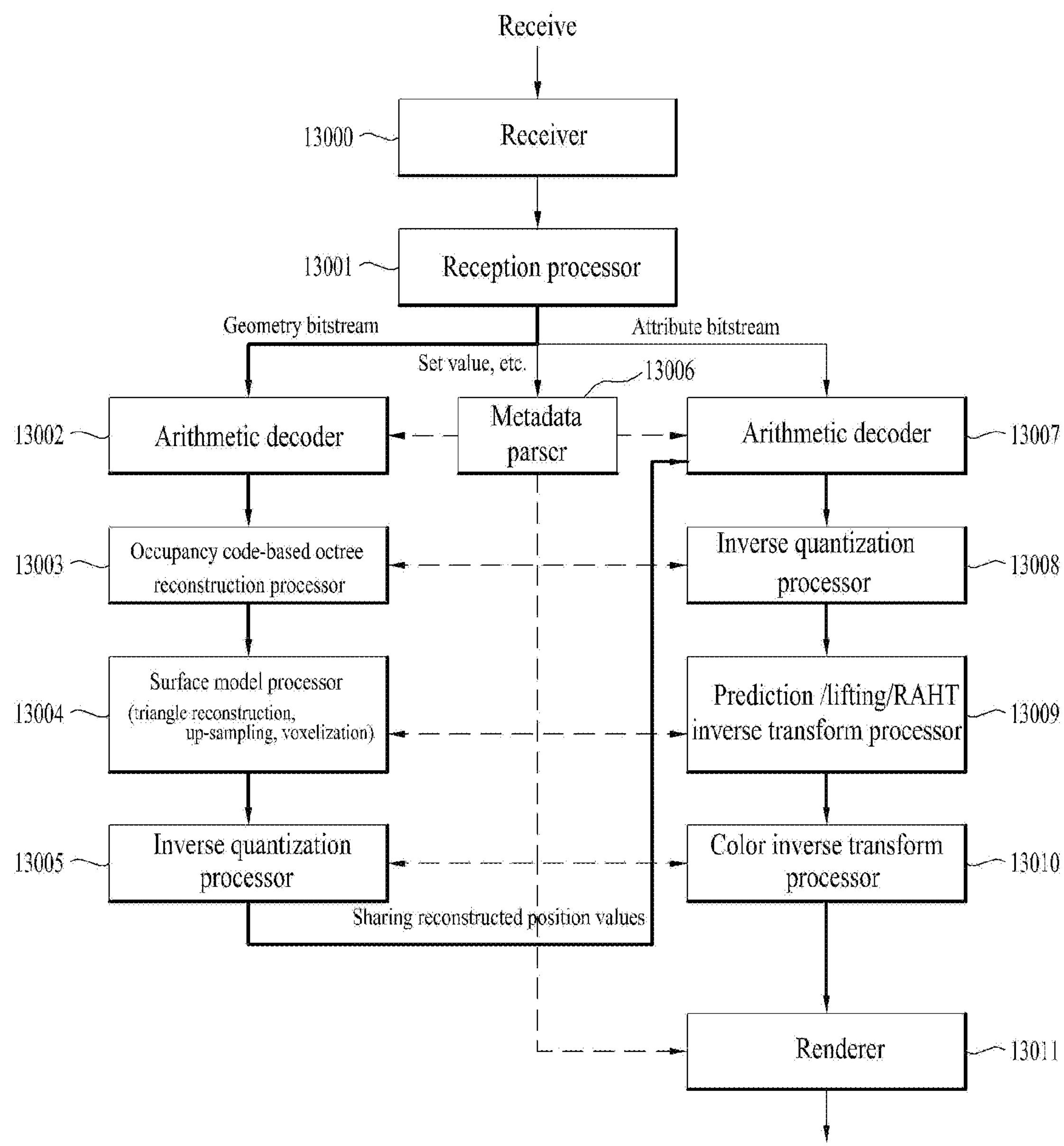
FIG. 13 illustrates a reception device according to embodiments.

FIG. 13 illustrates a reception device according to embodiments.

The reception device illustrated in FIG. 13 is an example of the reception device 10004 of FIG. 1 (or the point cloud decoder of FIGS. 10 and 11). The reception device illustrated in FIG. 13 may perform one or more of the operations and methods the same as or similar to those of the point cloud decoder described with reference to FIGS. 1 to 11.

The reception device according to the embodiment includes a receiver 13000, a reception processor 13001, an arithmetic decoder 13002, an occupancy code-based octree reconstruction processor 13003, a surface model processor (triangle reconstruction, up-sampling, voxelization) 13004, an inverse quantization processor 13005, a metadata parser 13006, an arithmetic decoder 13007, an inverse quantization processor 13008, a prediction/lifting/RAHT inverse transform processor 13009, a color inverse transform processor 13010, and/or a renderer 13011. Each element for decoding according to the embodiments may perform an inverse process of the operation of a corresponding element for encoding according to the embodiments.

The receiver 13000 according to the embodiments receives point cloud data. The receiver 13000 may perform an operation and/or reception method the same as or similar to the operation and/or reception method of the receiver 10005 of FIG. 1. The detailed description thereof is omitted.

The reception processor 13001 according to the embodiments may acquire a geometry bitstream and/or an attribute bitstream from the received data. The reception processor 13001 may be included in the receiver 13000.

The arithmetic decoder 13002, the occupancy code-based octree reconstruction processor 13003, the surface model processor 13004, and the inverse quantization processor 1305 may perform geometry decoding. The geometry decoding according to embodiments is the same as or similar to the geometry decoding described with reference to FIGS. 1 to 10, and thus a detailed description thereof is omitted.

The arithmetic decoder 13002 according to the embodiments may decode the geometry bitstream based on arithmetic coding. The arithmetic decoder 13002 performs an operation and/or coding the same as or similar to the operation and/or coding of the arithmetic decoder 11000.

The occupancy code-based octree reconstruction processor 13003 according to the embodiments may reconstruct an octree by acquiring an occupancy code from the decoded geometry bitstream (or information about the geometry secured as a result of decoding). The occupancy code-based octree reconstruction processor 13003 performs an operation and/or method the same as or similar to the operation and/or octree generation method of the octree synthesizer 11001. When the trisoup geometry encoding is applied, the surface model processor 1302 according to the embodiments may perform trisoup geometry decoding and related geometry reconstruction (for example, triangle reconstruction, up-sampling, voxelization) based on the surface model method. The surface model processor 1302 performs an operation the same as or similar to that of the surface approximation synthesizer 11002 and/or the geometry reconstructor 11003.

The inverse quantization processor 1305 according to the embodiments may inversely quantize the decoded geometry.

The metadata parser 1306 according to the embodiments may parse metadata contained in the received point cloud data, for example, a set value. The metadata parser 1306 may pass the metadata to geometry decoding and/or attribute decoding. The metadata is the same as that described with reference to FIG. 12, and thus a detailed description thereof is omitted.

The arithmetic decoder 13007, the inverse quantization processor 13008, the prediction/lifting/RAHT inverse transform processor 13009 and the color inverse transform processor 13010 perform attribute decoding. The attribute decoding is the same as or similar to the attribute decoding described with reference to FIGS. 1 to 10, and thus a detailed description thereof is omitted.

The arithmetic decoder 13007 according to the embodiments may decode the attribute bitstream by arithmetic coding. The arithmetic decoder 13007 may decode the attribute bitstream based on the reconstructed geometry. The arithmetic decoder 13007 performs an operation and/or coding the same as or similar to the operation and/or coding of the arithmetic decoder 11005.

The inverse quantization processor 13008 according to the embodiments may inversely quantize the decoded attribute bitstream. The inverse quantization processor 13008 performs an operation and/or method the same as or similar to the operation and/or inverse quantization method of the inverse quantizer 11006.

The prediction/lifting/RAHT inverse transformer 13009 according to the embodiments may process the reconstructed geometry and the inversely quantized attributes. The prediction/lifting/RAHT inverse transform processor 1301 performs one or more of operations and/or decoding the same as or similar to the operations and/or decoding of the RAHT transformer 11007, the LOD generator 11008, and/or the inverse lifter 11009. The color inverse transform processor 13010 according to the embodiments performs inverse transform coding to inversely transform color values (or textures) included in the decoded attributes. The color inverse transform processor 13010 performs an operation and/or inverse transform coding the same as or similar to the operation and/or inverse transform coding of the color inverse transformer 11010. The renderer 13011 according to the embodiments may render the point cloud data.

Figure 14:
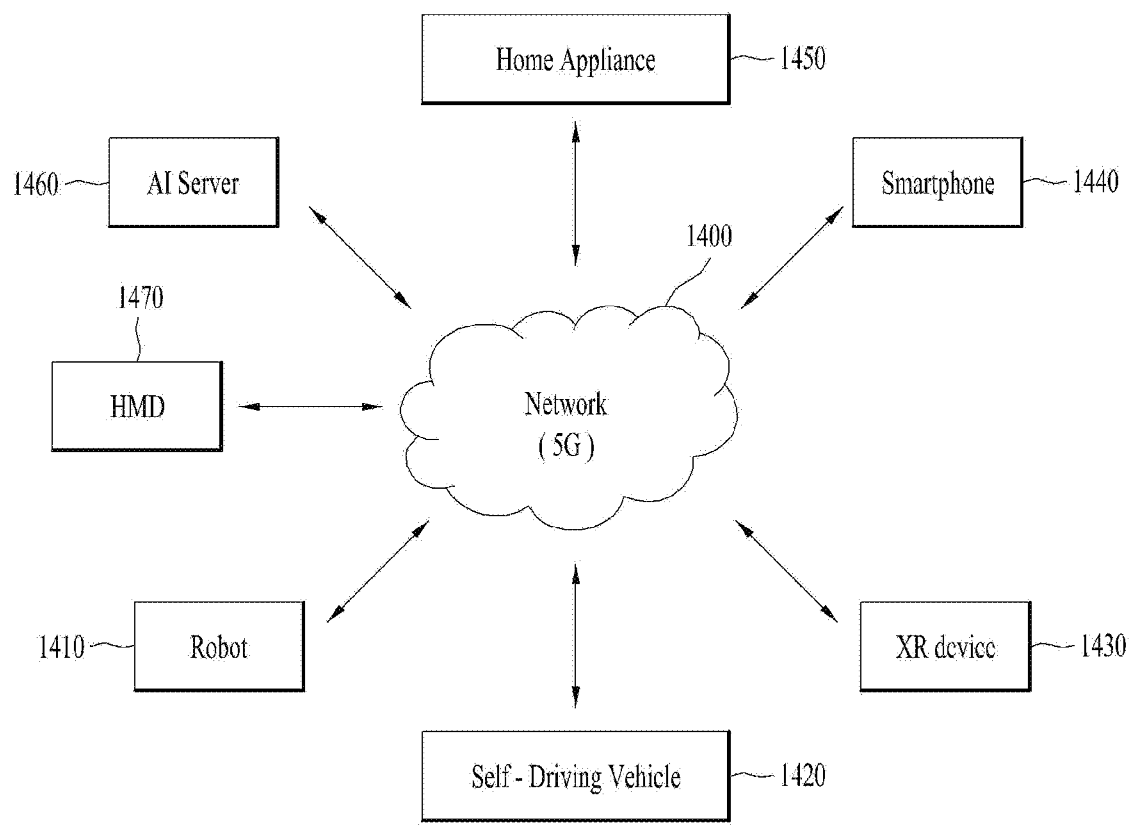
FIG. 14 illustrates an exemplary structure operable in connection with point cloud data transmission/reception methods/devices according to embodiments.

FIG. 14 illustrates an exemplary structure operable in connection with point cloud data transmission/reception methods/devices according to embodiments.

The structure of FIG. 14 represents a configuration in which at least one of a server 1460, a robot 1410, a self-driving vehicle 1420, an XR device 1430, a smartphone 1440, a home appliance 1450, and/or a head-mount display (HMD) 1470 is connected to the cloud network 1400. The robot 1410, the self-driving vehicle 1420, the XR device 1430, the smartphone 1440, or the home appliance 1450 is called a device. Further, the XR device 1430 may correspond to a point cloud data (PCC) device according to embodiments or may be operatively connected to the PCC device.

The cloud network 1400 may represent a network that constitutes part of the cloud computing infrastructure or is present in the cloud computing infrastructure. Here, the cloud network 1400 may be configured using a 3G network, 4G or Long Term Evolution (LTE) network, or a 5G network.

The server 1460 may be connected to at least one of the robot 1410, the self-driving vehicle 1420, the XR device 1430, the smartphone 1440, the home appliance 1450, and/or the HMD 1470 over the cloud network 1400 and may assist in at least a part of the processing of the connected devices 1410 to 1470.

The HMD 1470 represents one of the implementation types of the XR device and/or the PCC device according to the embodiments. The HMD type device according to the embodiments includes a communication unit, a control unit, a memory, an I/O unit, a sensor unit, and a power supply unit.

Hereinafter, various embodiments of the devices 1410 to 1450 to which the above-described technology is applied will be described. The devices 1410 to 1450 illustrated in FIG. 14 may be operatively connected/coupled to a point cloud data transmission device and reception according to the above-described embodiments.

<PCC+XR>

The XR/PCC device 1430 may employ PCC technology and/or XR (AR+VR) technology, and may be implemented as an HMD, a head-up display (HUD) provided in a vehicle, a television, a mobile phone, a smartphone, a computer, a wearable device, a home appliance, a digital signage, a vehicle, a stationary robot, or a mobile robot.

The XR/PCC device 1430 may analyze 3D point cloud data or image data acquired through various sensors or from an external device and generate position data and attribute data about 3D points. Thereby, the XR/PCC device 1430 may acquire information about the surrounding space or a real object, and render and output an XR object. For example, the XR/PCC device 1430 may match an XR object including auxiliary information about a recognized object with the recognized object and output the matched XR object.

<PCC+Self-driving+XR>

The self-driving vehicle 1420 may be implemented as a mobile robot, a vehicle, an unmanned aerial vehicle, or the like by applying the PCC technology and the XR technology.

The self-driving vehicle 1420 to which the XR/PCC technology is applied may represent a self-driving vehicle provided with means for providing an XR image, or a self-driving vehicle that is a target of control/interaction in the XR image. In particular, the self-driving vehicle 1420 which is a target of control/interaction in the XR image may be distinguished from the XR device 1430 and may be operatively connected thereto.

The self-driving vehicle 1420 having means for providing an XR/PCC image may acquire sensor information from sensors including a camera, and output the generated XR/PCC image based on the acquired sensor information. For example, the self-driving vehicle 1420 may have an HUD and output an XR/PCC image thereto, thereby providing an occupant with an XR/PCC object corresponding to a real object or an object present on the screen.

When the XR/PCC object is output to the HUD, at least a part of the XR/PCC object may be output to overlap the real object to which the occupant's eyes are directed. On the other hand, when the XR/PCC object is output on a display provided inside the self-driving vehicle, at least a part of the XR/PCC object may be output to overlap an object on the screen. For example, the self-driving vehicle 1220 may output XR/PCC objects corresponding to objects such as a road, another vehicle, a traffic light, a traffic sign, a two-wheeled vehicle, a pedestrian, and a building.

The virtual reality (VR) technology, the augmented reality (AR) technology, the mixed reality (MR) technology and/or the point cloud compression (PCC) technology according to the embodiments are applicable to various devices.

In other words, the VR technology is a display technology that provides only CG images of real-world objects, backgrounds, and the like. On the other hand, the AR technology refers to a technology that shows a virtually created CG image on the image of a real object. The MR technology is similar to the AR technology described above in that virtual objects to be shown are mixed and combined with the real world. However, the MR technology differs from the AR technology in that the AR technology makes a clear distinction between a real object and a virtual object created as a CG image and uses virtual objects as complementary objects for real objects, whereas the MR technology treats virtual objects as objects having equivalent characteristics as real objects. More specifically, an example of MR technology applications is a hologram service.

Recently, the VR, AR, and MR technologies are sometimes referred to as extended reality (XR) technology rather than being clearly distinguished from each other. Accordingly, embodiments of the present disclosure are applicable to any of the VR, AR, MR, and XR technologies. The encoding/decoding based on PCC, V-PCC, and G-PCC techniques is applicable to such technologies.

The PCC method/device according to the embodiments may be applied to a vehicle that provides a self-driving service.

A vehicle that provides the self-driving service is connected to a PCC device for wired/wireless communication.

When the point cloud data (PCC) transmission/reception device according to the embodiments is connected to a vehicle for wired/wireless communication, the device may receive/process content data related to an AR/VR/PCC service, which may be provided together with the self-driving service, and transmit the same to the vehicle. In the case where the PCC transmission/reception device is mounted on a vehicle, the PCC transmission/reception device may receive/process content data related to the AR/VR/PCC service according to a user input signal input through a user interface device and provide the same to the user. The vehicle or the user interface device according to the embodiments may receive a user input signal. The user input signal according to the embodiments may include a signal indicating the self-driving service.

Figure 15:
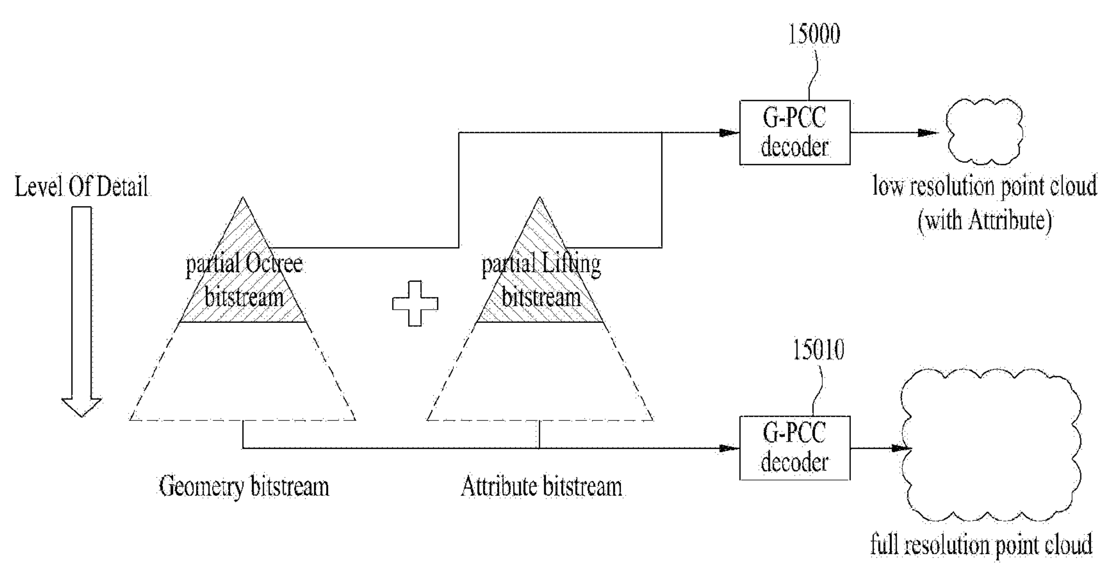
FIG. 15 illustrates a structure of geometry data and attribute data for spatial scalability according to embodiments.

FIG. 15 illustrates a structure of geometry data and attribute data for spatial scalability according to embodiments.

The G-PCC decoder 15000 and/or the G-PCC decoder 15010 in FIG. 15 may correspond to the reception device 10004 in FIG. 1, the point cloud video decoder 10006 in FIG. 1, the decoding 20003 in FIG. 2, and the decoder in FIGS. 10 and 11, the decoder in FIG. 13, and the XR device 1430 in FIG. 14. The G-PCC decoder 15000 and/or the G-PCC decoder 15010 in FIG. 15 may perform the inverse process of the operation of the transmission device 10000 in FIG. 1, the point cloud video encoder 10002 in FIG. 1, the encoding 10001 in FIG. 2, the encoder in FIG. 4, the encoder in FIG. 12, and the transmitting side of the XR device 1430 in FIG. 14.

According to embodiments, the PCC data encoder may correspond to an encoding device, an encoder, a point cloud transmission device, a point cloud data encoder, or the like.

According to embodiments, geometry information may be referred to as geometry data or the like, and the attribute information may be referred to as attribute data or the like.

The method/device according to the embodiments refers to a method/device for transmitting/receiving point cloud data according to the embodiments.

Embodiments relate to an attribute compression method for supporting spatial scalability of an encoder/decoder of geometry-based point cloud compression (G-PCC) for 3D point cloud data compression.

Embodiments propose a method for changing a point sampling technique for each LOD based on the octree to provide spatial scalability in the attribute encoding/decoding process of G-PCC.

Specifically, 1) a method for reorganizing points by octree node using a Morton code, 2) a method for processing an isolated point, 3) a point sampling technique for each node, 4) a signaling method for supporting the aforementioned three methods are proposed.

When point cloud data is dense, a function to use a narrower bandwidth, such as a thumbnail, or to send and process a lower resolution point cloud to lower decoder-side computation complexity may be needed. This function is called spatial scalability.

In geometry encoding/decoding, the spatial scalability function may be provided through a process of encoding or decoding occupancy bits only up to a depth level selected by adjusting the depth level of the octree.

The attribute encoding/decoding according to the embodiments may perform an octree structure-based operation according to the embodiments in order to provide the spatial scalability function. The method for generating an LOD from a selected depth level of an octree, the method for calculating a neighbor node, and the method for calculating a weight according to the embodiments may be needed to provide spatial scalability in the attribute encoding/decoding.

The attribute encoding/decoding according to the embodiments may change the technique of sampling points for each LOD based on the octree and configure the most suitable points for each LOD as nodes to provide spatial scalability. Thereby, the attribute compression efficiency may be enhanced.

Embodiments propose a method for changing the point sampling technique for each LOD based on the octree to provide spatial scalability in the attribute encoding/decoding process of G-PCC.

An LOD sampling-based method according to the embodiments may refer to a method for ordering points with a Morton code and classifying a point selected according to embodiments into a lower LOD that may be a candidate for a neighbor set. The LOD sampling-based method according to the embodiments may increase the accuracy of generation of a neighbor point set and the compression efficiency while reducing the complexity of LOD generation.

As shown in FIG. 15, PCC data (or point cloud data) may be composed of a geometry bitstream and an attribute bitstream. The point cloud data may be encoded and transmitted by a point cloud data transmission device or a point cloud data encoder according to embodiments. A point cloud data reception device or a point cloud data decoder according to embodiments may decode the point cloud data.

In this case, for the geometry data (or geometry bitstream) and/or the attribute data (or attribute bitstream), the cloud data reception device may partially decode the geometry bitstream of the octree structure and/or the lifting coding-based attribute bitstream in order of level of detail (LOD).

The G-PCC decoder 15000 and/or the G-PCC decoder 15010 represent the decoders of the point cloud data reception device according to the embodiments. Specifically, the G-PCC decoder 15000 and/or the G-PCC decoder 15010 represent the geometry decoder and/or attribute decoder of the PCC decoder.

The G-PCC decoder 15000 may not decode all the geometry bitstream and/or attribute bitstream in the received bitstream, but may partially decode the geometry bitstream and/or attribute bitstream to provide low-resolution point cloud data to the user.

The G-PCC decoder 15010 may decode all the geometry bitstream and/or attribute bitstream in the received bitstream and provide the decoded bitstream to the user.

The PCC encoder of the transmitting side corresponding to the G-PCC decoder 15000 and the G-PCC decoder 15010 may encode and transmit the entire point cloud data, or may encode and transmit partial point cloud data.

FIG. 16 illustrates an attribute encoding/decoding process according to embodiments.

The process of FIG. 16 may be applied to encoding and/or decoding according to embodiments. For example, the process may performed by the decoders 15000 and 15010 in FIG. 15 and/or the corresponding encoders (the transmission device 10000 in FIG. 1, the point cloud video encoder 10002 in FIG. 1, the encoding 20001 in FIG. 2, the encoder in FIG. 4, the encoder in FIG. 12, and the XR device 1430 in FIG. 14).

Changes and combinations between embodiments of the present disclosure are possible. In addition, terms used in the present disclosure may be understood based on the intended meaning of the terms, within the scope widely employed in the related field.

The attribute encoder/decoder according to the embodiments may apply an octree structure as in the geometry encoding/decoding to provide the spatial scalability function in encoding/decoding attributes. Embodiments include a method of reorganizing points belonging to a node starting at a selected depth level of the octree, and a method of sampling points for each LOD.

The method of reorganizing points and the method of sampling points for each LOD are carried out in PCC attribute encoding/decoding of the PCC decoder/encoder, and may be applied when a prediction transform technique or a lifting transform technique is used in the attribute encoding/decoding process.

S16000 Sorting Point Cloud Data Based on Morton Order

Points in the point cloud may be changed to a Morton code based on the x, y, and z position values, and may be sorted based on the Morton code values.

S16010 Setting Partial Encoding/Decoding Region of Attribute Data

Figure 17:
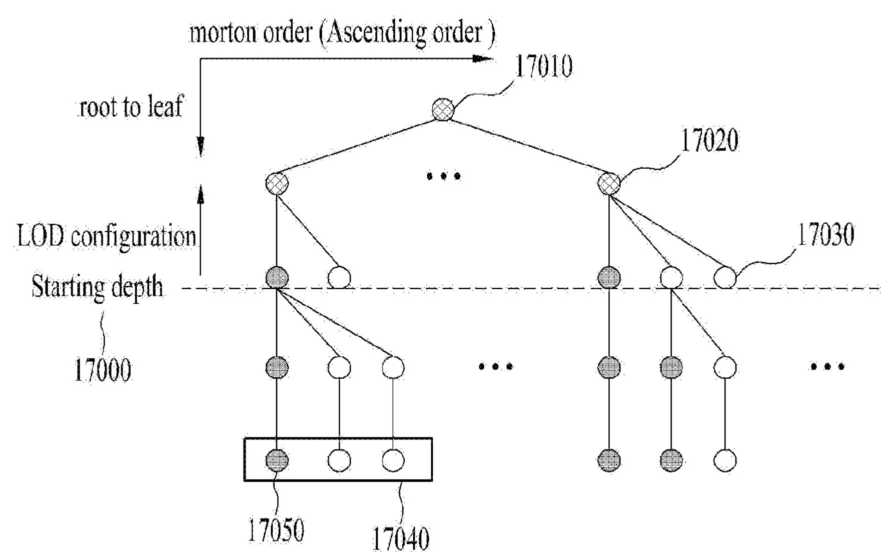
FIG. 17 shows an octree structure of point cloud data according to embodiments.

In attribute encoding/decoding, a depth level of the octree may be set and points to which the attribute encoding (decoding) is to be applied may be constructed and encoded/decoded starting at the set octree depth level, as in the geometry encoding/decoding (see FIG. 17).

S16020 Reorganizing Points Belonging to an Actree Node Using Morton Code

A method for reorganizing the points sorted by the Morton code for each octree node according to the embodiments may employ the pseudocode (equation) given below.

nodeSizeLog2: denotes the octree depth level (17000 in FIG. 17).

PX_mortoncode: denotes the Morton code of node PX.

end_range_mc: denotes the range of the Morton code of the node.

maxNumOfPoints: denotes the maximum number of points at a specific octree depth level. This is the maximum number of points that the node may have in the ideal case.

```
Int maxNumOfPoints = pow(8, nodeSizeLog2 + 1);
For (int I = 1; I < indexCount; ++i) {
  if(Pi_mortoncode < end_range_mc) {
    . . .
  } else {
    end_range_mc = Pi_mortoncode +
      (maxNumOfPoints -(Pi_mortoncode % maxNumOfPoints));
  }
}
```

According to the syntax above, the range (end_range_mc) having the same Morton code value within one node in the octree structure may be known, and a node may be selected and uploaded to a higher node thereby.

The same meaning as the syntax above may be expressed as follows.

When the lifting method is used, the following node selection method may be used.

When lifting_scalability_enabled_flag is equal to 1 (the lifting is used), the following is applied:

```
endIndex = 0
assignedPointCount = 0
for (lod = minGeomNodeSizeLog2; unprocessedPointCount > 0; lod++) {
   startIndex = assignedPointCount
   nonAssignedPointCount = 0
   samplingFromLastFlag = lod & 1
   for (i = 0; i < unprocessedPointCount; i++) {
      currVoxelIndex = McodeUnsorted[unprocessedPointIndexes[i]] >>
(3*×(lod+1))
      if (samplingFromLastFlag = === 0){
         if (i = === 0)
            nonAssignedPointIndexes[nonAssignedPointCount++] =
unprocessedPointIndexes[i]
         else {
            prevVoxelIndex =
McodeUnsorted[unprocessedPointIndexes[i−−1]] >> (3*×(lod+1))
            if (currVoxelIndex > prevVoxelIndex)
nonAssignedPointIndexes[nonAssignedPointCount++] = unprocessedPointIndexes[i]
            else
               assignedPointIndexes[assignedPointCount++] =
unprocessedPointIndexes[i]
         }
      } else {
         if (i = === (unprocessedPointCount − 1))
            nonAssignedPointIndexes[nonAssignedPointCount++] =
unprocessedPointIndexes[i]
         else {
            nextVoxelIndex =
McodeUnsorted[unprocessedPointIndexes[i+1]] >> (3*×(lod+1))
            if (currVoxelIndex < nextVoxelIndex)
nonAssignedPointIndexes[nonAssignedPointCount++] = unprocessedPointIndexes[i]
            else
               assignedPointIndexes[assignedPointCount++] =
unprocessedPointIndexes[i]
         }
      }
   }
   endIndex = assignedPointCount
   if (startIndex != endIndex) {
      numOfPointInSkipped = PointNumInSlice − PointCount
      if ((endIndex − startIndex) > (startIndex + numOfPointInSkipped)){
         for ( (loop = 0; loop < lod −− minGeomNodeSizeLog2; loop++ )){
            computeNearestNeighbours(
               PointCount −−
unprocessedPointCountPerLevelOfDetail[loop],
               PointCount −−
unprocessedPointCountPerLevelOfDetail[loop+1],
               loop + minGeomNodeSizeLog2,
assignedPointIndexes,
               McodeUnsorted, nonAssignedPointCount,
               nonAssignedPointIndexes ))
            }
         }
      }
      computeNearestNeighbours(
               startIndex, endIndex,
               lod , assignedPointIndexes,
               McodeUnsorted, nonAssignedPointCount,
               nonAssignedPointIndexes)
      unprocessedPointCountPerLevelOfDetail[lod+1] = nonAssignedPointCount
      unprocessedPointCount = nonAssignedPointCount
      unprocessedPointIndexes = nonAssignedPointIndexes
}
```

Specifically, in setting the next voxel index as nextVoxelIndex=McodeUnsorted[unprocessedPointIndexes[i+1]]>>(3*×(lod+1)), the Morton code may be shifted to determine whether the Morton code value is within the same range.

The encoder according to the embodiments may estimate end_range_mc from the Morton code of a point. When the Morton code value of the next points is within the range end_range_mc, the points belong to the same node. When the Morton code has a greater value outside the range, the encoder may estimate end_range_mc based on the Morton code of the point with the node changed to a new node, and apply the same to subsequent points. In this way, points belonging to the octree node may be reorganized among the points sorted by the Morton code (see FIG. 18).

S16030 Merging Isolated Nodes

Figure 18:
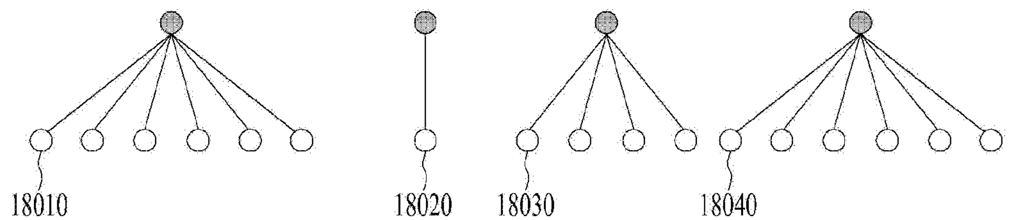
FIG. 18 illustrates a method for reorganizing points belonging to a Morton code-based node according to embodiments.

When the number of points belonging to a node is less than a specific threshold, nodes may be merged (see FIG. 18).

For example, when the minimum number of points of a node is ‘a’ and the number of points is smaller than the minimum number of points, the node may be merged with the next node. Also, the value of a may be signaled. When the maximum merging range is r, the maximum merging with the next r nodes is possible, and the value of r may be signaled. When the number of points is less than the minimum number of points, the node may be merged with the next node. When the number of merged points is less than the minimum number of points, merging with the next node may be possible. This repetition may be performed r times.

S16040 Configuring LOD of Octree Node

According to embodiments, LOD configuration may proceed from a root node to a leaf node, or may proceed from the leaf node to the root node.

For example, when LOD is configured from a root to a leaf, LOD configuration may proceed from a root node to a leaf node. Consistency may be maintained. When LOD is configured from a leaf to a root, LOD configuration may proceed from the leaf node to the root node.

S16050 Performing LOD Sampling of Octree Node

Sampling may be performed by selecting a point from among the points belonging to a node (including a merged node according to embodiments). Attribute compression may be affected by the point selected. The best reference point is selected and reorganized into a reference region (retained list), and a set of neighbor nodes is constructed from the reference region. Accordingly, the compression efficiency may be affected.

The LOD configuration unit 20120 according to the embodiments may use three sampling methods as follows.

<Selecting an N-th Point>

In selecting a point from among the points belonging to a node (including a merged node), the N-th point may be selected. When compression is performed by the encoder, N may be input by the user, or the best value may be found in an RDO (Rate Distortion Optimization) manner.

The value of N may be transmitted as a parameter (metadata or signaling data) to the decoder (reception device). When there is no specified value of N, value 0, that is, the first value may be selected.

The compression efficiency may depend on which point is selected.

<Selecting a Point Close to the Center of the Octree Parent Node Region>

In selecting a point from among the points belonging to a node (including a merged node), the point closest to the center of the bounding box of the parent node may be selected. When the selected point is closer to the center position of the parent node, errors may be further reduced in selecting a neighbor point and calculating a weight for the neighbor point.

In selecting a neighbor point, the distance between points is calculated, and a point that is at a closer distance may be selected as a neighbor point. To provide the spatial scalability function, the position value of a point may be replaced with the value of the center position of the node to which the point belongs (the node may vary depending on the level of the LOD). In this state, the distance may be calculated. Accordingly, in order to find neighbor points of point Pi, the position value of Pi may be changed to the center position of the parent node according to the LOD1, and the position of point Ri in the neighbor point candidate list (retained list) R is also changed according to LODE. Then, the distances of points may be calculated. In other words, the distance between the center positions of the nodes at the same depth level may be calculated, thereby setting a neighbor node as a neighbor point. From the distance calculated in this way, a weight of the neighbor point, 1/distance=Pi, may be obtained. Since the distance is calculated by changing the position of the point to the center position of the parent node, the calculation contains an error. As the depth level of the node is lowered, i.e., the bounding box of a node is larger, the error may increase.

In order to reduce the error, the transmission/reception devices and methods according to embodiments may select a point close to the center position of the parent node region in selecting a reference point in encoding or decoding. The error may be reduced according to the position value of the reference point, and the reduced error may have a good effect on compression efficiency.

<Selecting a Point with a Middle Index>

In selecting a point from among the points belonging to a node (including a merged node), a point with a middle index among the points may be selected. Since there is a high probability that the node of the middle index is close to the center position of the bounding box of the parent node (in many cases), and selecting points through the middle index does not require much additional computation, the probability of finding a point close to the center position with a small amount of computation may be high.

FIG. 17 shows an octree structure of point cloud data according to embodiments.

FIG. 17 illustrates operation S16010 in FIG. 16.

When the point cloud transmission/reception device or the encoder/decoder according to the embodiments encodes or decodes an attribute, an octree structure may be used as shown in FIG. 17. The octree structure is interpreted in order from a root node to a leaf node, i.e., in order from an upper node (parent node) to a lower node (child node), and the nodes may be arranged in a Morton order from left to right. Also, LODs may be configured (generated) in order from the leaf node to the root node.

For example, an octree depth level such as the starting depth 17000 is set, and the G-PCC decoder 15000 may decode the point cloud data at the set octree depth level 17000 as shown in FIG. 15.

The parent node may have 8 or fewer nodes as child nodes of the parent node. In the process of sampling a specific node among the child nodes and shifting the same to the parent node, the foremost point 17050 among the points 17040 sorted by the Morton code belonging to the parent node may be selected as a reference node or retained node (see FIG. 17).

Specifically, in order to support spatial scalability, the transmission device or encoder according to the embodiments may encode and transmit all points or encode and transmit points for a specific depth. Similarly, the reception device or decoder according to the embodiments may decode the entire points or points for a specific depth.

As illustrated in FIG. 17, when there is an octree representing points of the received point cloud data, a process of spatial scalability decoding based on the starting depth 17000 will be described.

When the level of the octree is 0 (17010), level 1 (17020), and level 2 (17030), the starting depth 1730 may be set, points may be decoded starting at the starting depth 1730 and ignoring the points below the starting depth.

Starting with the points of the starting depth 1730, the points may be reorganized and merged to configure LODs, and sampled. Then, the transmission device may encode the attributes or the reception device may decode the attributes.

FIG. 18 illustrates a method for reorganizing points belonging to a Morton code-based node according to embodiments.

FIG. 18 illustrates operation S16020 in FIG. 16.

The encoder according to the embodiments may reorganize points of a child node 18010 belonging to the parent node 18000 based on operation S16020 in FIG. 16.

After setting an attribute encoding/decoding region based on the starting depth 17000 in FIG. 17, the points of the octree belonging to the starting depth or the levels subsequent to the starting depth 17000 may be reorganized in order of the levels as in FIG. 18 and the equation in S16020 of FIG. 16.

For example, the points of the level (depth) of the octree set in FIG. 17 may be P0, P1, P2, . . . , P13, . . . . To ensure efficient encoding/decoding, the method/device (including the encoder/decoder) according to embodiments may reorganize the points into groups belonging to the same category as shown in FIG. 18

According to the equation of FIG. 16, 'end_range_mc=Pi_mortoncode+(maxNumOfPoints−(Pi_mortoncode % maxNumOfPoints)),' the value of end range mc may be calculated using the octree level value of P0, the Morton code value (e.g., 1). When a first range value is 8, the Morton code value MC of each of P0 to P5 is less than or equal to 8, and therefore the points may be reorganized as points belonging to the same node (18010).

A second range value may be calculated using the octree level value of P6, the Morton code value (e.g., 9), and the equation of FIG. 16. When a point having a Morton code value less than the second range value is only P6, P6 is reorganized as a single point (18020).

A third range value may be calculated using the octree level value or Morton code value (e.g., 16) of P7, and the equation of FIG. 16. P7 to P10, which have Morton code values included within the third range value, may be reorganized as points belonging to the same node (18030).

A fourth range value may be calculated using the octree level value or Morton code value (e.g., 26) of P11, and the equation of FIG. 16. Points having a Morton code value included within the fourth range value may be reorganized as points belonging to the same node (18040).

Figure 19:
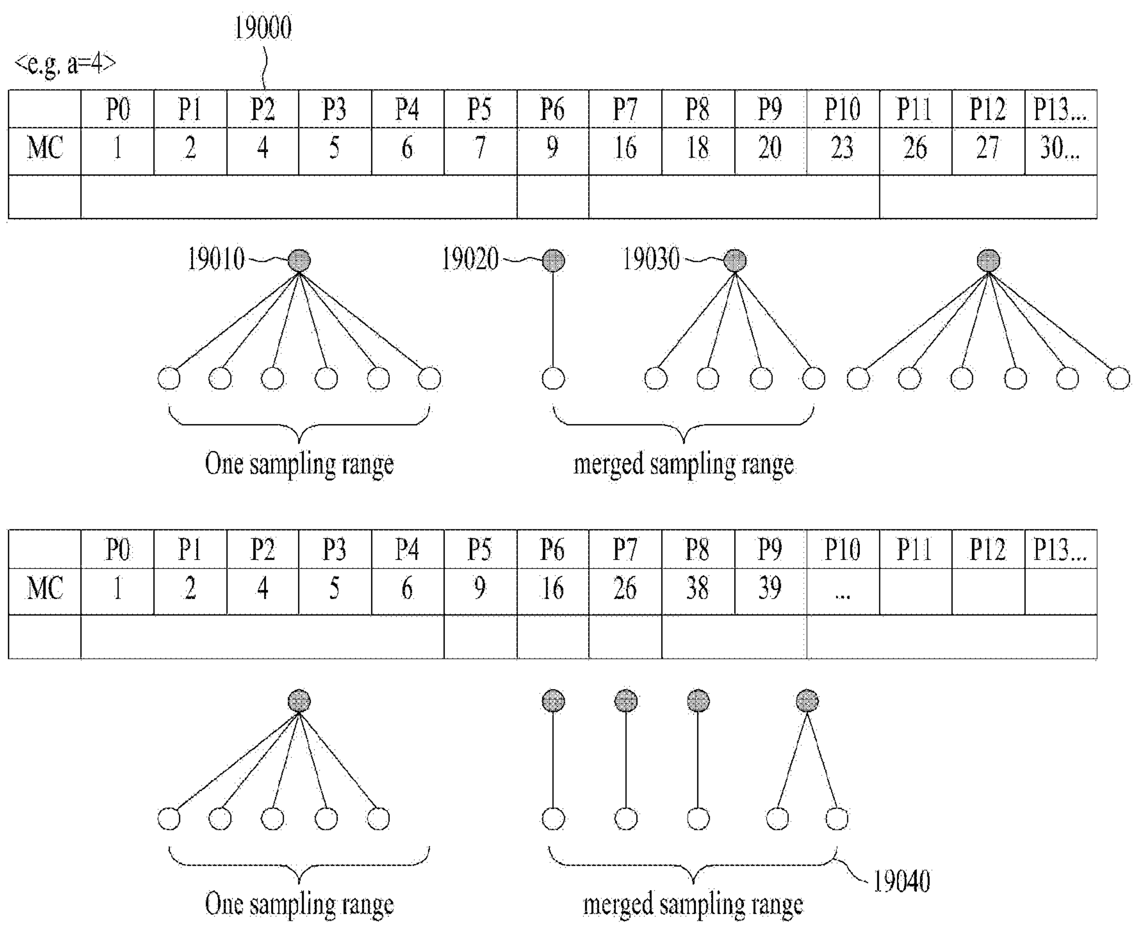
FIG. 19 illustrates merging an isolated node according to embodiments.

FIG. 19 illustrates merging an isolated node according to embodiments.

FIG. 19 illustrates an example of S16030 in FIG. 16.

An isolated node refers to point(s) whose number when reorganized is less than or equal to a specific number.

A case where the minimum number of points of a node, a, illustrated in S16030 of FIG. 16, is 4 will be described as an example.

For example, there may be points 19000 sorted in order of Morton codes. As a result of reorganizing the sorted points based on the operations described with reference to FIGS. 16 to 18, the number of points belonging to the same node, as in 19010, may be greater than 4. In addition, there may be point(s) which have 4 or fewer points belonging to the same node, as in 19020 and 19030.

The transmission/reception method/device according to the embodiments may merge points whose number is less than or equal to a specific number, rather than leaving the points as individual nodes. The merging process may be optional according to embodiments.

As the isolated nodes are merged, the number of reorganized points may be greater than or equal to the specific number. The reorganized points belonging to the same node have one sampling range. Also, the merged nodes have a merged sampling range.

FIG. 19 shows an example in which a node with one points and a node with 4 points are merged, and an example 19040 in which a node with 3 points and a node with 2 points are merged.

Figure 20:
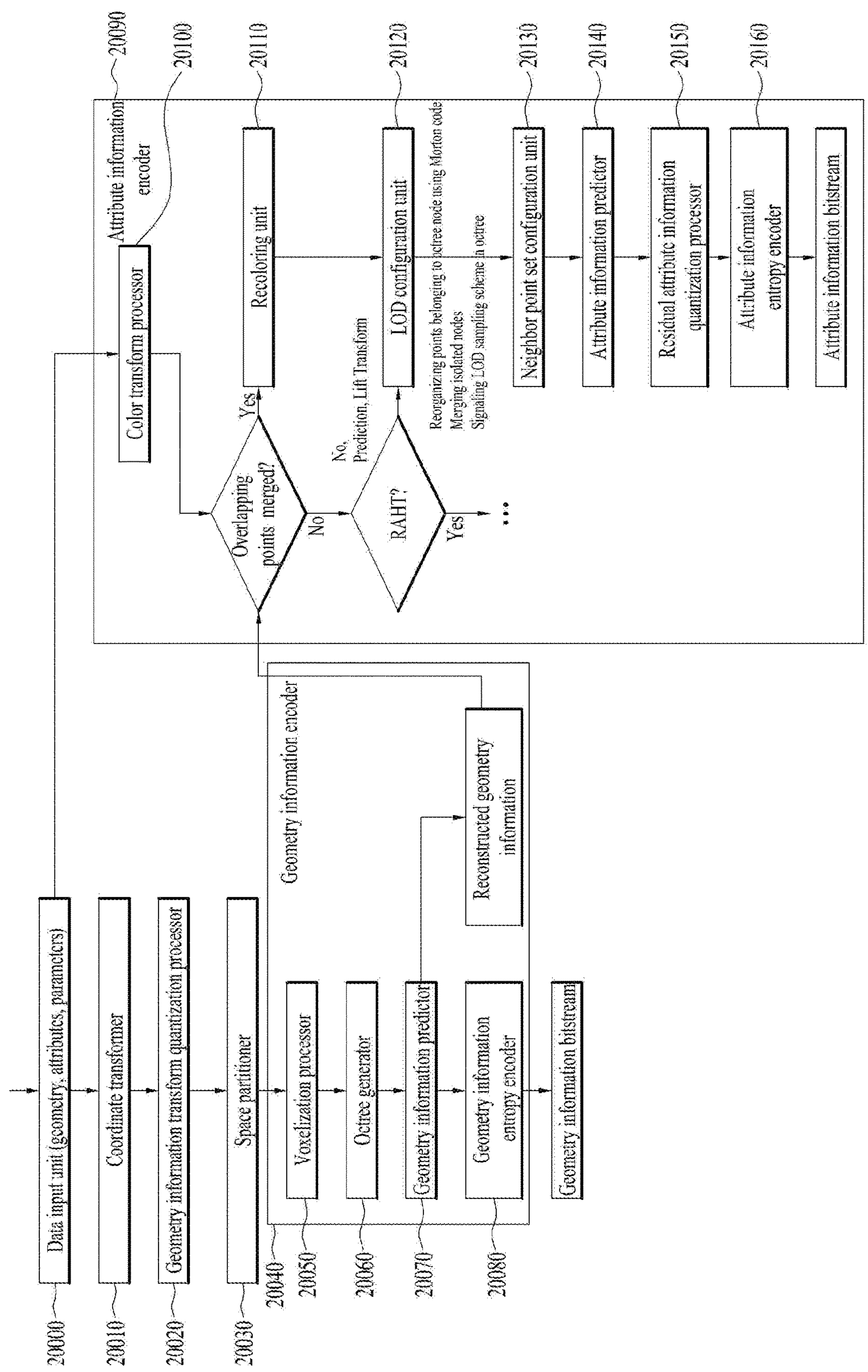
FIG. 20 illustrates a PCC data encoder according to embodiments.

FIG. 20 illustrates a PCC data encoder according to embodiments.

FIG. 20 is a configuration diagram of encoders according to embodiments (the transmission device 10000 in FIG. 1, the point cloud video encoder 10002 in FIG. 1, the encoding 20001 in FIG. 2, the encoder in FIG. 4, the encoder in FIG. 12, and the XR device 1430 in FIG. 14) that perform the operations in FIG. 16.

The PCC data encoder according to the embodiments may be referred to as an encoder, and the PCC data decoder according to the embodiments may be referred to as a decoder.

PCC data (point cloud data) may be input to and encoded by the encoder, and a geometry information bitstream and an attribute information bitstream (bitstreams for point cloud data) may be output.

Each element in FIG. 20 may correspond to hardware, software, a processor, and/or, a combination thereof.

A data input unit 20000 may receive geometry data, attribute data, and/or parameters related thereto.

A coordinate transformer 20010 may transform coordinates related to the position (coordinate) information of the geometry data. The coordinate transformer 17010 may correspond to the coordinate transformer 40000 in FIG. 4.

A geometry information transform quantization processor 20020 may be referred to as a geometry information transform quantizer. The geometry information transform quantization processor 20020 may correspond to the quantizer 40001 in FIG. 4. The geometry information transformation quantization processor 20020 may receive one full scale value (quantization value) and may adjust the scale for each axis according to distribution of content.

A space partitioner 20030 may partition the point cloud data into space partition units according to embodiments. The space partitioner 20030 may space-adaptively partition the data space using tiles, blocks, a density-based method, an axis-based method, an attribute-based method, a geometric-based method, or the like according to data characteristics of the point cloud data. The space partitioner 20030 may perform data partitioning. A frame may be partitioned into tiles and slices. Source point cloud data may be partitioned into a plurality of slices and encoded within a bitstream. A slice is a set of points that may be encoded or decoded independently. A slice may include one geometry data unit and zero or one or more attribute data units. Attribute data units may depend on corresponding geometry data in the same slice. In a slice, the geometry data unit may appear before the related attribute units. The data units in the slice are contiguous. A group of slices may be identified by a common tile identifier. Tile information describing a bounding box for each tile may be present in the bitstream. A tile may overlap other tiles in the bounding box. Each slice may include an index for identifying that a tile belongs thereto.

A geometry information encoder 20040 may encode geometry data of the point cloud data. The detailed process of geometry encoding is described below.

A voxelization processor 20050 may voxelize the geometry data. The voxelization processor 20050 may correspond to the voxelizer 40001 in FIG. 4.

The octree generator 20060 may be referred to as an octree generation unit. The octree generator 20060 may correspond to the octree analyzer 40002 in FIG. 4. The octree generator 20060 may generate geometry data in an octree structure.

When a geometry octree is used, geometry encoding may be performed as follows: 1) A bounding box defined by two points may be defined. The octree structure is built by recursively subdividing the bounding box. Each cube is divided into 8 sub-cubes. The 8-bit code may be referred to as an occupancy code. One bit per sub-cube may be expressed as 1 when the point is filled, or 0 when the point is empty. Sub-cubes whose side is greater than 1 are further divided. A sub-cube having the size of 1 may be a voxel. Multiple points may overlap and be mapped to the same sub-cube (voxel). The points of each sub-cube may be arithmetically encoded.

The decoding process may be started by reading the dimensions of the bounding box from the bitstream. The same octree structure may be generated by dividing the bounding box according to the occupancy codes. When the sub-cube of dimension 1 is reached, the points of the sub-cube may be arithmetically decoded.

The octree generator 20060 constructs an octree from the received geometry information bitstream (geometry data). For the spatial scalability function, the octree generator 20060 may construct geometry information only at a specific level of the octree. In this case, the position value may be changed to the value of the center of the bounding box.

The octree generator 20060 may construct and decode points to which attribute decoding is to be applied starting at the restored octree depth level for partial geometry decoding.

A geometry information predictor 20070 may perform prediction on geometry data. The geometry information predictor 20070 may generate a prediction value for the geometry data between a parent node and a child node in the octree structure. A residual bit value may be generated through the predicted value to perform entropy coding on the residual value to construct a geometry bitstream. Efficient bitstream transmission may be implemented by coding only the residual value for the predicted value. The geometry information predictor 20070 may restore (reconstruct) the geometry data from the geometry octree for attribute coding. This is because attribute coding is performed based on the reconstructed geometry data.

The geometry information entropy encoder 20080 may perform entropy coding on the geometry data to generate a geometry bitstream.

An attribute information encoder 20090 may encode attribute data as follows.

A color transform processor 20100 may transform the color of the attribute data according to data characteristics.

The color re-adjuster 20110 may be referred to as a recoloring unit, a color re-colorer, or a re-colorer. According to embodiments, when overlapping points are merged in the reconstructed geometry octree structure, the attribute information encoder 20090 may perform recoloring, or perform RAHT attribute coding or configure LOD according to prediction/lifting transform attribute coding. According to embodiments, when the overlapping points are not merged, recoloring and/or LOD configuration may be performed even in RATH coding. According to embodiments, in performing attribute information encoding based on the reconstructed geometry data, recoloring may be performed in the case of lossy geometry, or LOD is configuration may be performed in case of prediction/lifting transform attribute coding, not the lossy geometry. When there are multiple points in one voxel and the voxel is formed by merging overlapping points by lossy compression, the operation of the color re-adjuster may be applied. In addition, when the geometry quantization coefficient is less than 1, a plurality of points may be included in one voxel. In this case, recoloring, LOD configuration, and neighbor point set configuration may be performed. The color re-adjuster 20110 may search for neighbor points close to the center position of the voxel in the original point cloud to set the representative color of the voxel, and calculate the representative color based on the neighbor points. In the process of searching for the neighbor points, the geometry information may be inversely quantized to restore the position difference between the original and the quantized value. The color re-adjuster 20110 may perform inverse quantization for each axis in performing inverse quantization.

The LOD configuration unit 20120 may configure an LOD from the point cloud data. The LOD configuration unit 20120 may generate an LOD from the attribute data re-adjusted in color based on the restored geometry information (geometry data). When prediction/lift transform, not RAHT, is applied during attribute coding, an LOD may be generated. The LOD configuration unit 20120 may reorganize points belonging to a node using Morton codes, merge isolated nodes, perform LOD sampling according to embodiments in the octree node, and generate and deliver related information as signaling information.

The LOD configuration unit 20120 may set the depth level of the octree to support spatial scalability in attribute encoding/decoding, and configure and encode/decode points to which attribute encoding is to be applied, staring at the set octree depth level (see FIG. 17). The LOD configuration unit 20120 may be referred to as an LOD generator, an LOD configuration device, or the like.

The octree depth level may be transmitted by the encoder according to the embodiments to the decoder as signaling information, and may be changed according to use thereof or the computing performance of the decoder.

The LOD configuration unit 20120 may perform point reorganization for each octree node by calculating a Morton code range for each octree node at the points sorted by the Morton codes (see FIG. 18).

The LOD configuration unit 20120 may set a minimum number of node points (value of a) to distinguish a case where the number of points of a node is less than the minimum number of node points. The set value may be signaled to the decoder as signaling information.

The process of merging the node with the next consecutive node when the number of points of the node is less than the minimum number of node points may be referred to as isolated node merging processing (see FIG. 19), and whether to perform the isolated node merging processing may be signaled to the decoder as signaling information.

When the number of points of the node is less than the minimum number of node points, the node may be merged with the next consecutive node. The merging may be allowed to be performed up to r times (see FIG. 19). The maximum number of time of merging, r, may be signaled to the decoder as signaling information.

There is a method for selecting (sampling) one point (including the merged node) from the points belonging to a node (see FIG. 16). The method may be signaled to the decoder as signaling information. As the method, an N-th point may be selected, a point close to the center position of the octree parent node region may be selected, or a point with a middle index may be selected.

A neighbor point set configuration unit 20130 configures a neighbor point set for a point belonging to an LOD in the LOD and higher LODs based on the LOD.

After generating the LODl set, X (>0) nearest neighbors may be found in a group at the same or lower LOD (a group in which the distance between nodes is long) based on the LODl set, and be registered in the predictor as a neighbor point set.

Every point may have a single predictor. The attributes are predicted from the neighbor points registered in the predictor.

The predictors may be used to predict attributes. The average of the values obtained by multiplying the attributes of the registered neighbor points by a weight may be used as a predicted result, or a specific point may be used as the predicted result. Regarding which method to use, a compressed result value may be pre-calculated, and then a method capable of generating the smallest stream may be selected.

The residual between the attribute value of a point and an attribute value predicted by the predictor of the point may be encoded together with the method selected by the predictor and signaled to the receiver.

The decoder may decode the transmitted prediction method and predict an attribute value according to the method. The attribute value may be restored by decoding the transmitted residual value and adding the predicted value thereto.

An attribute information predictor 20140 predicts an attribute value of a point from a set of neighbor points.

A residual attribute information quantization processor 20150 may generate a predicted value for the attribute data, generate a residual value between the predicted value and the attribute value, and quantize the residual value.

For example, in encoding point Px, when a set of neighbor points of Px is configured, the attribute value of Px may be predicted based on the attribute values of the neighbor points in the set, a residual between the predicted attribute value and the attribute value of Px may be estimated, and the value of the residual may be encoded and transmitted to the decoder. The decoder configures a set of neighbor points of Px through LOD generation and the additional information received, predicts the attribute value of Px based on the attribute values of the neighbor points in the neighbor set, and restores the attribute value of Px by adding the received residual value to the predicted value.

When the prediction mode and residual information separation flag is true, the residual attribute information quantizer 20150 may calculate the residual between the predicted value according to the prediction mode and the value of the point, and encode a quantized value thereof together with the prediction mode.

When the prediction mode and residual information separation flag is false, the residual attribute information quantizer 20150 may calculate the residual between the predicted value according to the prediction mode and the point value, and encode only the quantized value thereof.

The attribute information entropy encoder 20160 may perform entropy coding on attribute data and generate an attribute bitstream. For example, the residual value may be coded and an attribute bitstream may be generated.

Figure 21:
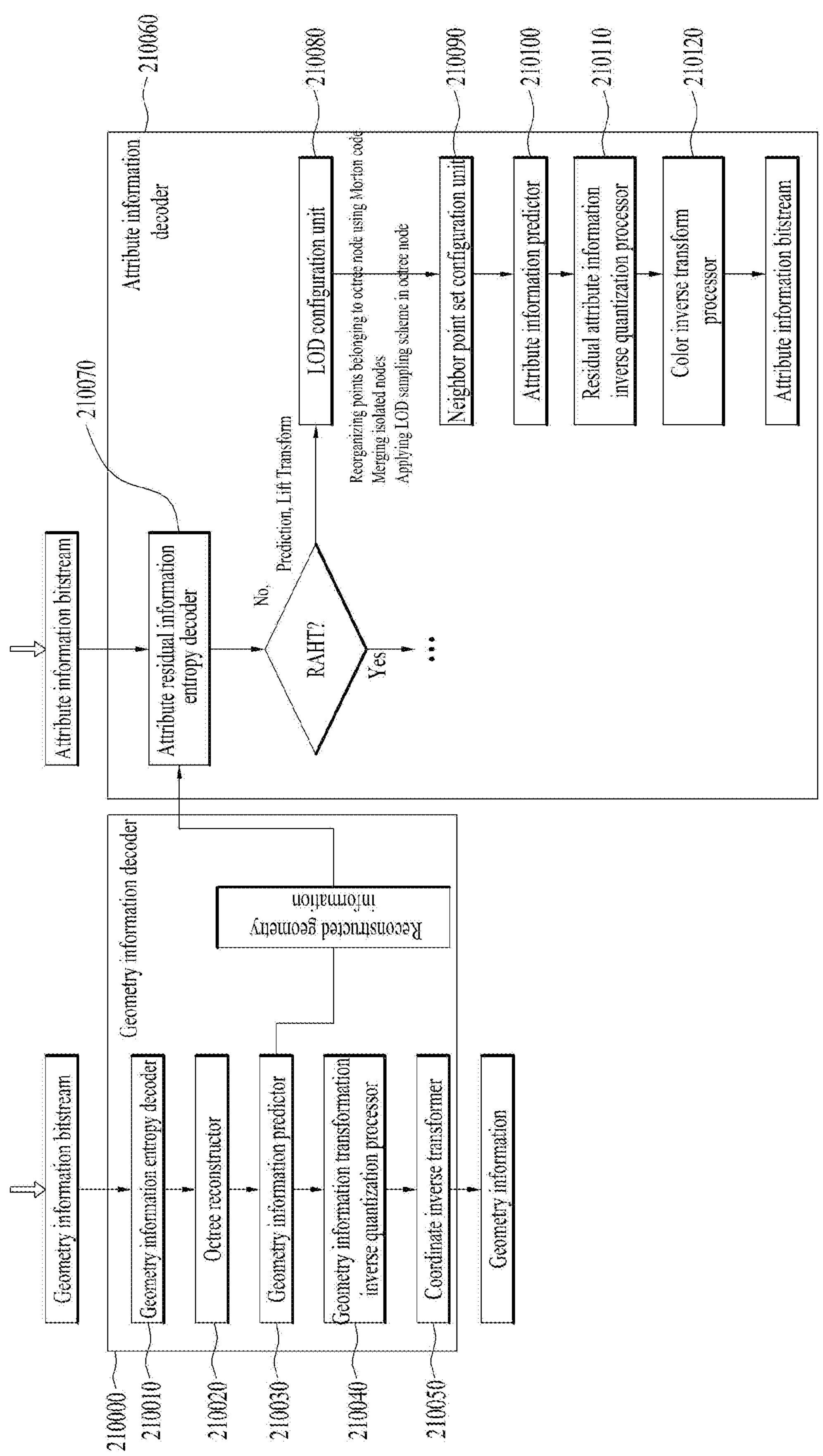
FIG. 21 illustrates a PCC data decoder according to embodiments.

FIG. 21 illustrates a PCC data decoder according to embodiments.

The decoder in FIG. 21 may correspond to the G-PCC decoder 15000 in FIG. 15, the G-PCC decoder 15010 in FIG. 15, the reception device 10004 in FIG. 1, the point cloud video decoder 10006 in FIG. 1, the decoding 20003 in FIG. 2, the decoder in FIGS. 10 and 11, the decoder in FIG. 13, and the XR device 1430 in FIG. 14.

A geometry information bitstream and attribute information bitstream encoded as an input of the decoder may be input and decoded, and reconstructed PCC data may be output.

Each element in FIG. 21 may correspond to hardware, software, processor and/or a combination thereof.

A geometry information decoder 210000 may receive a geometry information bitstream and decode the geometry information. The geometry information decoder 210000 may be a decoder on the receiving side corresponding to the geometry information encoder 20040 on the transmitting side. The geometry information decoder 210000 may perform a reverse process of the operation of the geometry information encoder 20040.

A geometry information entropy decoder 210010 may receive the geometry information bitstream and decode the geometry information based on the entropy scheme. The geometry information entropy decoder 210010 may perform a reverse process of the operation of the geometry information entropy encoder 20080.

An octree reconstructor 210020 may reconstruct an octree from the geometry information. The octree reconstructor 210020 may perform a reverse process of the operation of the octree generator 20060.

A geometry information predictor 210030 may generate a predicted value of the geometry information. For example, an inter-node predicted value may be generated in the octree structure, and the geometry information may be efficiently decoded using a residual value for the predicted value. The geometry information predictor 210030 may perform a reverse process of the operation of the geometry information predictor 20070.

A geometry information transformation inverse quantization processor 210040 may inversely quantize geometry data. For example, the geometry information transformation inverse quantization processor 210040 may acquire a scale value (quantization value) for each axis from the signaling information (parameter) contained in the bitstream, and may apply inverse quantization to the geometry information reconstructed based on the scale value for each axis.

A coordinate inverse transformer 210050 may inversely transform coordinate information about the geometry information. The coordinate inverse transformer 210050 may perform a reverse process of the operation of the coordinate transformer 20010.

The attribute information decoder 210060 may receive an attribute information bitstream and decode the attribute information. The attribute information decoder 210060 may perform a reverse process of the operation of the attribute information encoder 20090.

The attribute residual information entropy decoder 210070 may decode attribute residual information (e.g., a residual value for attribute information) contained in the attribute information bitstream based on the entropy scheme. The attribute residual information entropy decoder 210070 may perform a reverse process of the operation of the attribute information entropy encoder 20160.

An LOD configuration unit 210080 may configure an LOD from point cloud data. The LOD configuration unit 210080 may generate an LOD from the attribute data re-adjusted in color based on the restored geometry information (geometry data). When prediction/lift transform, not RAHT, is applied during attribute coding, an LOD may be generated. The LOD configuration unit 210080 may correspond to the LOD configuration unit 20120 of FIG. 20.

The LOD configuration unit 210080 may reorganize points belonging to a node using a Morton code, merge isolated nodes, and perform LOD sampling according to embodiments in the octree node.

The LOD configuration unit 210080 may construct and decode points to which attribute decoding is to be applied, starting at the octree depth level restored for partial attribute decoding (see FIG. 17).

The LOD configuration unit 210080 may perform point reorganization for each octree node by calculating a Morton code range for each octree node from the points sorted by the Morton codes (see FIG. 18).

The LOD configuration unit 210080 may merge a consecutive node with the node when the number of points of the node is less than the minimum number of restored node points, that is, a (see FIG. 19).

The process of merging the node with the next consecutive node when the number of points of the node is less than the minimum number of node points may be referred to as isolated node merging processing, and merging may be performed depending on the decoded indication of whether isolated node merging processing is to be performed.

When the number of points of the node is less than the minimum number of node points, the node may be merged with the next consecutive node. The merging may be allowed to be performed r times, that is, the restored maximum number of times of merging.

One point may be selected from among the points belonging to a node (including a merged node) based on the scheme of selecting a restored point. The scheme may include a scheme of selecting an N-th point, a scheme of selecting a point close to the center position of the octree parent node region, and a scheme of selecting a point with a middle index (see FIG. 16).

A neighbor point set configuration unit 210090 may search for neighbor points of points included in the LODs based on the LOD generated from the attribute information bitstream and register the same as a neighbor point set. The neighbor point set configuration unit 210090 may correspond to the neighbor point set configuration unit 20130 in FIG. 20.

An attribute information predictor 210100 may generate a predicted value for the attribute information. For example, the attribute information predictor may generate a predicted value for a point from the LODs and the set of neighbor points, and generate a residual value for the predicted value. The attribute information predictor 210100 may perform a reverse process of the operation of the attribute information predictor 20140.

A residual attribute information inverse quantization processor 210110 may inversely quantize the residual attribute information, for example, a residual value for the attribute information. The residual attribute information inverse quantization processor 210110 may perform a reverse process of the operation of the residual attribute information quantization processor 20150.

A color inverse transform processor 210120 may inversely transform color information, which is attribute information. The color inverse transform processor 210120 may perform a reverse process of the operation of the color transform processor 20100.

Figure 22:
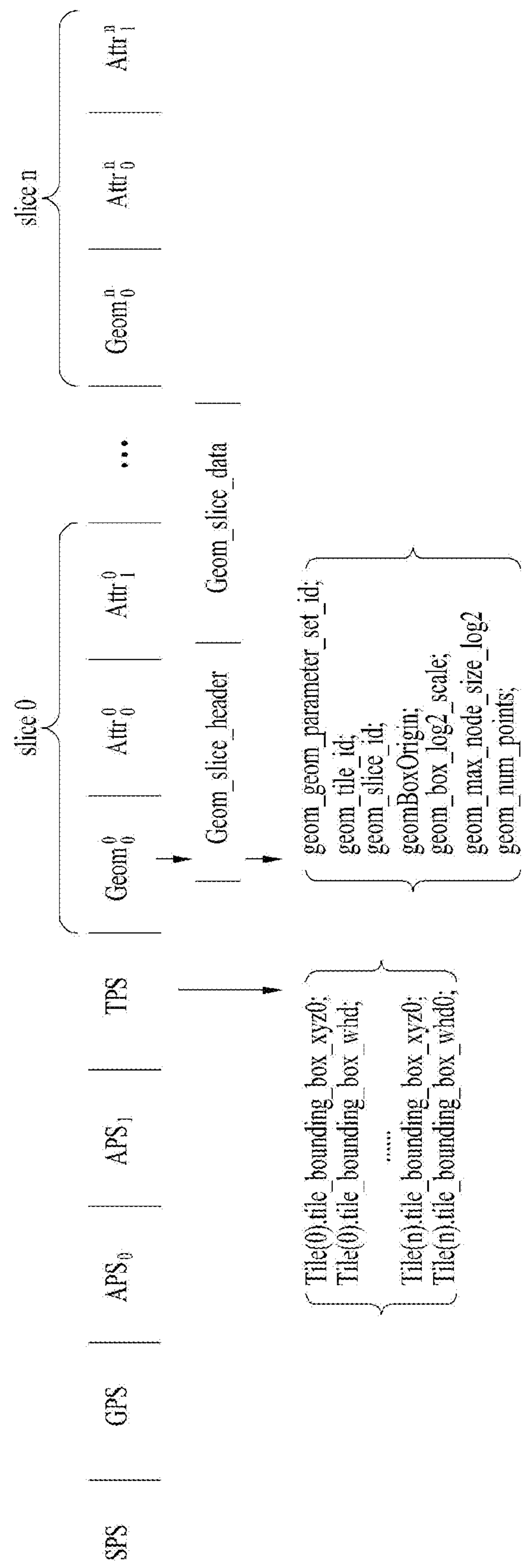
FIG. 22 illustrates a bitstream structure of point cloud data according to embodiments.

FIG. 22 illustrates a bitstream structure of point cloud data according to embodiments.

A method/device according to the embodiments may generate and acquire a point cloud bitstream as shown in FIG. 22. For example, a point cloud bitstream containing geometry information, attribute information, and/or parameters including metadata therefore may be generated (encoded) and received (decoded) by the transmission device 10000, the point cloud video encoder 10002, the reception device 10004, the point cloud video decoder 10006 in FIG. 1, the encoding 20001 and decoding 20003 in FIG. 2, the encoding process in FIG. 4, the decoding process in FIG. 11, the transmission device in FIG. 12, the reception device in FIG. 13, the XR device 1430 in FIG. 14, the encoder in FIG. 20, the decoder in FIG. 21, and the like.

Information for embodiments may be signaled.

The following abbreviations are used in the present disclosure: SPS (Sequence Parameter Set); GPS (Geometry Parameter Set); APS (Attribute Parameter Set); TPS (Tile Parameter Set); Geom (Geometry Bitstream (Geometry bitstream=geometry slice header+geometry slice data)); Attr (Attribute bitstream (=attribute brick header+attribute brick data)). Here, the brick may be referred to as a block or the like.

The point cloud data according to the embodiments may take the form of a bitstream as shown in FIG. 19. The point cloud data may contain a sequence parameter set (SPS), a geometry parameter set (GPS), an attribute parameter set (APS), and a tile parameter set (TPS) containing signaling information according to embodiments. The point cloud data may contain one or more geometries and/or attributes. The geometry and/or attributes in the point cloud data may be divided into one or more slices (or bricks/blocks). The geometry may have a structure of a geometry slice header and geometry slice data. For example, the TPS containing signaling information may include Tile(0)_tile_bounding_box_xyz0 and Tile(0)_tile_bounding_box_whd. The geometry may include geom_geom_parameter_set_id, geom_tile_id, geom_slice_id, geomBoxOrigin, geom_box_log2_scale, geom_max_node_size_log2, and geom_num_points.

The signaling information according to the embodiments may be added to the SPS, GPS, APS, TPS, or the like and signaled.

According to embodiments, the signaling information may be added to the TPS, the geometry (Geom) for each slice, or the attribute (Attr) for each slice and signaled.

The structure of the point cloud data according to the embodiments may efficiently provide parameter set(s), geometry(s), and attribute(s) including signaling information in terms of encoding/decoding/data.

The point cloud data related to the point cloud data transmission/reception device according to the embodiments may contain at least one of a sequence parameter, a geometry parameter, an attribute parameter, a tile parameter, a geometry bitstream, or an attribute bitstream.

Hereinafter, syntax of specific signaling information will be described with reference to the drawings. For reference, the name of the signaling information according to the embodiments may be changed/extended within the intended meaning/function range of the signaling information. The field of signaling information may be distinguishably referred to as first signaling information, second signaling information, or the like.

As described above, the point cloud data transmission device (for example, the point cloud data transmission device described with reference to FIGS. 1, 11, 14 and 20) may transmit encoded point cloud data in the form of a bitstream. According to embodiments, the bitstream may include one or more sub-bitstreams.

The point cloud data transmission device (for example, the point cloud data transmission device described with reference to FIGS. 1, 4, 12, and 17) divides an image of the point cloud data into one or more packets in consideration of an error of a transmission channel, and be transmitted over a network. A bitstream according to embodiments may contain one or more packets (e.g., network abstraction layer (NAL) units). Accordingly, even when some packets are lost in a poor network environment, the point cloud data reception device may restore the image using the remaining packets. The point cloud data may divided into one or more slices or one or more tiles and processed. The tiles and slices according to embodiments are regions for partitioning a picture of the point cloud data and processing the same through point cloud compression coding. The point cloud data transmission device may provide high-quality point cloud content by processing data corresponding to each region according to the importance of each divided region of the point cloud data. That is, the point cloud data transmission device according to the embodiments may process data corresponding to a region important to a user through point cloud compression coding with better compression efficiency and appropriate latency.

An image (or picture) of point cloud content according to embodiments is partitioned into basic processing units for point cloud compression coding. The basic processing unit for point cloud compression coding according to the embodiments may include a coding tree unit (CTU) and a brick, but is not limited to this example.

A slice according to embodiments is a region including basic processing units for one or more point cloud compression codings, and does not have a rectangular shape. The slice according to the embodiments contains data transmitted through a packet. A tile according to embodiments is a region partitioned in a rectangular shape in the image and includes basic processing units for one or more point cloud compression codings. One slice according to embodiments may be included in one or more tiles. Also, one tile according to embodiments may be included in one or more slices.

A bitstream 3000 according to embodiments may contain signaling information including a sequence parameter set (SPS) for signaling of a sequence level, a geometry parameter set (GPS) for signaling of geometry information coding, an attribute parameter set (APS) for signaling of attribute information coding, and a tile parameter set (TPS) for signaling of a tile level, and one or more slices.

The SPS according to the embodiments may be encoding information for an entire sequence such as a profile and a level, and may include comprehensive information about the entire file, such as picture resolution and video format.

One slice according to embodiments (e.g., slice 0 in FIG. 22) contains a slice header and slice data. The slice data may include one geometry bitstream Geom00 and one or more attribute bitstreams Attr00 and Attr10. The geometry bitstream may contain a header (e.g. geometry slice header) and a payload (e.g. geometry slice data). The header of the geometry bitstream according to the embodiments may contain identification information (geom_geom_parameter_set_id) about a parameter set included in the GPS, a tile identifier (geom_tile id), slice identifier (geom_slice_id), origin information about a geometry box (geomBoxOrigin), a geometry box scale (geom_box_log2_scale), a max geometry node size (geom_max_node_size_log2), the number of geometry points (geom_num_poins), and information about data contained in the payload. The attribute bitstream may contain a header (e.g. an attribute slice header or an attribute brick header) and a payload (e.g., attribute slice data or attribute brick data).

The method/device according to the embodiments may add, to the SPS, geometry quantization option information for each axis according to the embodiments in the point cloud bitstream to the SPS and signal the same. The geometry quantization option information for each axis according to the embodiments may be added to the GPS and signaled. The SPS may maintain the scale value (quantization value) applied as a whole, and the GPS may set a scale value (quantization value) which is fine-tuned for each axis.

When quantization is performed differently for each tile, geometry quantization option information for each axis according to embodiments may be added to the TPS and signaled. The geometry distribution may differ among the tiles divided by region. Accordingly, when a geometry quantization value (scale value) for each axis is set according to the distribution, or the quantization value for each axis is readjusted according to the percentage of each axis to one quantization value, geometry quantization for each axis may be performed differently for each tile.

The geometry quantization option information for each axis according to the embodiments may be added to a geometry header for each slice and signaled. The geometry distribution may differ among the slices. Accordingly, when a geometry quantization value (scale value) for each axis is set according to the distribution, or the quantization value for each axis is readjusted according to the percentage of each axis to one quantization value, geometry quantization for each axis may be performed differently for each slice.

Accordingly, the transmission method/device according to the embodiments may include related parameter information (signaling information) in a bitstream according to the quantization characteristics in the bitstream, and the reception method/device according to the embodiments may be allowed to statically/dynamically access point cloud data.

Related information may be signaled to implement embodiments. Signaling information according to embodiments may be used at the transmitting side or the receiving side.

Geometry bitstream (Geom): Geometry bitstream=geometry slice header+geometry slice data Attribute bitstream (Attr): Attribute bitstream=attribute brick header+attribute brick data.

The transmission method/device according to the embodiments may add, to the SPS or APS, attribute point configuration related information for the spatial scalability function of the attribute encoding/decoding process and signal the same.

The transmission method/device according to the embodiments may add, to the TPS or Attr for each slice, attribute point configuration related information for the spatial scalability function of the attribute encoding/decoding process and signal the same.

Tiles or slices are provided to and process the point cloud according to embodiments by partitioning the same into regions. That is, the point cloud data may be partitioned into regions, wherein the unit of partition may be a tile and/or a slice.

In dividing the point cloud data into regions, an option of generating a different neighbor point set for each region may be set, such that low complexity is obtained although the reliability of the result is somewhat low, or that high reliability is obtained although the complexity is high. This may be set differently according to the processing capacity of the receiver.

When a point cloud is divided into tiles, different processing options for overlapping point may be applied to the respective tiles.

When the point cloud is divided into slices, different processing options for overlapping point may be applied to the respective slices.

Attribute slice data may be changed and signaled according to an option related to prediction mode processing.

FIGS. 23 to 26 show detailed syntax of signaling information contained in the bitstream of the point cloud data in FIG. 22. To support the operation according to the embodiments, the transmission device and the reception device according to the embodiments may provide a signaling scheme as described below.

FIG. 23 shows a sequence parameter set according to embodiments.

FIG. 23 shows a sequence parameter set contained in a bitstream according to embodiments as shown in FIG. 22. The metadata, parameters, or signaling information in FIG. 23 may be generated, transmitted and received by the transmission device 10000 in FIG. 1, the point cloud video encoder 10002 in FIG. 1, the reception device 10004 in FIG. 1, the point cloud video decoder 10006 in FIG. 1, the encoding 20001 in FIG. 2, the decoding 20003 in FIG. 2, the encoding process in FIG. 4, the decoding process in FIG. 11, the transmission device in FIG. 12, the reception device in FIG. 13, the XR device 1430 in FIG. 14, the encoder in FIG. 20, the decoder in FIG. 21, or the like.

Information related to configuration of attribute points for the spatial scalability function of the attribute encoding/decoding process may be added to the sequence parameter set and signaled. With the syntax in FIGS. 23 to 26, attributes for supporting the spatial scalability function may be efficiently signaled. The name of the signaling information may be understood within the scope of the meaning and function of the signaling information.

LOD_generation_direction indicates an LOD generation direction.

For example, when LOD_generation_direction is equal to 0, this indicates generating LODs from LOD0 to LODN (that is, proceeding from the root node to the leaf node in the case of the octree). When LOD_generation_direction is equal to 1, this indicates generating LODs LOD0 from LODN (that is, proceeding from the leaf node to the root node in the case of the octree). Each integer value of this information is changeable according to embodiments.

sampling_select_type indicates a type of point selection in selecting one point from among points belonging to a node (including a merged node).

For example, when sampling_select_type is equal to 1, this indicates selection of the N-th point. When sampling_select_type is equal to 2, this indicates selection of a point close to the center position of the octree parent node region. When sampling_select_type is equal to 3, this indicates selection of a point having a middle index. Each integer value of this information is changeable according to embodiments.

sampling_isolated_node_min_number_of points indicates the minimum number of points belonging to a node that may be defined as an isolated node.

sampling_isolated_node_merge_flag indicates whether to merge an isolate node.

When sampling_isolated_node_merge_flag is 1, sampling_isolated_node_max_merge_range is signaled.

sampling_isolated_node_max_merge_range indicates the maximum merge range (number of consecutive nodes) for merging isolated nodes.

sampling_select_idx indicates the index of a point to be selected by the N-th point selection according to sampling_select_type. It may be set to 0 as a default value, which means to select the first point.

When sampling_select_type is 1, sampling_select_idx is signaled.

profile_idc indicates a profile to which by a bitstream according to embodiments conforms. Bitstreams shall not contain values of profile_idc other than those specified in the embodiments. The values of profile_idc are reserved for future use by ISO/IEC.

When profile_compatibility_flags is equal to 1, it indicates that the bitstream conforms to the profile indicated by profile_idc equal to j.

sps_num_attribute_sets indicates the number of coded attributes in the bitstream. The value of sps_num_attribute_sets may be in the range of from 0 to 63.

attribute_dimension[i] indicates the number of components of the i-th attribute.

attribute_instance_id[i] indicates an instance identifier for the i-th attribute.

FIG. 24 shows an attribute parameter set according to embodiments.

FIG. 24 shows a sequence parameter set contained in a bitstream according to embodiments as shown in FIG. 22. The metadata, parameters, or signaling information in FIG. 24 may be generated, transmitted and received by the transmission device 10000 in FIG. 1, the point cloud video encoder 10002 in FIG. 1, the reception device 10004 in FIG. 1, the point cloud video decoder 10006 in FIG. 1, the encoding 20001 in FIG. 2, the decoding 20003 in FIG. 2, the encoding process in FIG. 4, the decoding process in FIG. 11, the transmission device in FIG. 12, the reception device in FIG. 13, the XR device 1430 in FIG. 14, the encoder in FIG. 20, the decoder in FIG. 21, or the like.

aps_attr_parameter_set_id provides an identifier for the APS for reference by other syntax elements. The value of aps_attr_parameter_set_id may be in the range of 0 to 15, inclusive.

aps_seq_parameter_set_id specifies the value of sps_seq_parameter_set_id for the active SPS. The value of aps_seq_parameter_set_id may be in the range of 0 to 15, inclusive.

If attr_coding_type is equal to 0 or 2, the lifting indication information (isLifting) is 1. Otherwise, isLifting is 0.

Lifting-related signaling information is signaled as follows according to the lifting indication information.

lifting_num_pred_nearest_neighbours specifies the maximum number of nearest neighbors to be used for prediction. The value of lifting_num_pred_nearest_neighbours may be in the range of 1 to xx.

lifting_max_num_direct_predictors specifies the maximum number of predictor to be used for direct prediction. The value of lifting_max_num_direct_predictors may be in the range of 0 to lifting_num_pred_nearest_neighbours. The value of the variable MaxNumPredictors may be used in the decoding process as follows:

MaxNumPredictors=lifting_max_num_direct_predicots+1.

For spatial_scalability_attribute_octree_level, LOD_generation_direction, sampling_select_type, sampling_isolated_node_min_number_of_points, sampling_isolated_node_merge_flag, sampling_isolated_node_max_merge_range, and sampling_select_idx according to the embodiments, refer to the description of FIG. 23.

FIG. 25 shows a tile parameter set according to embodiments.

FIG. 25 shows a sequence parameter set contained in a bitstream according to embodiments as shown in FIG. 22. The metadata, parameters, or signaling information in FIG. 25 may be generated, transmitted and received by the transmission device 10000 in FIG. 1, the point cloud video encoder 10002 in FIG. 1, the reception device 10004 in FIG. 1, the point cloud video decoder 10006 in FIG. 1, the encoding 20001 in FIG. 2, the decoding 20003 in FIG. 2, the encoding process in FIG. 4, the decoding process in FIG. 11, the transmission device in FIG. 12, the reception device in FIG. 13, the XR device 1430 in FIG. 14, the encoder in FIG. 20, the decoder in FIG. 21, or the like.

The transmission device or the encoder according to the embodiments may signal the reception device or the decoder according to the embodiments by adding the property point configuration related information for spatial scalability of property encoding/decoding to the tile parameter set.

num_tiles specifies the number of tiles signaled for the bitstream. When not present, num_tiles is inferred to be 0.

tile_bounding_box_offset_x[i] indicates the x offset of the i-th tile in the cartesian coordinates. When not present, the value of tile_bounding_box_offset_x[0] is inferred to be sps_bounding_box_offset_x.

tile_bounding_box_offset_y[i] indicates the y offset of the i-th tile in the cartesian coordinates. When not present, the value of tile_bounding_box_offset_y[0] is inferred to be sps_bounding_box_offset_y.

For spatial_scalability_attribute_octree_level, LOD_generation_direction, sampling_select_type, sampling_isolated_node_min_number_of_points, sampling_isolated_node_merge_flag, sampling_isolated_node_max_merge_range, and sampling_select_idx according to the embodiments, refer to the description of FIG. 23.

FIG. 26 shows an attribute slice header according to embodiments.

FIG. 26 shows a sequence parameter set contained in a bitstream according to embodiments as shown in FIG. 22. The metadata, parameters, or signaling information in FIG. 26 may be generated, transmitted and received by the transmission device 10000 in FIG. 1, the point cloud video encoder 10002 in FIG. 1, the reception device 10004 in FIG. 1, the point cloud video decoder 10006 in FIG. 1, the encoding 20001 in FIG. 2, the decoding 20003 in FIG. 2, the encoding process in FIG. 4, the decoding process in FIG. 11, the transmission device in FIG. 12, the reception device in FIG. 13, the XR device 1430 in FIG. 14, the encoder in FIG. 20, the decoder in FIG. 21, or the like.

The transmission device or the encoder according to the embodiments may add the attribute point configuration related information for the spatial scalability function in the attribute encoding/decoding process to the attribute slice header and signal the same.

ash_attr_parameter_set_id specifies the value of the aps_attr_parameter_set_id of the active APS.

ash_attr_sps_attr_idx specifies the attribute set in the active SPS. The value of abh_attr_sps_attr_idx shall be in the range of 0 to sps_num_attribute_sets in the active SPS.

ash_attr_geom_slice_id specifies the value of the gsh_slice_id of the active Geometry Slice Header.

The PCC encoding method, PCC decoding method, and signaling method according to the above-described embodiments may provide the following effects.

Spatial scalability is a function to use a narrower bandwidth, such as a thumbnail, or to send and process a lower resolution point cloud to reduce the amount of decoder-side calculation when point cloud data is dense.

Embodiments provide a method for improving attribute compression efficiency by changing the scheme of sampling points for each LOD based on the octree in order for the encoder/decoder of Geometry-based Point Cloud Compression (G-PCC) for 3D point cloud data compression to provide the spatial scalability function such that the most suitable points for each LOD are configured as nodes.

The proposed method for reorganizing points for each octree node through the Morton code may reduce the encoding/decoding execution time by reducing the amount of calculation of encoding/decoding constituting the octree.

Considering a distance weight based on the center position value of the bounding box of the parent node applied for spatial scalability through the proposed scheme of sampling for each node, a point close to the center position value or a point having a middle index may be selected to reduce the error value of the distance weight to enhance attribute compression efficiency, as proposed herein.

Accordingly, the embodiments may provide an attribute compression method for providing the function of spatial scalability of the encoder/decoder of geometry-based point cloud compression (G-PCC) for compressing 3D point cloud data and may increase the attribute compression efficiency.

The PCC encoder and/or the PCC decoder according to the embodiments may have a spatial scalability effect by providing a method for changing the point sampling technique for each LOD based on an octree.

Next, description will be given of a geometry/attribute compression method for supporting spatial scalability of an encoder/decoder of G-PCC for compressing 3D point cloud data according to embodiments.

Embodiments propose a method for changing the method of setting a geometry point position value based on the octree and the method of point sampling for each LOD to provide the spatial scalability function in the attribute encoding/decoding process of G-PCC.

The method according to the embodiments includes the following.

1) A method of calculating the geometry position in partial restoration for supporting spatial scalability, 2) a method of sampling a reference point for each node, and 3) a signaling method for supporting the above methods are proposed.

Referring to FIG. 15, the embodiments relate to a method for compressing attributes for supporting spatial scalability of G-PCC for 3D point cloud data compression. When point cloud data is dense, a function to use a narrower bandwidth, such as a thumbnail, or to send and process a lower resolution point cloud to lower decoder-side computation complexity may be needed. This function is called spatial scalability.

The transmission/reception method/device according to the embodiments may provide the spatial scalability function through a process of encoding or decoding occupancy bits only up to a depth level selected by adjusting the depth level of the octree.

FIG. 27 illustrates attribute encoding/decoding according to embodiments.

FIG. 27 illustrates a method for setting a geometry position for providing the spatial scalability function as illustrated in FIG. 15

The method in FIG. 27 may be performed by the encoder in FIG. 20, the decoder in FIG. 21, and/or a transmission/reception device according to embodiments corresponding thereto.

In order to provide the spatial scalability function even for attribute encoding/decoding, the octree structure may need to be modified and applied. The method of generating LODs starting from the selected depth level of the octree, the method of calculating a neighbor node, and the method of calculating a weight may need to be changed to provide spatial scalability in attribute encoding/decoding.

Embodiments propose that a geometry position value be set in partial decoding of geometry. Embodiments also provide change the technique of sampling points for each LOD based on the octree and configure the most suitable points for each LOD as nodes to provide spatial scalability in attribute encoding/decoding to improve attribute compression efficiency.

Embodiments provide a method for changing the point sampling type for each LOD based on the octree to provide the spatial scalability function in the attribute encoding/decoding process of G-PCC.

Embodiments may set a representative position value of the octree for providing the spatial scalability function in geometry decoding. In order to provide the spatial scalability function for attribute encoding/decoding, an octree structure may be applied in geometry encoding/decoding. Embodiments provide a method of reorganizing points belonging to a node starting at a selected depth level of the octree, and a method of sampling points for each LOD.

The method of reorganizing points and the method of sampling points for each LOD are carried out in PCC attribute encoding/decoding of the PCC decoder/encoder, and may be applied when a prediction transform technique or a lifting transform technique is used in the attribute encoding/decoding process.

S270000 Geometry Construction

In decoding points in a point cloud, it is necessary to perform decoding only up to a specific octree depth and restore the position values of the points. A function to support this operation may be spatial scalability. In partially performing decoding at a middle depth of the octree, a node closest to the center position of the bounding box of each octree node may be sampled (selected) as the position of a point representing each octree node. In this case, when attributes are partially decoded, a Morton order, LOD configuration, and neighbor node search may be implemented based on a position set as the middle position of the node.

S270010 Morton Order-Based Sorting

Points in the point cloud may be changed to a Morton code based on the x, y, and z position values, and may be sorted based on the Morton code values.

S270020 Setting Attribute Partial Encoding/Decoding Region

In attribute encoding/decoding, a depth level of the octree may be set and points to which the attribute encoding is to be applied may be constructed and encoded/decoded starting at the set octree depth level, as in the geometry encoding/decoding (see FIG. 17).

S270030 Reorganizing Points Belonging to a Node Using Morton Code

A method for reorganizing the points sorted by the Morton code for each octree node may employ the following pseudocode (equation) described with reference to FIG. 16.

```
        nodeSizeLog2: Octree depth level
        PX_mortoncode: Morton code of PX
        end_range_mc: Morton code range of a node
Int maxNumOfPoints = pow(8, nodeSizeLog2 + 1);
For (int I = 1; I < indexCount; ++i) {
  if(Pi_mortoncode < end_range_mc) {
    ...
  } else {
    end_range_mc = Pi_mortoncode +
          (maxNumOfPoints −(Pi_mortoncode % maxNumOfPoints));
  }
}
```

The Morton code range of a node may be calculated based on the Morton codes of a point, an octree depth level, and the maximum number of points.

As shown in FIG. 18, end_range_mc may be estimated from the Morton code of a point. When the Morton code value of the next points is within the range of end_range_mc, the points may belong to the same node. When the Morton code value of the next points is outside the range, this may mean that the node has been changed a new node. In this case, end_range_mc may be estimated based on the Morton code of the point and applied to the subsequent points. In this way, points belonging to an octree node may be reorganized from the points sorted with the Morton code.

S270030 LOD Sampling at the Octree Node

Sampling may be performed by selecting a point from among the points belonging to a node (including a merged node). Attribute compression may be affected by the point selected. The best reference point is selected and reorganized into a reference region (retained list), and a set of neighbor nodes is constructed from the reference region. Accordingly, the compression efficiency may be increased.

When the positions of the octree nodes of the geometry are changed to a center point, errors produced at the parent node may be reduced by selecting positions close to the center position value as points selected in attribute coding. Accordingly, LOD sampling at the octree node may adopt a method of selecting a position close to the center of the parent node.

There may be many ways to find a position close to the center. Positions may be calculated to find the position correctly. To reduce the time required to find the position, reference may be made to a position on an octree node. Various selection schemes given below may be used. Sampling will be described with reference to FIGS. 28-30: 1) Selecting the first node at an LOD and then selecting the last node at the next consecutive upper LOD (see FIGS. 28 to 30); 2) Selecting a point close to the center of the octree parent node region; 3) Selecting a point having a middle index; and/or 4) a combinations thereof.

A method for receiving point cloud data according to embodiments may include receiving a bitstream containing the point cloud data, and decoding the point cloud data.

The point cloud data according to the embodiments may include geometry data and attribute data.

The decoding of the point cloud data according to the embodiments may include decoding the geometry data and decoding the attribute data.

The decoding of the geometry data according to the embodiments may include generating an octree structure for the geometry data, and sampling (selecting) a position of a point representing each node included in the octree structure as a node closest to a center position of a bounding box of each node.

According to embodiments, the decoding of the attribute data may include changing the position values of the points in the point cloud data to Morton codes based on the geometry data and the attribute data, sorting the points based on the Morton codes, and decoding points starting at a depth level of the octree structure including the points.

The decoding of the attribute data according to the embodiments may further include reorganizing points belonging to each node based on the Morton codes and a range value for the Morton codes.

According to embodiments, the decoding of the attribute data may include generating an octree structure for the geometry data, generating Levels of Detail (LODs) based on the octree structure, and sampling (selecting) a node belonging to an LOD from the LODs. That is, points included in the node are sampled.

Figure 28:
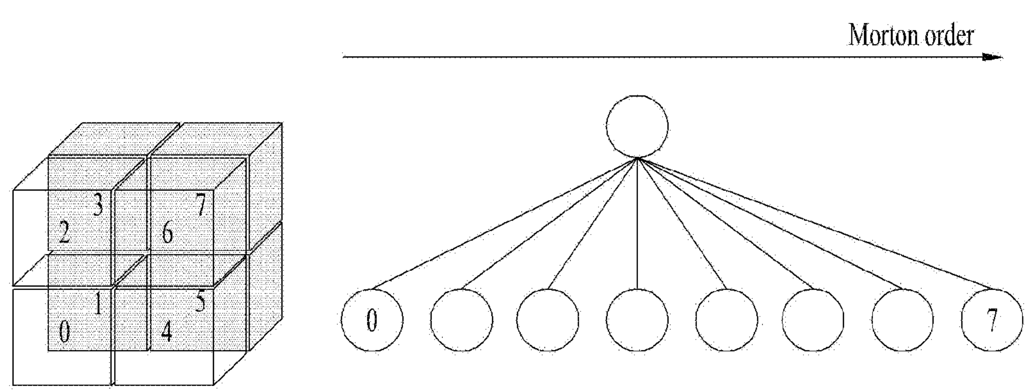
FIG. 28 illustrates a bounding box and node according to embodiments.

FIG. 28 illustrates a bounding box and node according to embodiments.

FIG. 28 represents S270010 in FIG. 27.

There may be eight nodes included in the bounding box. When sorted in order of Morton codes, points having values of 0 to 7 as Morton code values may be sequentially arranged.

Figure 29:
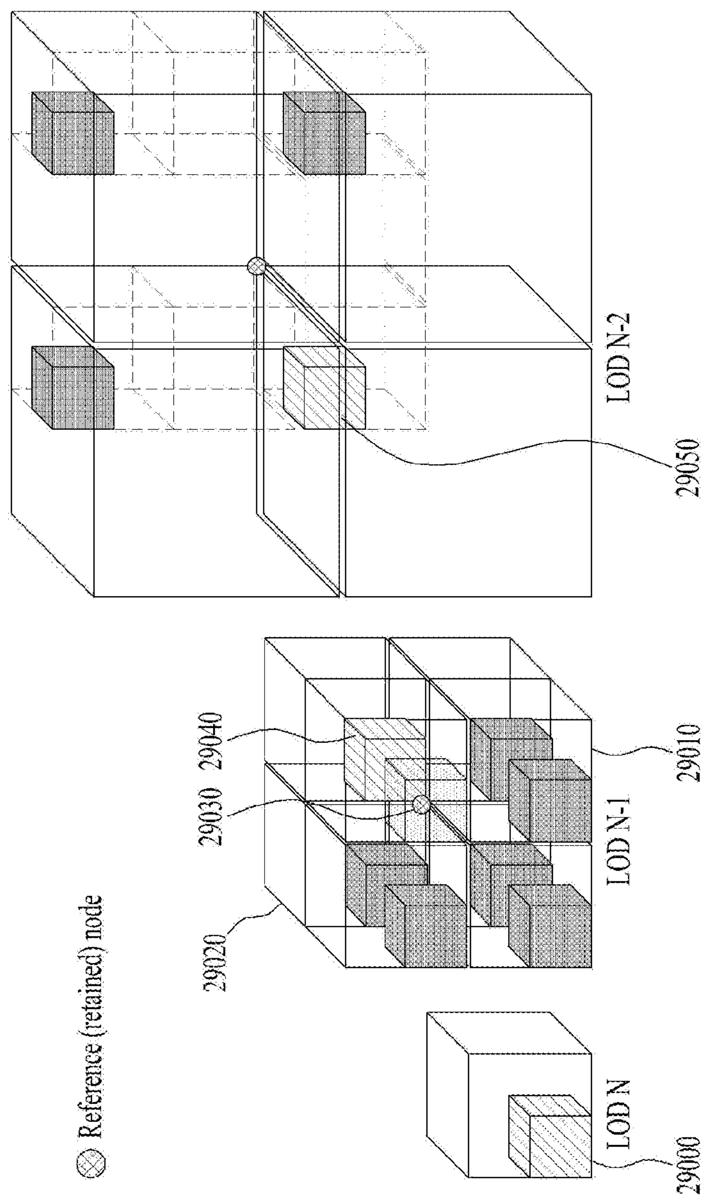
FIG. 29 illustrates matching between each node and a location according to embodiments.

FIG. 29 illustrates matching between each node and a position according to embodiments.

FIG. 29 illustrates an operation of matching each node with a position when points are sorted in order of Morton codes as in FIG. 29. FIG. 29 represents S270030 in FIG. 27.

A reference node (or retained node) represents a node (point) selected during sampling. For example, nodes (or points) 29000, 29040, and 29050 in FIG. 29 and a node (or point) in FIG. 30 may be reference nodes.

As shown in the figure, when a first node 29000 (LOD N) is selected, the node closest to the center position 29030 of the bounding box 29020 of the parent node 29010 (LOD N−1) of the first node may be the last node 29040. When the last node 29040 is selected at LOD N−1, the node closest to the center position of the parent node thereof at LOD N−2 may be the first node 29050.

Accordingly, in LOD sampling, the first node may be selected when the LOD is an even number, and the last node may be selected when the LOD is an odd number. Alternatively, the last node may be selected when the LOD is an even number, and the first node may be selected when the LOD is an odd number. The encoder may signal configuration information about the above-described selection scheme to the decoder.

That is, the encoder and/or decoder according to the embodiments provide various schemes for selecting a node closest to the center position on the parent node in the child node when LOD sampling is performed at the octree nodes. Embodiments include a scheme of using an even-numbered and odd-numbered index, or a scheme of selecting a node closest to the center position of a bounding box. For example, the node closest to the center position may be selected based on the distance, density, and attributes of points. In addition, in selecting a point close to the center position, a node close to the center may be sampled if the selected point belongs to a 2×2×2 node. Otherwise, an odd-numbered/even-numbered node (i.e., the first/last node) may be sampled.

Figure 30:
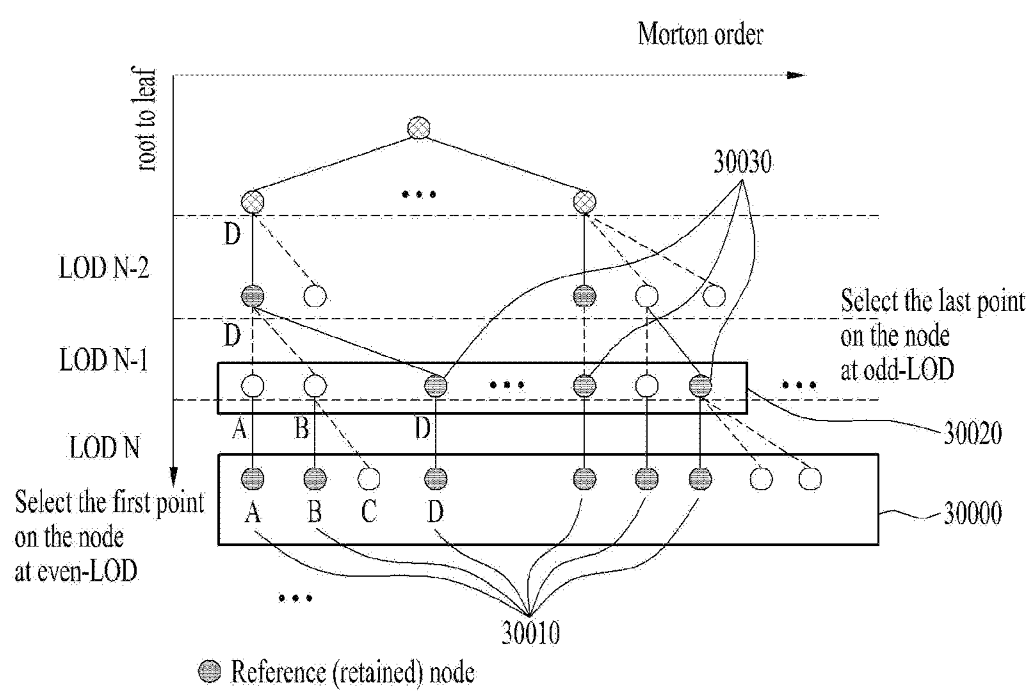
FIG. 30 illustrates selection of a reference node in an octree structure according to embodiments.

FIG. 30 illustrates selecting a reference node in an octree structure according to embodiments.

FIG. 30 illustrates the LOD sampling of FIGS. 28 and 29 (S270030 in FIG. 27) in an octree structure.

In the octree structure according to the embodiments, nodes may be distributed in order from the root node to a leaf node, and the next nodes belonging to a node may be sorted in order of Morton codes. The octree structure may include N LODs, and the transmission/reception method/device according to the embodiments may perform partial encoding and partial decoding starting at a specific depth level in the octree structure.

In the octree structure, the points belonging to LOD N are sorted in order of Morton codes, and the reference node is a node sampled at each LOD. When LOD N (where N may be referred to as the index of the LOD) is an even-numbered LOD, the first point may be selected from among the points. When LOD N−1 is an odd-numbered LOD, the last point may be selected from among the points. As the operation proceeds from a specific node to a parent node in the octree structure, nodes may be sequentially selected in order of the first node, the last node, the first node, the last node, and the like. This scheme may increase the gain of sampling.

For example, for the points 30000 belonging to LOD N, when LOD N is assumed to be an even-numbered LOD, the first node 30010 among the points sorted in order of the Morton codes belonging to the node may be selected (sampled) as a reference node (or retained node) 30010 for each parent node.

For the points 30020 belonging to LOD N−1, N−1 may be considered to be an odd number, and the last node 30030 among the points sorted in order of Morton codes belonging to the node may be selected (sampled) as a reference node for each parent node.

According to embodiments, sampling may be performed in a manner that the first node is sampled at the level at which LOD sampling is started, the last node is sampled at the next level, and the first node is sampled at the next level. Alternatively, sampling may be performed in a manner that the last node is sampled at the level at which LOD sampling is started, the first node is sampled at the next level, and the last node is sampled at the next level.

This operation may be expressed as a pseudocode as follows.

```
endIndex = 0
assignedPointCount = 0
for (lod = minGeomNodeSizeLog2; unprocessedPointCount > 0; lod++) {
  startIndex = assignedPointCount
  nonAssignedPointCount = 0
  samplingFromLastFlag = lod & 1 // The last digit of the bits is assigned 0 if the
LOD is even-numbered, and assigned 1 if the LOD is odd-numbered. //
  for (i = 0; i < unprocessedPointCount; i++) {
    currVoxelIndex = McodeUnsorted[unprocessedPointIndexes[i]] >> (3×(lod+1))
    if (samplingFromLastFlag == 0){
      if (i == 0) // This means that the LOD is even-numbered, and the first point
is sampled as a reference node.
        nonAssignedPointIndexes[nonAssignedPointCount++] =
unprocessedPointIndexes[i]
      else {
        prevVoxelIndex = McodeUnsorted[unprocessedPointIndexes[i−1]] >>
(3×(lod+1))
        if (currVoxelIndex > prevVoxelIndex)
          nonAssignedPointIndexes[nonAssignedPointCount++] =
unprocessedPointIndexes[i]
```

(Here, the sampled points are assigned to Nonassigned-PointsIndexes. The non-smapled points are assigned to assignedPointIndexes. By setting NonassignedPointsIndexes and assignedPointIndexes respectively, the method/device according to the embodiments may reorganize the LODs.)

```
  else
            assignedPointIndexes[assignedPointCount++] = unprocessedPointIndexes[i]
        }
      } else { // This means that the LOD is odd-numbered, and the last point is
sampled as a reference node.
        if (i == (unprocessedPointCount − 1))
          nonAssignedPointIndexes[nonAssignedPointCount++] =
unprocessedPointIndexes[i]
        else {
          nextVoxelIndex = McodeUnsorted[unprocessedPointIndexes[i+1]] >>
(3×(lod+1))
          if (currVoxelIndex < nextVoxelIndex)
            nonAssignedPointIndexes[nonAssignedPointCount++] =
unprocessedPointIndexes[i]
          (Here, NonassignedPointsIndexes represents the sampled points.)
      else
            assignedPointIndexes[assignedPointCount++] = unprocessedPointIndexes[i]
        }
      }
    }
    endIndex = assignedPointCount
    if (startIndex != endIndex) {
      numOfPointInSkipped = PointNumInSlice − PointCount
      if ((endIndex − startIndex) > (startIndex + numOfPointInSkipped)){
        for (loop = 0; loop < lod − minGeomNodeSizeLog2; loop++){
          computeNearestNeighbours(
            PointCount − unprocessedPointCountPerLevelOfDetail[loop],
            PointCount − unprocessedPointCountPerLevelOfDetail[loop+1],
            loop + minGeomNodeSizeLog2, assignedPointIndexes,
            McodeUnsorted, nonAssignedPointCount,
            nonAssignedPointIndexes)
        }
      }
    }
    computeNearestNeighbours(
            startIndex, endIndex,
            lod , assignedPointIndexes,
            McodeUnsorted, nonAssignedPointCount,
            nonAssignedPointIndexes)
    unprocessedPointCountPerLevelOfDetail[lod+1] = nonAssignedPointCount
    unprocessedPointCount = nonAssignedPointCount
    unprocessedPointIndexes = nonAssignedPointIndexes
  }
  Then, the following procedure is applied:
  for (i = 0; i < PointCount; i++)
    indexes[PointCount − 1 − i] = assignedPointIndexes[i]
    for (lod = 0; lod < LevelDetailCount; lod++)
    pointCountPerLevelOfDetail[lod] =
unprocessedPointCountPerLevelOfDetail[LevelDetailCount − 1 − lod]
    // The value of samplingFromLastFlag indicates whether to start sampling with the
first node (or referred to as Left) or with the last node (or referred to as Right) at the starting
LOD may be signaled.
```

According to embodiments, if signaling information such as a lifting LOD sampling related flag (lifting_lod_regular_sampling_enabled_flag) contained in a bitstream indicates the LOD sampling scheme, the LODs may be re-organized according to octree nodes based on geometry data (If lifting_scalability_enabled_flag equals 1, the level of detail generation process re-organizes the points into a set of refinement levels (R_l)_(l=0 . . . L−1), according to octree nodes based on geometry). Depending on the value of a sampling related flag (samplingFromLastFlag), the first point in the node (i.e., samplingFromLastFlag equals 0) or the last point in the node (i.e., samplingFromLastFlag equals 1) is sampled).

Next, the scheme of selecting a point close to a center of an octree parent node region and the scheme of selecting a point with a middle index according to embodiments will be described.

Selecting a point close to the center of the octree parent node region:

The transmission/reception method/device according to the embodiments may select a point closest to the center position of the bounding box of a parent node in selecting a point from among the points belonging to a node (including a merged node). Selecting a point closer to the center position of the parent node may reduce the error in selecting neighbor points and calculating neighbor point weights.

In selecting a neighbor point, the distance between points is calculated, and a point that is at a closer distance may be selected as a neighbor point. To provide the spatial scalability function, the position value of a point may be replaced with the value of the center position of the node to which the point belongs (the node may vary depending on the level of the LOD), and then the distance may be calculated. Accordingly, in order to find neighbor points of point Pi, the position value of Pi may be changed to the center position of the parent node according to the LOD1, and the position of point Ri in the neighbor point candidate list (retained list) R is also changed according to LODl. Then, the distances of points may be calculated. In other words, the distance between the center positions of the nodes at the same depth level may be calculated, thereby setting a neighbor node as a neighbor point. From the distance calculated in this way, a weight of the neighbor point, 1/distance=Pi, may be obtained. Since the distance is calculated by changing the position of the point to the center position of the parent node, the calculation contains an error. As the depth level of the node is lowered, i.e., the bounding box of a node is larger, the error may increase.

In order to reduce the error, a point close to the center of the parent node region may be selected as a reference point. The error may be reduced according to the position value of the reference point, and the reduced error may have a good effect on compression efficiency.

Selecting a Point with a Middle Index

In selecting a point from among the points belonging to a node (including a merged node), the transmission/reception method/device according to the embodiments may select a point with a middle index from among the points belonging to the node (including a merged node). Since there is a high probability that the node of the middle index is close to the center position of the bounding box of the parent node (in many cases), and selecting points through the middle index does not require much additional computation, the probability of finding a point close to the center position with a small amount of computation may be high.

A method for receiving point cloud data according to embodiments may include sampling (selecting) the first point or the last point in a node belonging to an LOD based on the LODs.

Figure 31:
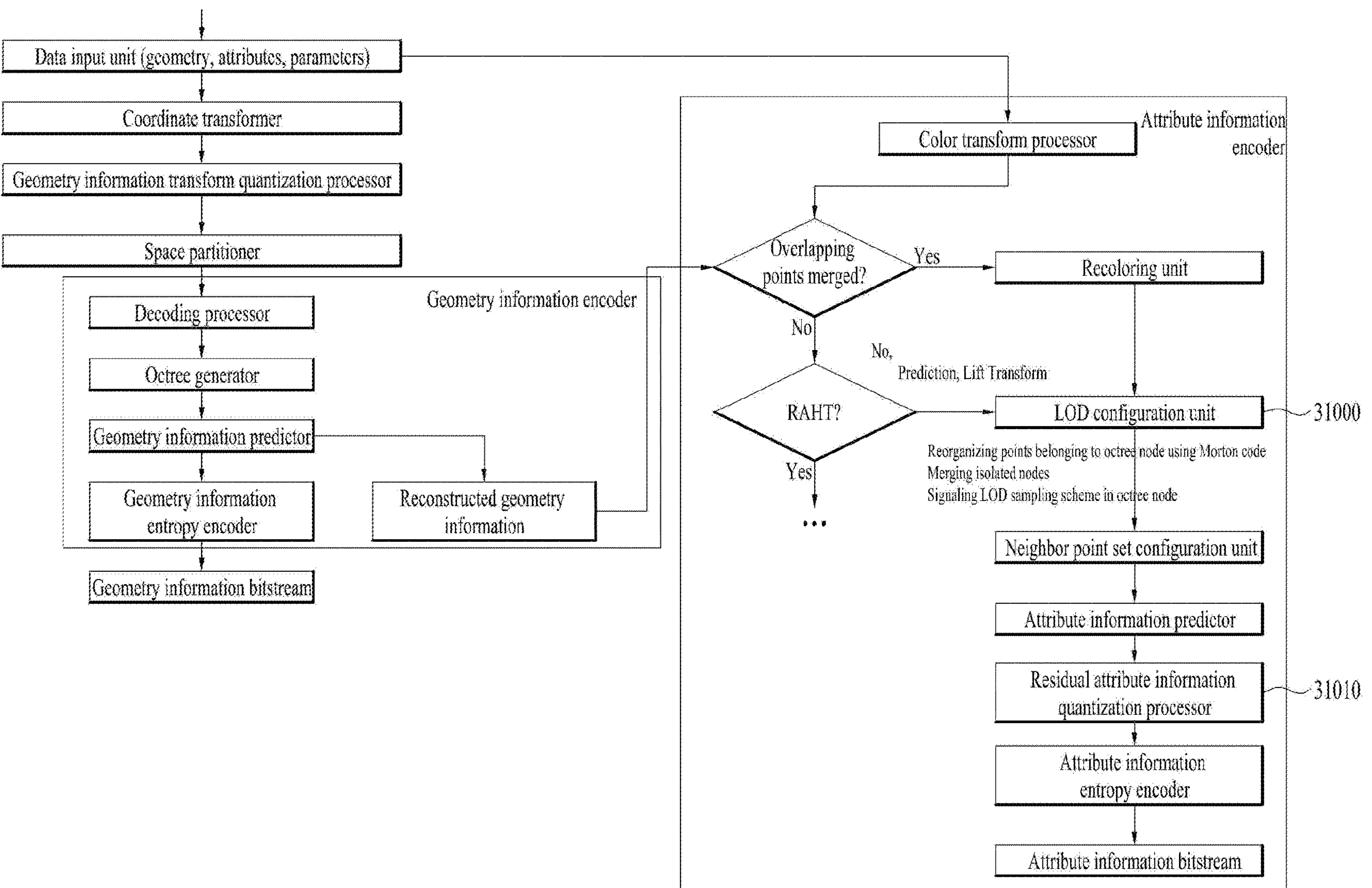
FIG. 31 illustrates a PCC data encoder according to embodiments.

FIG. 31 illustrates a PCC data encoder according to embodiments.

The encoder in FIG. 31 corresponds to the point cloud data encoder in FIG. 20 and/or a device according to embodiments corresponding thereto. For the operation of each element in FIG. 31, refer to the description of FIG. 20.

An LOD configuration unit 31000 may perform LOD configuration and sampling according to embodiments. The LOD configuration unit 31000 may reorganize points belonging to a node using Morton codes, merge isolated nodes, perform LOD sampling according to embodiments in the octree node, and signal related information.

The LOD configuration unit 31000 may set the depth level of the octree to support spatial scalability in attribute encoding/decoding, and configure and encode/decode points to which attribute encoding is to be applied, staring at the set octree depth level (see FIGS. 17 and 30).

The transmission device or encoder according to the embodiments may signal the octree depth level as the signaling information to the reception device or decoder according to the embodiments, and the octree depth level may be changed according to use thereof or the computing performance of the decoder.

The LOD constructing unit 31000 may perform point reorganization for each octree node by calculating a Morton code range for each octree node at the points sorted by the Morton codes (see FIGS. 18 and 27).

When the LOD component 31000 selects a point from among the points belonging to a node, a selection scheme for the operation may be signaled to the decoder. The selection scheme may include a scheme of selecting the first node at even-numbered LODs and selecting the last node at odd-numbered LODs, a scheme of selecting a point close to the center of the octree parent node region, and a scheme of selecting a point with a middle index (see FIGS. 28 to 30).

In the scheme of selecting the first node at an LOD and then selecting the last node at the next consecutive upper LOD, it may be determined whether to select the first node or the last node at even-numbered LODs. The determination may be signaled to the decoder (see FIGS. 28 to 30).

A residual attribute information quantization processor 31010 may generate a predicted value for the attribute data, generate a residual value between the predicted value and the attribute value, and quantize the residual value.

When the prediction mode and residual information separation flag is true, the residual attribute information quantization processor 31010 may calculate the residual between the predicted value according to the prediction mode and the value of the point, and encode a quantized value thereof together with the prediction mode.

When the prediction mode and residual information separation flag is false, the residual attribute information quantization processor 31010 may calculate the residual between the predicted value according to the prediction mode and the point value, and encode only the quantized value thereof.

Figure 32:
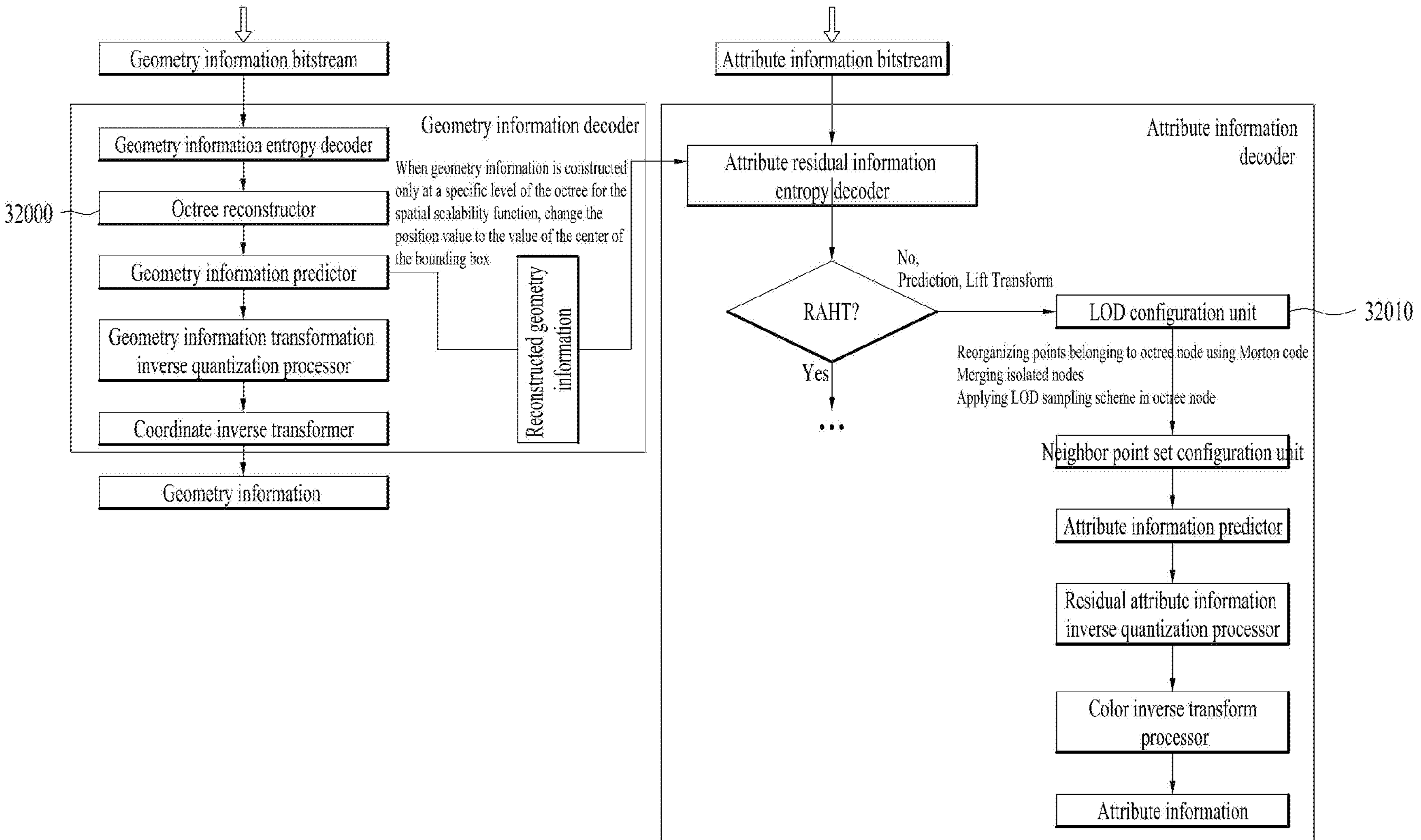
FIG. 32 shows a PCC data decoder according to embodiments.

FIG. 32 shows a PCC data decoder according to embodiments.

The decoder in FIG. 32 corresponds to the point cloud data decoder in FIG. 21 and/or a device according to embodiments corresponding thereto. For the operation of each element in FIG. 32, refer to the description of FIG. 21.

An octree reconstructor 32000 reconstructs an octree from the received geometry information bitstream (geometry data). For the spatial scalability function, the octree reconstructor 32000 may construct geometry information only at a specific level of the octree. In this case, the position value may be changed to the value of the center of the bounding box.

The octree reconstructor 32000 may construct and decode points to which attribute decoding is to be applied starting at the restored octree depth level for partial geometry decoding.

An LOD configuration unit 32010 may reorganize points belonging to a node using Morton codes, merge isolated nodes, and perform LOD sampling according to embodiments in the octree node.

The LOD configuration unit 32010 may construct and decode points to which attribute decoding is to be applied, starting at the octree depth level restored for partial attribute decoding.

The LOD configuration unit 32010 may perform point reorganization for each octree node by calculating a Morton code range for each octree node from the points sorted by the Morton codes.

The LOD configuration unit 32010 may select one point from among the points belonging to a node (including a merged node) based on the scheme of selecting a restored point. The scheme may include a scheme of selecting the first node at an LOD and then selecting the last node at the next consecutive upper LOD, a scheme of selecting a point close to the center position of the octree parent node region, and a scheme of selecting a point with a middle index.

In the scheme of selecting the first node at an LOD and then selecting the last node at the next consecutive upper LOD, the LOD configuration unit 32010 may configure LODs by selecting the first node the last node according to the restored selection type.

FIGS. 33 to 36 show detailed syntax of signaling information contained in the bitstream of the point cloud data in FIG. 22. To support the operation according to the embodiments, the transmission device and the reception device according to the embodiments may provide a signaling scheme as described below.

The transmission device and the reception device according to the embodiments may signal information related to configuration of attribute points for the spatial scalability function by adding the same to the SPS (FIG. 33) or the APS (FIG. 34).

The transmission device and the reception device according to the embodiments may signal information related to configuration of attribute points for the spatial scalability function by adding the same to the TPS (FIG. 35) or the Attr for each slice (FIG. 36). Due to the signaling information according to the embodiments, geometry/attributes for supporting the spatial scalability function may be efficiently signaled.

FIG. 33 shows a sequence parameter set (SPS) according to embodiments.

FIG. 33 shows a sequence parameter set contained in a bitstream according to embodiments as shown in FIG. 22. The metadata, parameters, or signaling information in FIG. 33 may be generated, transmitted and received by the transmission device 10000 in FIG. 1, the point cloud video encoder 10002 in FIG. 1, the reception device 10004 in FIG. 1, the point cloud video decoder 10006 in FIG. 1, the encoding 20001 in FIG. 2, the decoding 20003 in FIG. 2, the encoding process in FIG. 4, the decoding process in FIG. 11, the transmission device in FIG. 12, the reception device in FIG. 13, the XR device 1430 in FIG. 14, the encoder in FIG. 20, the decoder in FIG. 21, or the like.

Information related to configuration of attribute points for the spatial scalability function may be added to the sequence parameter set and signaled.

spatial_scalability_octree_level indicates a partially restored octree level.

spatial_scalability_attribute_octree_level indicates a partially restored octree level. That is, it indicates a partial octree level applied to the attributes. The attributes may have a restored octree level different from that of the geometry.

LOD_generation_direction indicates an LOD generation direction.

For example, when LOD_generation_direction is equal to 0, this indicates generating LODs from LOD0 to LODN (that is, proceeding from the root node to the leaf node in the case of the octree). When LOD_generation_direction is equal to 1, this indicates generating LODs LOD0 from LODN (that is, proceeding from the leaf node to the root node in the case of the octree). The integer value indicating the direction is changeable according to embodiments.

sampling_select_type indicates a type of point selection in selecting one point from among points belonging to a node (including a merged node). For example, when sampling_select_type is equal to 1, this indicates that the first node is selected at even-numbered LODs and the last node is selected at odd-numbered LODs. When sampling_select_type is equal to 2, this indicates selection of a point close to the center position of the octree parent node region. When sampling_select_type is equal to 3, this indicates selection of a point having a middle index. The integer value indicating the type is changeable according to embodiments.

sampling_first_node_flag indicates whether to select the first node or the last node at the starting LOD.

When sampling_select_type==1, sampling_first_node_flag may be provided as signaling information.

For the other fields, refer to the description of FIG. 23.

FIG. 34 shows an attribute parameter set (APS) according to embodiments.

FIG. 34 shows a sequence parameter set contained in a bitstream according to embodiments as shown in FIG. 22. The metadata, parameters, or signaling information in FIG. 34 may be generated, transmitted and received by the transmission device 10000 in FIG. 1, the point cloud video encoder 10002 in FIG. 1, the reception device 10004 in FIG. 1, the point cloud video decoder 10006 in FIG. 1, the encoding 20001 in FIG. 2, the decoding 20003 in FIG. 2, the encoding process in FIG. 4, the decoding process in FIG. 11, the transmission device in FIG. 12, the reception device in FIG. 13, the XR device 1430 in FIG. 14, the encoder in FIG. 20, the decoder in FIG. 21, or the like.

Information related to configuration of attribute points for the spatial scalability function may be added to the attribute parameter set and signaled.

For spatial_scalability_attribute_octree_level, LOD_generation_direction, and sampling_select_type, sampling_first_node_flag, refer to the description of FIG. 33.

For the other fields, refer to the description of FIG. 24.

FIG. 35 shows tile parameter set (TPS) according to embodiments.

FIG. 35 shows a sequence parameter set contained in a bitstream according to embodiments as shown in FIG. 22. The metadata, parameters, or signaling information in FIG. 35 may be generated, transmitted and received by the transmission device 10000 in FIG. 1, the point cloud video encoder 10002 in FIG. 1, the reception device 10004 in FIG. 1, the point cloud video decoder 10006 in FIG. 1, the encoding 20001 in FIG. 2, the decoding 20003 in FIG. 2, the encoding process in FIG. 4, the decoding process in FIG. 11, the transmission device in FIG. 12, the reception device in FIG. 13, the XR device 1430 in FIG. 14, the encoder in FIG. 20, the decoder in FIG. 21, or the like.

Information related to configuration of the attribute points for the spatial scalability function may be added to the tile parameter set and signaled.

For spatial_scalability_attribute_octree_level, LOD_generation_direction, and sampling_select_type, sampling_first_node_flag, refer to the description of FIG. 33.

For the other fields, refer to the description of FIG. 25.

FIG. 36 shows an attribute slice header (ASH) according to embodiments.

FIG. 36 shows a sequence parameter set contained in a bitstream according to embodiments as shown in FIG. 22. The metadata, parameters, or signaling information in FIG. 36 may be generated, transmitted and received by the transmission device 10000 in FIG. 1, the point cloud video encoder 10002 in FIG. 1, the reception device 10004 in FIG. 1, the point cloud video decoder 10006 in FIG. 1, the encoding 20001 in FIG. 2, the decoding 20003 in FIG. 2, the encoding process in FIG. 4, the decoding process in FIG. 11, the transmission device in FIG. 12, the reception device in FIG. 13, the XR device 1430 in FIG. 14, the encoder in FIG. 20, the decoder in FIG. 21, or the like.

Information related to configuration of the attribute points for the spatial scalability function may be added to the attribute slice header and signaled.

For spatial_scalability_attribute_octree_level, LOD_generation_direction, and sampling_select_type, sampling_first_node_flag, refer to the description of FIG. 33.

For the other fields, refer to the description of FIG. 26.

Figure 37:
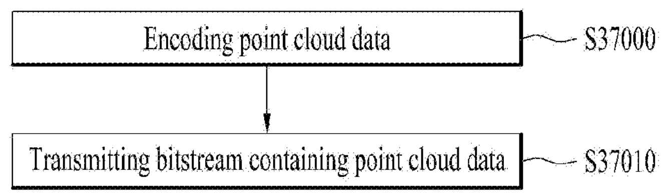
FIG. 37 illustrates a method for transmitting point cloud data according to embodiments.

FIG. 37 illustrates a method for transmitting point cloud data according to embodiments.

S37000: The method for transmitting point cloud data according to the embodiments may include encoding the point cloud data. The encoding operation according to the embodiments may correspond to or be combined with the operations of the transmission device 1000 in FIG. 1, the point cloud video encoder 10002 in FIG. 1, the encoding 20001 in FIG. 2, the encoder in FIG. 4, the encoder in FIG. 12, the XR device 1430 in FIG. 14, partial encoding corresponding to the partial decoding in FIG. 15, the encoding process in FIGS. 16 to 19, the encoder in FIG. 20, the point cloud data bitstream process in FIGS. 22 to 26, the encoding process in FIGS. 27 to 30, the encoder in FIG. 31, the point cloud data bitstream process of FIGS. 33 to 36.

S37010: The method for transmitting point cloud data according to the embodiments may further include transmitting a bitstream containing the point cloud data. The transmission operation according to the embodiments may correspond to or be combined with the operations of the transmitter 10003 in FIG. 1, the transmission 20002 in FIG. 2, and the transmission processor 12012 in FIG. 12.

Figure 38:
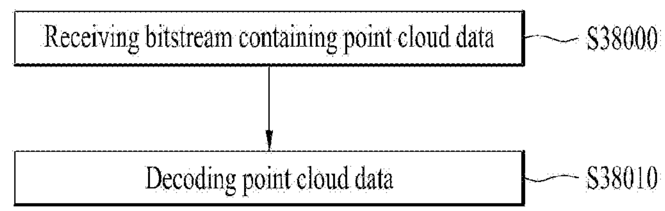
FIG. 38 illustrates a method for receiving point cloud data according to embodiments.

FIG. 38 illustrates a method of receiving point cloud data according to embodiments.

S38000: A method for receiving point cloud data according to embodiments may include receiving a bitstream containing the point cloud data. The reception operation according to the embodiments may correspond to or be combined with operations of the receiver 10007 in FIG. 1, the transmission 20002 in FIG. 2, and the receiver 13000 in FIG. 13.

S38010: The method for receiving point cloud data according to embodiments may further include decoding the point cloud data. The decoding operation according to the embodiments may correspond to or be combined with the operations of the point cloud video decoder 10006 in FIG. 1, the decoding 20003 in FIG. 2, the decoder in FIG. 10, the decoder in FIG. 11, the decoder in FIG. 13, the XR device 1430 in FIG. 14, the partial decoding in FIG. 15, the decoding process in FIGS. 16 to 19, the decoder in FIG. 21, the point cloud data bitstream process in FIGS. 22 to 26, the decoding process in FIGS. 27 to 30, the decoder in FIG. 32, the point cloud data bitstream process in FIGS. 33 to 36, and the like.

The PCC encoding method, PCC decoding method, and signaling method according to the above-described embodiments may provide the following effects.

Spatial scalability is a function to use a narrower bandwidth, such as a thumbnail, or to send and process a lower resolution point cloud to reduce the amount of decoder-side calculation when point cloud data is dense.

Embodiments provide a method for improving attribute compression efficiency by changing the scheme of restoring the center position value of the bounding box of each node as a position value of the point cloud based on the octree and sampling points for each LOD in order for the encoder/decoder of geometry-based point cloud compression (G-PCC) for 3D point cloud data compression to provide the spatial scalability function such that the most suitable points for each LOD are configured as nodes.

The proposed method for reorganizing points for each octree node through the Morton code may reduce the encoding/decoding execution time by reducing the amount of calculation of encoding/decoding constituting the octree.

Considering a distance weight based on the center position value of the bounding box of the parent node applied for spatial scalability through the proposed scheme of sampling for each node, a point close to the center position value or a point having a middle index may be selected to reduce the error value of the distance weight to enhance attribute compression efficiency, as proposed herein.

Accordingly, the embodiments may provide an attribute compression method for providing the function of spatial scalability of the encoder/decoder of geometry-based point cloud compression (G-PCC) for compressing 3D point cloud data and may increase the attribute compression efficiency.

The PCC encoder and/or the PCC decoder according to the embodiments may provide the spatial scalability function by providing a scheme of restoring a point position of geometry to a center position value of a node based on the octree and changing a point sampling scheme for each LOD.

By proposing a method of calculating the geometry position in partial restoration for supporting spatial scalability, a method of sampling a reference point for each node, and a signaling method for supporting the above methods, the spatial scalability effect on attribute encoding/decoding of G-PCC may be provided.

In this document, "A/B" is interpreted as A and/or B.

Embodiments have been described from the method and/or device perspective, and descriptions of methods and devices may be applied so as to complement each other.

Although the accompanying drawings have been described separately for simplicity, it is possible to design new embodiments by merging the embodiments illustrated in the respective drawings. Designing a recording medium readable by a computer on which programs for executing the above-described embodiments are recorded as needed by those skilled in the art also falls within the scope of the appended claims and their equivalents. The devices and methods according to embodiments may not be limited by the configurations and methods of the embodiments described above. Various modifications can be made to the embodiments by selectively combining all or some of the embodiments. Although preferred embodiments have been described with reference to the drawings, those skilled in the art will appreciate that various modifications and variations may be made in the embodiments without departing from the spirit or scope of the disclosure described in the appended claims. Such modifications are not to be understood individually from the technical idea or perspective of the embodiments.

Various elements of the devices of the embodiments may be implemented by hardware, software, firmware, or a combination thereof. Various elements in the embodiments may be implemented by a single chip, for example, a single hardware circuit. According to embodiments, the components according to the embodiments may be implemented as separate chips, respectively. According to embodiments, at least one or more of the components of the device according to the embodiments may include one or more processors capable of executing one or more programs. The one or more programs may perform any one or more of the operations/methods according to the embodiments or include instructions for performing the same. Executable instructions for performing the method/operations of the device according to the embodiments may be stored in a non-transitory CRM or other computer program products configured to be executed by one or more processors, or may be stored in a transitory CRM or other computer program products configured to be executed by one or more processors. In addition, the memory according to the embodiments may be used as a concept covering not only volatile memories (e.g., RAM) but also nonvolatile memories, flash memories, and PROMs.

In addition, it may also be implemented in the form of a carrier wave, such as transmission over the Internet. In addition, the processor-readable recording medium may be distributed to computer systems connected over a network such that the processor-readable code may be stored and executed in a distributed fashion.

In this specification, the term "/" and "," should be interpreted as indicating "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C." Further, in this specification, the term "or" should be interpreted as indicating "and/or." For instance, the expression "A or B" may mean 1) only A, 2) only B, or 3) both A and B. In other words, the term "or" used in this document should be interpreted as indicating "additionally or alternatively."

Terms such as first and second may be used to describe various elements of the embodiments. However, various components according to the embodiments should not be limited by the above terms. These terms are only used to distinguish one element from another. For example, a first user input signal may be referred to as a second user input signal. Similarly, the second user input signal may be referred to as a first user input signal. Use of these terms should be construed as not departing from the scope of the various embodiments. The first user input signal and the second user input signal are both user input signals, but do not mean the same user input signals unless context clearly dictates otherwise.

The terms used to describe the embodiments are used for the purpose of describing specific embodiments, and are not intended to limit the embodiments. As used in the description of the embodiments and in the claims, the singular forms "a", "an", and "the" include plural referents unless the context clearly dictates otherwise. The expression "and/or" is used to include all possible combinations of terms. The terms such as "includes" or "has" are intended to indicate existence of figures, numbers, steps, elements, and/or components and should be understood as not precluding possibility of existence of additional existence of figures, numbers, steps, elements, and/or components. As used herein, conditional expressions such as "if" and "when" are not limited to an optional case and are intended to be interpreted, when a specific condition is satisfied, to perform the related operation or interpret the related definition according to the specific condition.

Operations according to the embodiments described in this specification may be performed by a transmission/reception device including a memory and/or a processor according to embodiments. The memory may store programs for processing/controlling the operations according to the embodiments, and the processor may control various operations described in this specification. The processor may be referred to as a controller or the like. In embodiments, operations may be performed by firmware, software, and/or a combination thereof. The firmware, software, and/or a combination thereof may be stored in the processor or the memory.

MODE FOR INVENTION

As described above, related contents have been described in the best mode for carrying out the embodiments.

INDUSTRIAL APPLICABILITY

As described above, the embodiments may be fully or partially applied to the point cloud data transmission/reception device and system.

It will be apparent to those skilled in the art that variously changes or modifications can be made to the embodiments within the scope of the embodiments.

Thus, it is intended that the embodiments cover the modifications and variations of this disclosure provided they come within the scope of the appended claims and their equivalents.

What is claimed is:

1. A method comprising:

decoding positions of points from geometry data; and decoding attributes of the points from attribute data based on levels of detail including a first level and a second level, wherein the points are sorted based on a Morton code, wherein the first level is generated based on selecting a point in points of the second level, and based on the second level being odd, wherein the selected point is a point with a greatest point index of the second level, or based on the second level being even, wherein the selected point is a point with a lowest point index of the second level.

2. The method of claim 1, wherein the decoding the attributes of the points includes:

changing a location value of points of the point cloud data into a Morton code based on the geometry data and the attribute data, arranging the points based on the Morton code, decoding the points from the levels of detail.

3. A device comprising:

a memory; and at least one processor connected to the memory, the at least one processor configured to:

receive a bitstream including geometry data and attribute data;

decode positions of points from the geometry data; and decode attributes of the points from the attribute data based on levels of detail including a first level and a second level, wherein the points are sorted based on a Morton code, wherein the first level is generated based on selecting a point in points of the second level, and based on the second level being odd, wherein the selected point is a point with a greatest point index of the second level, or based on the second level being even, wherein the selected point is a point with a lowest point index of the second level.

4. The apparatus of claim 3, wherein the at least one processor further configured to:

change a location value of points of the point cloud data into a Morton code based on the geometry data and the attribute data, arrange the points based on the Morton code, decode the points from the levels of detail.

5. A method comprising:

encoding positions of points to geometry data; and encoding attributes of the points to attribute data based on levels of detail including a first level and a second level, wherein the points are sorted based on a Morton code, wherein the first level is generated based on selecting a point in points of the second level, and based on the second level being odd, wherein the selected point is a point with a greatest point index of the second level, or based on the second level being even, wherein the selected point is a point with a lowest point index of the second level.

6. The method of claim 5, wherein the encoding the attributes of the points includes:

changing a location value of points of the point cloud data into a Morton code based on the geometry data and the attribute data, arranging the points based on the Morton code, encoding the points from the levels of detail.

7. A device comprising:

a memory; and at least one processor connected to the memory, the at least one processor configured to:

encode positions of points to geometry data;

to encode attributes of the points to attribute data based on levels of detail including a first level and a second level, and transmit a bitstream including the geometry data and the attribute data, wherein the points are sorted based on a Morton code, wherein the first level is generated based on selecting a point in points of the second level, and based on the second level being odd, wherein the selected point is a point with a greatest point index of the second level, or based on the second level being even, wherein the selected point is a point with a lowest point index of the second level.

* * * * *